US007333116B2

(12) United States Patent
Shimomura et al.

(10) Patent No.: US 7,333,116 B2
(45) Date of Patent: Feb. 19, 2008

(54) DATA PROCESSOR HAVING UNIFIED MEMORY ARCHITECTURE USING REGISTER TO OPTIMIZE MEMORY ACCESS

(75) Inventors: Tetsuya Shimomura, Hitachi (JP); Shigeru Matsuo, Hitachinaka (JP); Koyo Katsura, Hitachiota (JP); Tatsuki Inuzuka, Hitachi (JP); Yasuhiro Nakatsuka, Koganei (JP)

(73) Assignee: Renesas Technology Corporation, Tokyo (JP)

( * ) Notice: Subject to any disclaimer, the term of this patent is extended or adjusted under 35 U.S.C. 154(b) by 0 days.

(21) Appl. No.: 11/182,944

(22) Filed: Jul. 18, 2005

(65) Prior Publication Data

US 2005/0264574 A1 Dec. 1, 2005

Related U.S. Application Data

(63) Continuation of application No. 10/669,562, filed on Sep. 25, 2003, now Pat. No. 6,954,206, which is a continuation of application No. 09/991,705, filed on Nov. 26, 2001, now Pat. No. 6,717,583, which is a continuation of application No. 08/942,689, filed on Sep. 29, 1997, now Pat. No. 6,333,745.

(30) Foreign Application Priority Data

Sep. 30, 1996 (JP) .................................. 8-258725
Jan. 28, 1997 (JP) .................................. 9-13732

(51) Int. Cl.
*G09G 5/39* (2006.01)
*G09G 5/36* (2006.01)
*G06F 13/14* (2006.01)
*G06F 15/167* (2006.01)

(52) U.S. Cl. ...................... 345/531; 345/530; 345/520; 345/558; 345/542

(58) Field of Classification Search ................. 345/531, 345/558, 542, 520, 530
See application file for complete search history.

(56) References Cited

U.S. PATENT DOCUMENTS 5,276,798 A 1/1994 Peaslee et al.
5,432,920 A 7/1995 Yazawa et al.
5,548,793 A 8/1996 Sprague et al.

(Continued)

FOREIGN PATENT DOCUMENTS

JP 06-083695 3/1994

(Continued)

*Primary Examiner*—Kee M. Tung
*Assistant Examiner*—Hau H Nguyen
(74) *Attorney, Agent, or Firm*—Mattingly, Stanger, Malur & Brundidge, P.C.

(57) ABSTRACT

In order to reduce degradation of the processing performance of the data processor due to use of a part of the main memory as a display frame buffer, when an access request to the memory 200 is generated from the CPU 310, the memory controller 400 holds it once, requests the display controller 560 to stop the access to the memory 200 which is in execution, when data to the access executed already is transferred from the memory 200, holds it, and transfers the access request from the CPU bus 310 which is held by the memory 200. When the access from the CPU bus 310 ends, the memory controller 400 restarts the access stopped in the display controller 560 and passes the held data to the display controller 560.

8 Claims, 46 Drawing Sheets

U.S. PATENT DOCUMENTS

| | | | |
|---|---|---|---|
| 5,598,526 A | 1/1997 | Daniel et al. | |
| 5,623,634 A | 4/1997 | Liu | |
| 5,673,416 A | 9/1997 | Chee et al. | |
| 5,682,554 A * | 10/1997 | Harrell | 710/57 |
| 5,699,540 A | 12/1997 | Vanka et al. | |
| 5,706,478 A | 1/1998 | Dye | |
| 5,748,203 A | 5/1998 | Tang et al. | |
| 5,748,920 A | 5/1998 | Mills et al. | |
| 5,748,968 A | 5/1998 | Nally et al. | |
| 5,768,445 A | 6/1998 | Troeller et al. | |
| 5,790,138 A | 8/1998 | Hsu | |
| 5,796,412 A | 8/1998 | Kim | |
| 5,796,413 A | 8/1998 | Shipp et al. | |
| 5,801,720 A | 9/1998 | Norrod et al. | |
| 5,805,854 A | 9/1998 | Shigeeda | |
| 5,805,905 A | 9/1998 | Biswas et al. | |
| 5,815,167 A | 9/1998 | Muthal et al. | |
| 5,818,464 A | 10/1998 | Wade | |
| 5,860,114 A | 1/1999 | Sell | |
| 5,911,051 A | 6/1999 | Carson et al. | |
| 5,940,087 A | 8/1999 | Katsura et al. | |
| 5,946,468 A | 8/1999 | Witt et al. | |
| 5,983,327 A | 11/1999 | Achilles et al. | |
| 6,002,411 A | 12/1999 | Dye | |
| 6,025,853 A * | 2/2000 | Baldwin | 345/506 |
| 6,104,417 A | 8/2000 | Nielsen et al. | |
| 6,178,481 B1 | 1/2001 | Krueger et al. | |
| 6,226,695 B1 | 5/2001 | Kaiser et al. | |

FOREIGN PATENT DOCUMENTS

| | | |
|---|---|---|
| JP | 07-044487 | 2/1995 |
| JP | 07-311730 | 11/1995 |
| WO | WO 95/15525 A1 | 6/1995 |
| WO | WO 96/16371 A1 | 5/1996 |

* cited by examiner

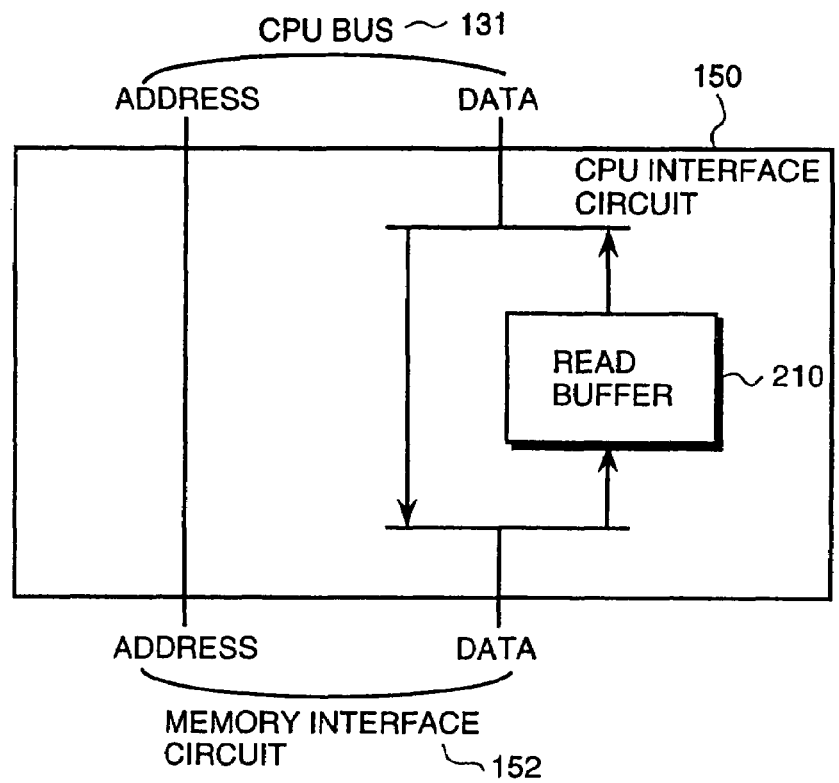
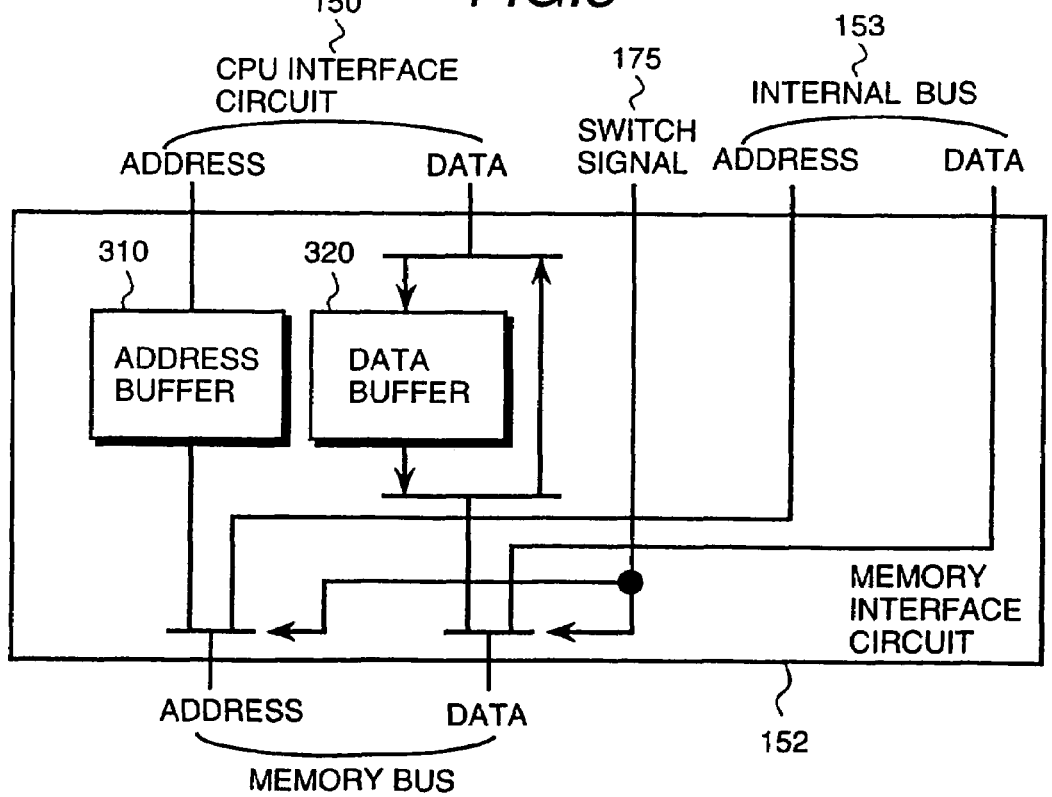

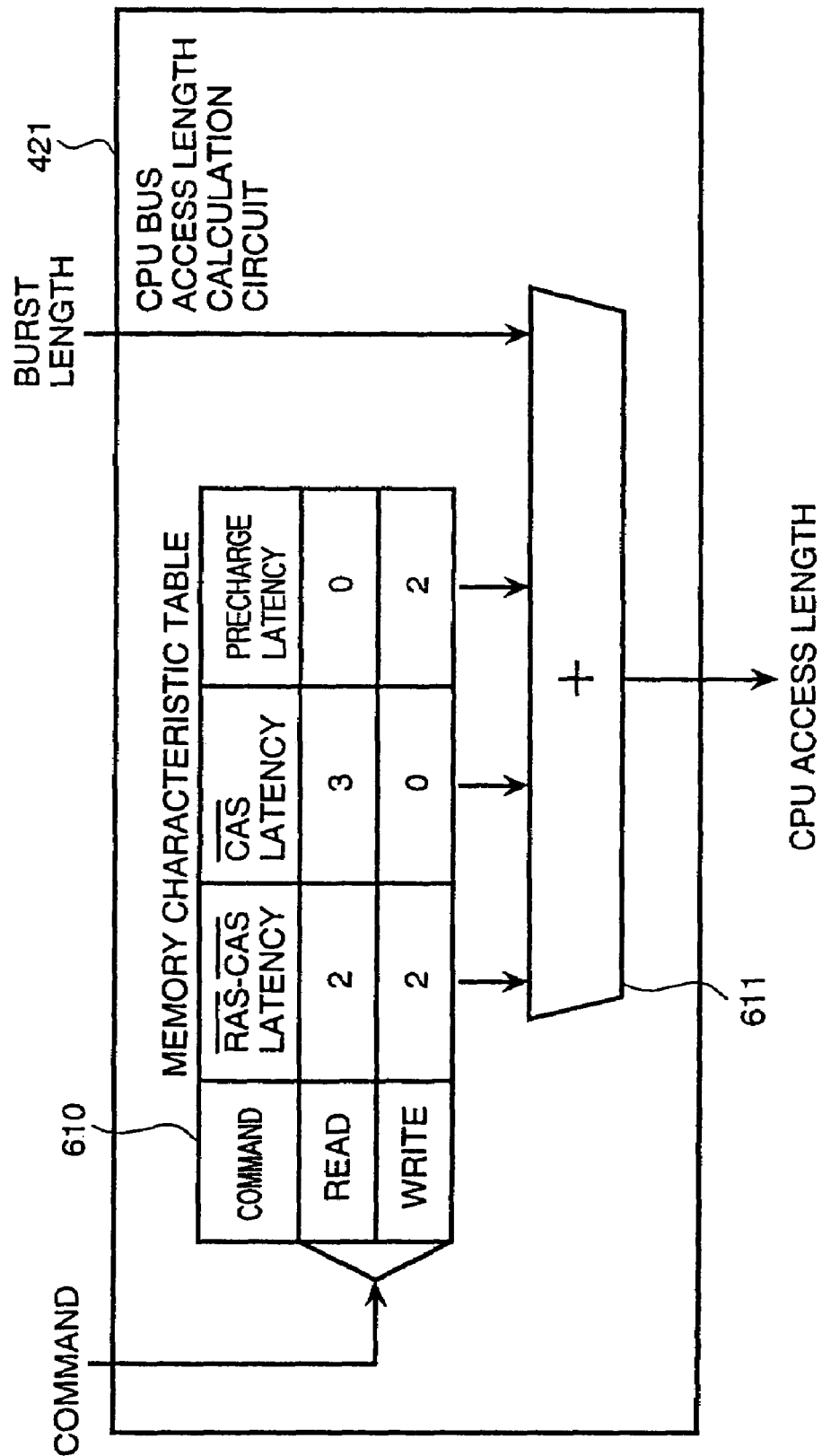

FIG.44
| COMMAND | FUNCTION |
|---|---|
| DRAW SQUARE | DEFORM SQUARE TEXTURE PATTERN  TEXTURE (BINARY OR MULTIVALUE) → DRAW RESULT |
| LINE | DRAW A LINE  |
| MOVE | MOVE DRAW-START POINT |
| LOFS | SET LOCAL OFF-SET PARAMETER |
| AFFIN | SET AFFIN TRANSFORM PARAMETER |
| JUMP | BRANCH DISPLAY LIST |
| GOSUB | CALL SUBROUTINE |
| RET | RETURN FROM SUBROUTINE |
| TRAP | TERMINATE DISPLAY LIST FETCH |
| FLASH | FLASH SOURCE CACHE |

FIG. 45

| NO. | R/W | NAME OF REGISTER | DATA 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 00 | R/W | SYSTEM CONTROL | SRES | DRES | DAC | RS | | CAM | | | | | | | MES | | MAM | |
| 01 | R | STATUS | | | | | VBK | TRA | DBF | | | | | | | | | |
| 02 | W | STATUS REGISTER CLEAR | | | | | VBCL | TRCL | | | | | | | | | | |
| 03 | R/W | PERMIT INTERRUPT | | | | | VBE | TRE | | | | | | | | | | |
| 04 | R/W | RENDERING MODE | | | | | | | | | | | | SCM | TVM | | MWX | GBM |
| 05 | R/W | DISPLAY MODE | | | | | | | | | | | | | | | | RCYN |
| 06 | | | | | | | | | | | | | | | | | | |
| 07 | | | | | | | | | | | | | | | | | | |
| 08 | R/W | DISPLAY SIZE X | | | | | | | | | | | | | | | | |
| 09 | R/W | DISPLAY SIZE Y | | | | | | | | DSX | | | | | | | | |
| 0A | R/W | DISPLAY START ADDR. 0 | | | | | | | | | DSY | | | | | | | |
| 0B | R/W | DISPLAY START ADDR. 1 | | | | | | | | | | | | | | | | |
| 0C | R/W | DISPLAY LIST ADDR. | | | | | | RESERVATION | | | | | | | DSA0 | | | |
| 0D | R/W | SOURCE AREA START ADDR. | | | | | | | | | | | | | DSA1 | | | |
| 0E | R/W | WORK AREA START ADDR. | | | | | | | | | | | | | DLSA | | | |
| 0F | | | | | | | | | | | | | | | SSA | | | |
|  | | | | | | | | | | | | | | | WSA | | | |
| 10 | R/W | HORIZ. DIS. START POSIT. | | | | | | | | | | HDS | | | | | | |
| 11 | R/W | HORIZ. DIS. END POSIT. | | | | | | | | | | HDE | | | | | | |
| 12 | R/W | VERT. DIS. START POSIT. | | | | | | | | | | VDS | | | | | | |
| 13 | R/W | VERT. DIS. END POSIT. | | | | | | RESERVATION | | | | VDE | | | | | | |
| 14 | R/W | HORIZ. SYN. PULSE WIDTH | | | | | | | | | | | | | | HSW | | |
| 15 | R/W | HORIZ. SYN. SCAN SYN | | | | | | | | | | HC | | | | | | |
| 16 | R/W | VERT. SYN POSITION | | | | | | | | | | VSP | | | | | | |
| 17 | R/W | VERT. SCAN CYCLE | | | | | | | | | | VC | | | | | | |
| 18 | R/W | DISPLAY RESET OUTPUT | | | | | | | | DRO | | | | | | | | |
| 19 | R/W | SUPERIMPOSE DETECT | | | | | | | | SID | | | | | | | | |
| 1A | R/W | COMMAND STATUS H | | | | | | | | | | | | | | | | |
| 1B | R/W | COMMAND STATUS L | CSTH | | | | | | | CSTL | | | | | | | | |

DATA PROCESSOR HAVING UNIFIED MEMORY ARCHITECTURE USING REGISTER TO OPTIMIZE MEMORY ACCESS

CROSS-REFERENCE TO RELATED APPLICATION

This application is a continuation of U.S. application Ser. No. 10/669,562, filed on Sep. 25, 2003 now U.S. Pat. No. 6,954,206 which is a continuation of U.S. application Ser. No. 09/991,705 filed on Nov. 26, 2001, now U.S. Pat. No. 6,717,583, which is a continuation of U.S. application Ser. No. 08/942,689 filed on Sep. 29, 1997, now U.S. Pat. No. 6,333,745. The contents of U.S. application Ser. Nos. 10/669,562, 09/991,705 and 08/942,689 are hereby incorporated herein by reference in their entirety.

FIELD OF THE INVENTION

The present invention relates to a data processor and a graphic processor using the unified memory architecture using a part of a main memory of a CPU for processing data as a frame buffer memory for image display.

BACKGROUND OF THE INVENTION

A conventional data processor using unified memory architecture described in Japanese Patent Application Laid-Open 4-84192.

In this processor, a memory for buffering data to be transferred between a CPU and a main memory once is provided so as to prevent the main memory from being occupied by access by the CPU, and a display controller provided for controlling display on a display unit reserves a period for reading data from the main memory for display.

As an example of a conventional data processor using the unified memory architecture, an apparatus which is structured so as to use a part of a memory as a Z buffer and a texture memory necessary for three-dimensional graphics in addition to a frame memory and to allow a rendering processor or a geometric processor for processing three-dimensional graphics to access it is also known.

Furthermore, a processor for processing graphics at high speed (Quoted Example 1) is described in "Three-dimensional CG Drawing LSI—300000 Polygons/Second Realized by Personal Computer—(Nikkei Electronics, No. 640, Jul. 17, 1995, pp 109-120)". This processor is provided with three kinds of memories, such as a texture memory, a frame buffer memory and a local memory, as dedicated processor memories. This architecture is advantageous in respect of improvement of the performance, though it is not suited to a compact and inexpensive apparatus, such as an individual portable device, because a plurality of memories are necessary.

On the other hand, an example in which graphic information is unified and the number of memories can be reduced compared with Quoted Example 1 is disclosed in Japanese Patent Application Laid-Open 5-257793 (Quoted Example 2). This graphic system has a CPU program, texture data, and a frame buffer which are unified in a main memory of a CPU.

According to each of the aforementioned processor systems, there is a problem in that access to the main memory by the CPU is forced to wait due to access to the main memory which is being executed by the display controller or the rendering processor, and so the processing performance of the whole processor is degraded. Furthermore, the period for which the access to the main memory by the CPU is forced to wait depends on the access executed by the display controller or the rendering processor, so that the period for which the access to the main memory by the CPU is forced to wait cannot be confirmed beforehand. As a result, in these systems, it is impossible to guarantee the degradation of the processing performance of the whole processor by less than a fixed limit.

Furthermore, in the aforementioned processor systems, the assumption has been made that the data processor has a memory system which is sufficiently quick so that the access capacity of the memory is several hundreds MB/s and the display data reading time can be reserved sufficiently. This assumption requires an expensive memory system and disturbs miniaturization and cost reduction.

Even in the constitution of Quoted Example 2, if the access capacity of the memory is reduced by use of an inexpensive memory system, adjustment with drawing other than display and CPU access is necessary so as to reserve the display data reading time necessary for moving images. The write access time from the CPU varies with the data amount, though the data amount for each time for high-speed graphics increases and the access time for each screen also increases.

As a result, in the memory unified type, display access is given priority. However, even if an access request for reading drawing data (hereinafter called display access) is issued from the graphic memory, when another access is being executed by the CPU or others, the access request is forced to wait until it ends and if the data of the display buffer becomes empty during the period of time, the moving image display screen is disturbed. Therefore, a sufficient display across time is reserved, and the data storage amount of the display buffer is increased, and the quality of the moving images is maintained. However, in the conventional display access priority system, the access efficiency of the graphic memory reduces, so that the processing of high-speed graphics by the CPU becomes difficult.

Generally, the CPU has a built-in cache memory for transferring output data and the memory access timing varies with the cache system. For example, the write through system transfers only one word. On the other hand, the copy back system for transferring a plurality of words continuously can transfer drawing procedure information (hereinafter called a drawing command) together, so that the access time can be shortened. Nevertheless, in the write through system in which the access time is long, a sufficient display access time is reserved. Namely, the difference in the cache system is not taken into account, so that the access efficiency of the memory reduces and high speed graphics display executable by the copy back system is sacrificed.

SUMMARY OF THE INVENTION

An object of the present invention is to provide a data processor using unified memory architecture for reducing degradation of the processing performance of the whole processor.

Another object of the present invention is to provide a data processor, when a graphics memory to be accessed from both a CPU and a graphics processor is used, for optimizing the continuous time for one display access depending on the cache system of the CPU, for increasing the access efficiency of the memory, and for realizing high speed graphics display and the graphics processor.

To accomplish the above first object, the present invention provides a data processor which has, for example, a CPU, a main memory, and a display controller for controlling display on a display unit and uses a part of the storage area of the main memory as a frame buffer for storing display data which is read by the display controller and displayed on the display unit, wherein the data processor has a memory controller for connecting to a memory bus controller for connecting to a memory bus connected to the main memory, a CPU bus connected to the CPU, and a local bus connected to the display controller, relaying the memory access sequence of the CPU to the main memory between the CPU bus and the memory bus, and relaying the memory access sequence of the display controller to the main memory between the local bus and the memory bus, and the memory controller gives priority to relaying of the memory access sequence between the CPU bus and the memory bus over relaying of the memory access sequence between the local bus and the memory bus, and even if a memory access by the CPU to the main memory occurs at a maximum frequency restricted by the throughput of the CPU bus, the throughput of the memory bus is set to a value larger than the throughput of the CPU bus so that the memory access frequency of the display controller to the main memory which is necessary for display on the display unit is reserved.

By use of such a constitution, when relaying of the memory access sequence between the CPU bus and the memory bus is given priority over relaying of the memory access sequence between the local bus and the memory bus, it can be guaranteed to prevent performance degradation due to waiting of the CPU for access to the main memory and to allow the display controller to effect a display without trouble by setting the throughputs of the CPU bus and memory bus as mentioned above.

Furthermore, to accomplish the above first object, the present invention provides a data processor which has, for example, a CPU, a main memory, and a display controller for controlling display on a display unit and uses a part of the storage area of the main memory as a frame buffer for storing display data which is read by the display controller and displayed on the display unit, wherein the data processor has a memory controller for connecting to a memory bus connected to the main memory, a CPU bus connected to the CPU, and a local bus connected to the display controller, relaying the memory access sequence of the CPU to the main memory between the CPU bus and the memory bus, and relaying the memory access sequence of the display controller to the main memory between the local bus and the memory bus and the memory controller has a means of freezing execution of the memory access sequence of the display controller to the main memory when the memory access sequence of the display controller to the main memory when the memory access sequence of the CPU to the main memory starts on the CPU bus during relaying of the memory access sequence of the display controller to the memory bus, releasing the freezing of execution of the memory access sequence of the display controller to the main memory after the memory access sequence of the CPU to the main memory ends, and executing the unexecuted portion of the memory access sequence.

By use of such a constitution, when access by the CPU to the main memory occurs, by freezing the access by the display controller, waiting by the CPU for access to the main memory can be guaranteed less than the cycle necessary for the freezing process and by releasing the freezing of the stopped access by the display controller to the main memory, the access can be restarted from the point of time when the freezing is released. Therefore, the degradation of the access efficiency of the display controller to the main memory can be reduced.

To accomplish the above second object, the data processor of the present invention has a CPU for generating drawing procedure information (drawing command) comprising the kind of graphic diagrams to be displayed and top parameters, a memory for storing the aforementioned drawing procedure written (write access) from the CPU and drawing data (bit map information) outputted to a display unit, and a graphics processor information, storing drawing data in the memory, and further executing display and reading (display access) for outputting the drawing data to the display unit, and furthermore the graphics processor changes the display and reading timing for the memory according to the cache system of the cache memory for transferring data to the memory provided in the CPU.

The graphics processor is given cache system information indicating whether the cache system is a system for transferring a plurality of words continuously to the memory or a system for transferring each word individually from the CPU, and the continuous time of one display and reading in the former case is made shorter than that in the latter case.

To accomplish the above object, the graphics processor of the present invention executes drawing access for generating bit map information and display access for displaying display data on a display unit to a graphics memory having a storage area for drawing procedure information (drawing command) comprising the kind of graphic diagrams to be displayed and top parameters and an area for storing the bit map information to be outputted to the display unit and furthermore transfer system information indicating whether the write access of the drawing procedure information to the graphics memory is a system for transferring data of a plurality of words at continuous addresses or a system for transferring data for each word is set and the continuous time of one display access in the former case is made shorter than that in the latter case.

Furthermore, the graphics processor has a drawing unit for executing a drawing access, a display controller for executing a display access, an interface means for receiving data transferred from the CPU and executing the write access, and a memory controller means for receiving those memory access requests and controlling them so as to give priority to the display access, and the transfer system information is set by the cache system of the CPU for transferring the drawing procedure information, and when the cache system is a copy back system, the continuous time of one display access is made shorter than that in the write through system.

Furthermore, the graphics processor has a display buffer for temporarily storing the bit map information which is read from the graphics memory by the display access and outputting it at the timing of the display access and outputting it in the timing of the display unit, and the number of continuous words by one display access mentioned above is set as a maximum value of the number of held data of the display buffer, and the timing of request issue of the display access is set as a threshold value less than the number of held data, and the maximum value and threshold value vary with the transfer system information.

According to the present invention having the aforementioned constitution, when the CPU is a copy back system, data is written into the graphics memory by the CPU at continuous addresses, so that the write access time for the same data amount is made shorter. Therefore, the spare time for reserving the priority of the display access may be reduced by the shortened time and the time of one write access and the time of display access can be shortened as a whole compared with the write through system, so that the access efficiency of the memory is increased and graphics can be processed at high speed. In other words, following write access of drawing data by the high-speed copy back system on the CPU side, a high-speed drawing process can be performed.

BRIEF DESCRIPTION OF THE DRAWINGS

FIG. 2 is a block diagram showing the constitution of the CPU interface circuit of the first embodiment.

FIG. 3 is a block diagram showing the constitution of the memory interface circuit of the first embodiment.

FIG. 6 is a block diagram showing the constitution of the CPU bus access length calculation circuit of the first embodiment.

FIG. 44 is a diagram showing the drawing commands of a graphics processor.

FIG. 45 is a diagram showing the register functions of a graphics processor.

DETAILED DESCRIPTION OF THE EMBODIMENTS

Various embodiments of the data processor of the present invention will be explained hereunder.

The data processor described herein can be applied to an electronic computer, such as a personal computer, and to a game machine.

Figure 1:
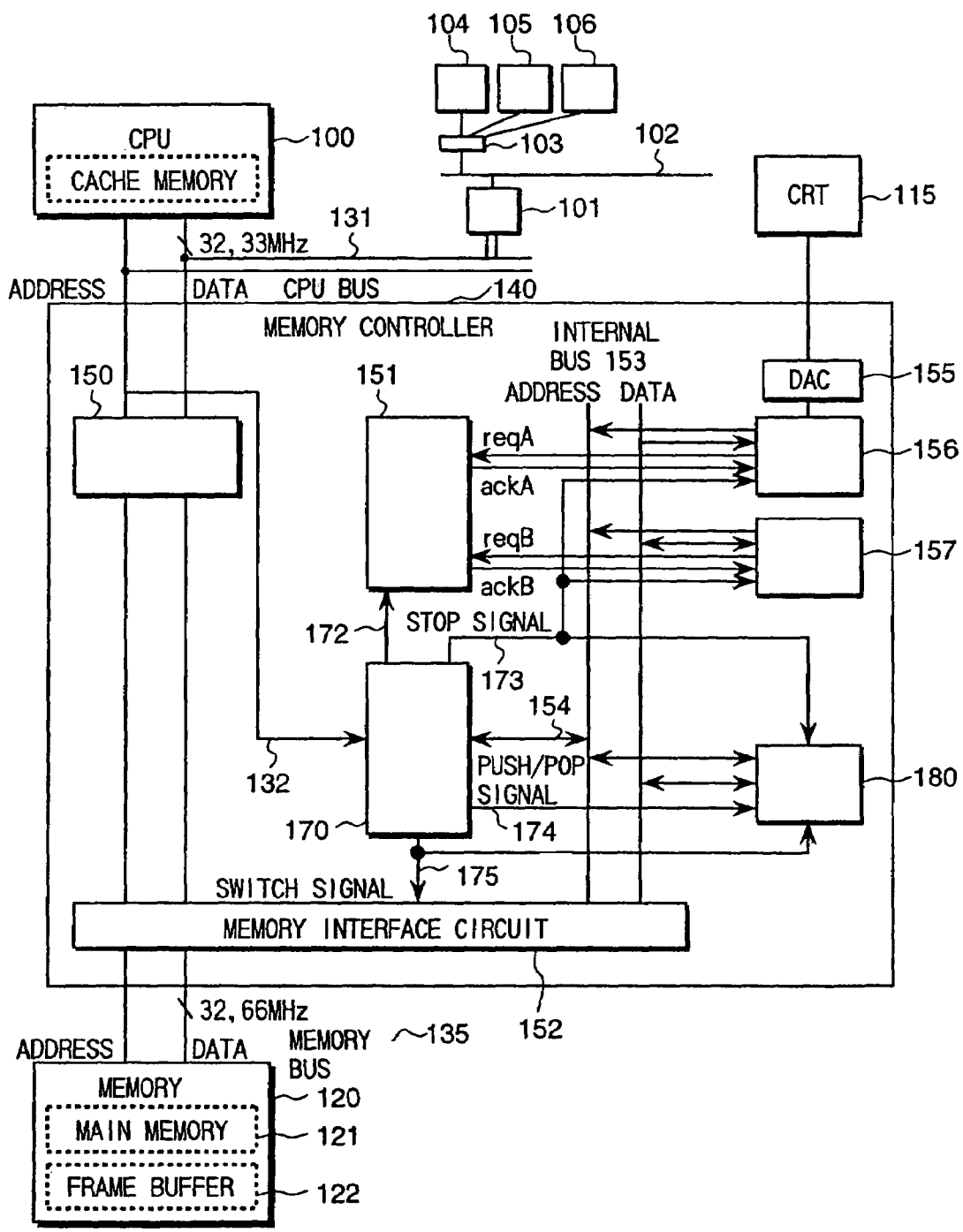
FIG. 1 is a block diagram showing the constitution of the data processor of the first embodiment.

The constitution of the data processor representing a first embodiment is shown in FIG. 1.

In FIG. 1, the data processor includes a CPU 100, a CRT 115, a memory 120, a memory controller 140, a CPU interface circuit 150, an internal bus arbitration circuit 151, a memory interface circuit 152, a DAC 155, a display controller 156, a rendering processor 157, a memory bus control circuit 170, a holding buffer 180, a bus bridge 101, a system bus 102, an I/O device 103, a hard disk drive 104, a CD-ROM drive 105, an input device 106, such as a keyboard, mouse, input tablet, or joystick.

A CPU bus 131, a memory bus 135, an internal bus 153, and the system bus 102 comprise an address bus and a data bus, respectively. The storage space of the memory 120 is divided into a main memory 121, which is a storage space into which a program and data necessary for the CPU 100 to operate are loaded from the CD-ROM drive 105 and the hard disk drive 104 via the bus bridge 101 and which is used by the CPU 100 as a working area, and a frame buffer 122, which is a storage space for storing display data to be displayed on the CRT 115.

By use of such a constitution, the CPU 100 executes data processing according to an input from the input device 106 by accessing the main memory 121 and stores display data to be displayed on the CRT 115 in the frame buffer 122. The rendering processor 157 performs a rendering process by accessing texture data stored in the main memory 121 and stores display data to be displayed on the CRT 115 in the frame buffer 122. The display data stored in the frame buffer 122 is read by the display controller 156 and displayed on the CRT 115.

An outline of the operation of this data processor will be explained hereunder.

In the following explanation, it is assumed that the CPU bus 131 operates under the condition of a bus width of 32 bits and a frequency of 33 MHz and the memory bus 135 operates under the condition of a bus width of 32 bits and a frequency of 66 MHz.

(1) Firstly, consideration will be given to an operation when the CPU accesses the main memory 121 and the memory bus 135 executes no valid memory access.

In this case, when it becomes necessary for the CPU 100 to read the main memory 121 due to a caching error of the cache memory built in the CPU 100, the CPU 100 outputs a read request to the CPU bus 131. The memory controller 140 reads the read request from the CPU bus 131 and transfers it to the memory interface circuit 152 via the CPU interface circuit 152.

The memory interface circuit 152 temporarily holds the read request from the CPU 100 until a switching signal 175 outputted from the memory bus control circuit 170 becomes 1. On the other hand, the read request outputted to the CPU bus 131 is also inputted to the memory bus control circuit 170 and a CPU bus control signal 132. When the CPU bus control signal 132 is inputted, the memory bus control circuit 170 sets and outputs the switching signal 175 to 1 and makes the memory bus 135 usable for access of the CPU 100. The memory bus control circuit 170 sets a CPU bus access valid signal 172 to 1 and outputs it to the internal bus arbitration circuit 151 and prevents access from the internal bus 153 from execution until the access of the CPU 100 ends.

When the switching signal 175 is set to 1, the memory interface circuit 152 outputs the read request from the CPU 100 which is temporarily held to the memory 120 via the memory bus 135. When corresponding data is read from the main memory 131 in the memory 120, it is transferred to the CPU interface circuit 150 via the memory bus 135 and the memory interface circuit 152. The CPU interface circuit 150 outputs the read data to the CPU 100 via the CPU bus 131 in synchronization with the CPU bus 131.

When the read access by the CPU 100 to the main memory 121 ends, the memory bus control circuit 170 sets the CPU bus access valid signal 172 to 0 and the switching signal 175 to 0 and permits access to the memory bus 135 from the internal bus 153.

Even if a write access to the main memory 121 from the CPU 100 occurs, the CPU 100 also outputs a write request and write data to the CPU bus 131. The memory controller 140 read the write request and write data via the CPU bus 131 and transfers them to the memory interface circuit 152 via the CPU interface circuit 150. The memory interface circuit 152 temporarily holds the write request and write data from the CPU 100 until the switching signal 175 outputted from the memory bus control circuit 170 becomes 1. On the other hand, the write request outputted to the CPU bus 131 is also inputted to the memory bus control circuit 170 as a CPU bus control signal 132. When the CPU bus control signal 132 is inputted, the memory bus control circuit 170 sets and outputs the switching signal 175 to 1 and makes the memory bus 135 usable for access of the CPU 100. The memory bus control circuit 170 sets a CPU bus access valid signal 172 to 1 and outputs it to the internal bus arbitration circuit 151 and prevents access from the internal bus 153 from execution until the access of the CPU 100 ends.

When the switching signal 175 is set to 1, the memory interface circuit 152 outputs the write request and write data from the CPU 100 which are temporarily held to the memory 120 via the memory bus 135. When the write access by the CPU 100 to the main memory 121 ends, the memory bus control circuit 170 sets the CPU bus access valid signal 172 to 0 and the switching signal 175 to 0 and permits access to the memory bus 135 from the internal bus 153.

(2) Consideration will now be given to an operation when the display controller 156 or the rendering processor 157 accesses the frame buffer 122 when the memory bus 135 executes no valid memory access (the memory bus 135 is not used for memory access).

In this case, when the display controller 156 accesses (only reading) the frame buffer 122, it sets and outputs a signal reqA to the internal bus arbitration circuit 151 to 1 first and requests access permission. When the CPU bus access valid signal 172 is 0, the internal bus arbitration circuit 151 sets ackA to 1 and permits access to the display controller 156. When ackA is set to 1, the display controller 156 outputs a read request comprising a read command, a read address, and the number of request data to the internal bus 153. When there is no access by the CPU 100, the switching signal 175 is set at 0, so that the read request outputted to the internal bus 153 is outputted to the memory 120 via the memory interface circuit 152 and the memory bus 135.

When the corresponding data is read from the frame buffer 122 in the memory 120, it is transferred to the display controller 156 via the memory bus 135, the memory interface circuit 152, and the internal bus 153. When the display controller 156 finishes the access, it sets reqA to 0 and indicates an access end to the internal bus arbitration circuit 151, and the internal bus arbitration circuit 151 sets ackA to 0.

The data which is read from the frame buffer 122 by the display controller 156 is outputted to the CRT 115 via the DAC 155.

Access to the memory 120 from the rendering processor 157 includes reading and writing. The processing for reading is the same as that of the display controller 156.

On the other hand, when the rendering processor 157 makes a write access to the memory 120, it sets and outputs reqB to the internal bus arbitration circuit 151 to 1 and outputs a write request comprising a write command, a write address, and the number of request data and write data to the internal bus 153 when the internal bus arbitration circuit 151 sets ackB to 1. When there is no access by the CPU 100, the switching signal 175 is set at 0, so that the write request outputted to the internal bus 153 is outputted to the memory 120 via the memory interface circuit 152 and the memory bus 135. When the rendering processor 157 finishes the access, it sets reqB to 0 and indicates an access end to the internal bus arbitration circuit 151 and the internal bus arbitration circuit 151, sets ackB to 0.

The internal bus arbitration circuit 151 controls approval or disapproval of access to the internal bus 153 by the rendering processor 157 and the display controller 156 using ackA and ackB and arbitrates use of the internal bus 153 for the two.

(3) An operation when an access request is outputted from the internal bus 153 and the memory bus 135 is executing access from the CPU 100 will be considered.

In this case, the CPU bus access valid signal 172 is set at 1 and no access from the internal bus 153 is executed until the CPU bus access valid signal 172 becomes 1.

(4) An operation when an access request is outputted from the CPU 100 and the memory bus 135 is executing access from the internal bus 153 will be considered.

In this case, it is assumed that when the memory bus 135 is executing access to the memory 20 from the rendering processor 157, an access request from the CPU 100 occurs.

Firstly, an operation when an access request (read or write request) is outputted from the CPU 100 and read access by the rendering processor 157 is in execution will be explained. When an access request is outputted from the CPU 100, the CPU bus control signal 132 is inputted to the memory bus control circuit 170. The memory bus control circuit 170 sets the switching signal 175 to 1 in the same timing as that of the operation when the memory bus 135 executes no valid memory access and allows execution of access from the CPU 100. If the access of the rendering processor 157 which is an execution at present does not end before the switching signal 175 is set to 1, the memory bus control circuit 170 sets a stop signal 173 to 1 before setting the switching signal 175 to 1 and indicates a halting of the access being executed at present to the rendering processor 157.

In the read access, the read data for the read request is transferred from the memory 120 late, so that the read data for the read request outputted from the rendering processor 157 is transferred from the memory 120 via the memory bus 135 and the memory interface circuit 152 while the stop signal 173 is 0 even after the stop signal 173 is set to 1. The number of read data to be transferred after the stop signal 173 is set to 1 for a read request issued to the memory 120 before the stop signal 173 is set to 1 varies with the timing that the read request is issued to the memory 120 and the access request timing from the CPU 100. Therefore, the memory bus control circuit 170 outputs a push signal at the timing that the read data is transferred after the stop signal 173 is set to 1 on the basis of the CPU bus control signal 132 and an internal bus control signal 154. The holding buffer 180 holds the read data transferred on the basis of the push signal. The holding buffer 180 is structured so as to hold also the read request issued on the memory 120.

When the data transferred from the memory 120 is stored in the holding buffer 180, the memory bus control circuit 170 suspends the current access and outputs a control signal for precharging the memory 120 to the memory 120 as the internal bus control signal 154 via the internal bus 153, the memory interface circuit 152, and the memory bus 135. Hereafter, the memory bus control circuit 170 sets the switching signal 175 to 1 and allows execution of access by the CPU 100. When the CPU 100 executes access, the memory bus control circuit 170 sets the switching signal 175 to 0 and allows execution of access from the internal bus 153. To restart the suspended access of the rendering processor 157 in synchronization with the timing at which the switching signal 175 changes from 1 to 0, the holding buffer 180 outputs the held read request to the internal bus 153. To output the data which is read from the memory 120 after the stop signal 173 is set to 1 and held in the holding buffer 180 to the internal bus 153 before setting the stop signal 173 to 0, the memory bus control circuit 170 outputs a pop signal. The holding buffer 180 outputs the held read data in synchronization with the pop signal.

When the memory bus control circuit 170 sets the stop signal 173 to 0 hereafter, the rendering processor 157 continues the suspended access.

The aforementioned operations are the same as those when an access request is outputted from the CPU 100 during execution of memory access from the display controller 156.

Next, an operation when an access request is outputted from the CPU 100 during execution of write access of the rendering processor 157 will be explained. In the case of write access, a write address and write data are sent to the memory 120 at the same time, so that there is no write data to be transferred between the memory 120 and the internal bus 153 while the stop signal 173 is 1 and the switching signal 175 is 0 like a case of read access. Therefore, only a write command and a write address are held in the holding buffer 180. The others are processed in the same way as the case that the read access is suspended.

By the aforementioned operations, it can be guaranteed that the CPU 100 always accesses the memory 120 for a specified period of time. By allowing the holding buffer 180 to hold the status when access is suspended, the access can be continued form the suspended address at the time of restart and by suspending access, the overhead can be minimized.

Each unit of the memory controller 140 for realizing the aforementioned operations will be explained in detail hereunder.

The memory access sequence is assumed to be as shown below in the following explanation.

Namely, in the case of read access, an access request (Active command) including a read command and the number of request data (burst length) is given to the memory together with the row address of the memory in the first cycle and the read command and the column address of target data are given at the same time sequentially in each cycle after the cycle is spread by the read RAS-CAS latency cycle, and the precharge command is given in the last cycle for the next access sequence. In this case, the read RAS-CAS latency indicates the number of cycles until the first read command and column address can be given after the Active command and the row address are given, and the read CAS latency indicates the number of cycles until the data at a column address is outputted from the memory 120 after the read command and the column address are given, and the precharge latency indicates the number of cycles until the Active command including the next read command can be given after the precharge command is given at the preceding step.

In the case of write access, an access request (Active command) including a write command and the number of request data (burst length) is given to the memory together with the row address of the memory in the first cycle, and the write command and the column address of target data and the data are given at the same time sequentially in each cycle after the cycle is spread by the write RAS-CAS latency cycle, and the precharge command is given in the last cycle for the next access sequence. In this case, the write RAS-CAS latency indicates the number of cycles until the first write command and column address can be given after the Active command and the row address are given, the write CAS latency indicates the number of cycles (generally 0) until the data at a column address is given after the write command and the column address are given, and the precharge latency indicates the number of cycles until the Active command including the next write command can be given after the precharge command is given at the preceding step.

However, as mentioned above, generally, there exists no CAS latency for writing and the RAS-CAS latency generally takes the same value for both reading and writing. Therefore, hereunder, in the case where only RAS-CAS latency is described, it indicates an AS-CAS latency value common to reading and writing and in the case where only CAS latency is described, it indicates a CAS latency value for reading.

Firstly, the constitution of the CPU interface circuit 150 will be described with reference to FIG. 2.

In FIG. 2, numeral 210 indicates a read buffer.

An access request from the CPU bus 131 passes through the CPU interface circuit 150 and is transferred to the memory interface circuit 152 as it is. On the other hand, read data transferred to the CPU bus 131 from the memory bus 135 is written into the read buffer 210. The data written into the read buffer 210 is outputted to the CPU bus 131 in synchronization with the bus clock of the CPU bus 131.

Next, the constitution of the memory interface circuit 152 will be described with reference to FIG. 3.

In FIG. 3, numeral 310 indicates an address buffer and 320 indicates a data buffer.

When a read request is issued from the CPU 100, the read request transferred via the CPU interface circuit 150 is held by the address buffer 310 and outputted to the memory bus 135 at the timing that the switching signal 175 is set to 1. The data read from the memory 120 for the read request is transferred to the CPU interface circuit 150 as it is.

When a write request is issued from the CPU 100, the write request and write data transferred via the CPU interface circuit 150 are held by the address buffer 310 and the data buffer 320 respectively and outputted to the memory bus 135 at the timing that the switching signal 175 is set to 1.

Next, the constitution of the memory bus control circuit 170 will be described with reference to FIG. 4.

Figure 4:
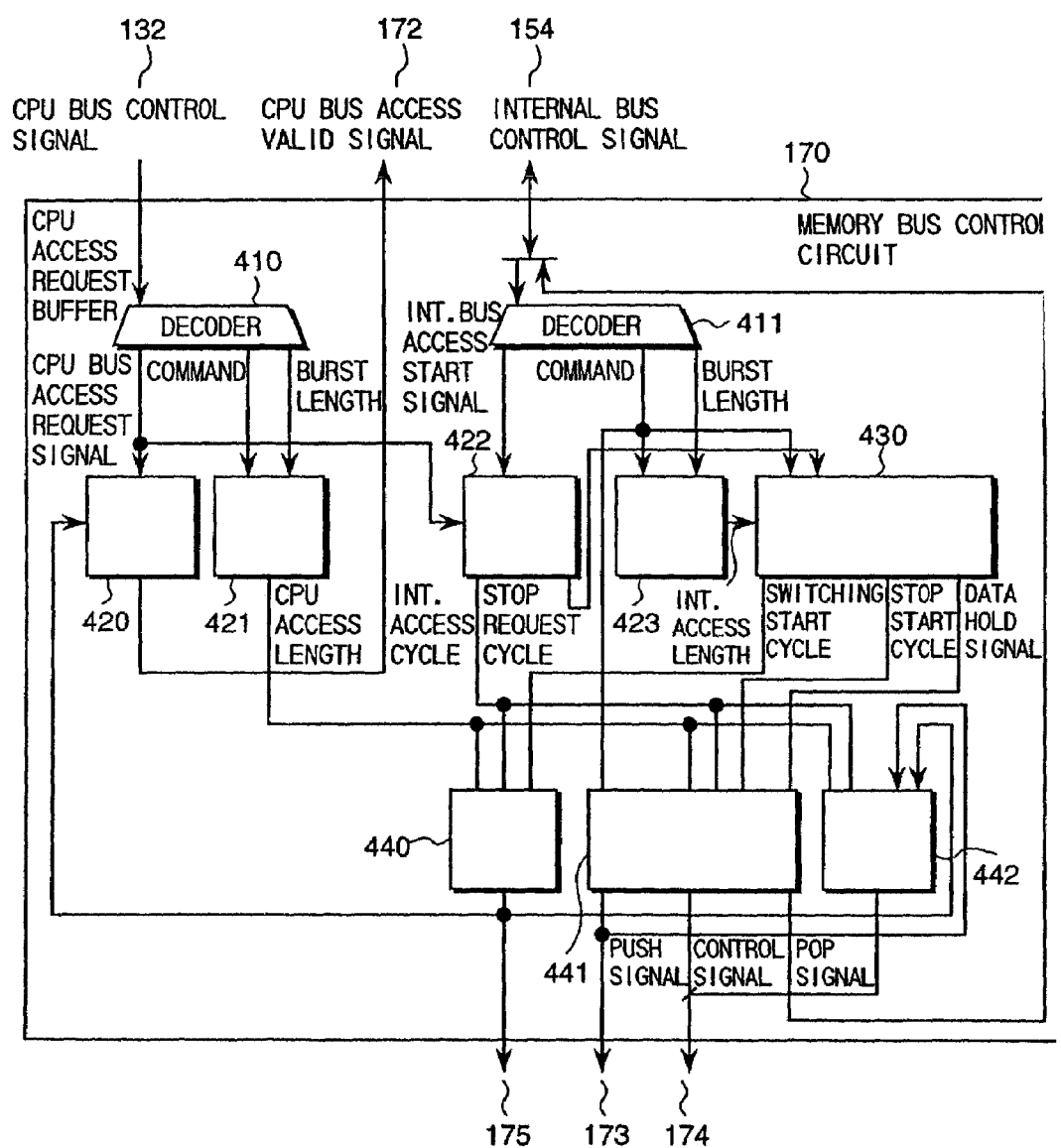
FIG. 4 is a block diagram showing the constitution of the memory bus control circuit of the first embodiment.

In FIG. 4, the memory bus control circuit includes decoders 410 and 411, a CPU access buffer 420, a CPU bus access length calculation circuit 421, an internal bus access counter 422, an internal bus access length calculation circuit 423, a stop decision circuit 430, a switching signal generation circuit 440, a stop processing circuit 441 and a restart processing circuit 442.

The decoder 410 decodes the CPU bus control signal 132 and outputs a CPU bus access request signal which becomes 1 when an access request is issued from the CPU 100, a command indicating whether access request from the CPU 100 is reading or writing, and a burst length indicating the number of read or write data.

The CPU access buffer 420 receives the CPU bus access request signal and sets and outputs the CPU bus access valid signal 172 to 1. The CPU bus access valid signal 172 is kept at 1 during execution of the access from the CPU 100 and returned to 0 after the access ends. The CPU bus access length calculation circuit 421 calculates the number of cycles required for access from the CPU 100 from the command and burst length and outputs as a CPU access length.

The decoder 411 decodes the internal bus control signal 154 and outputs an internal bus access start signal which becomes 1 when an access request is issued from the internal bus 153, a command indicating whether the access request from the internal bus 153 is reading or writing, and a burst length indicating the number of read or write data. The internal bus access counter 422 resets the internal counter at the timing that it receives the internal bus access start signal, counts the number of cycles during execution of internal bus access, and outputs it as an internal access cycle. The internal bus access counter 422 further outputs the count value of the internal counter when the CPU bus access request signal becomes 1 as a stop request cycle. The internal bus access length calculation circuit 423 calculates the number of cycles required for access from the internal bus 153 from the command and burst length and outputs it as an internal access length. The stop decision circuit 430 outputs a switching start cycle indicating the timing for setting the switching signal 175 to 1, on the basis of the command outputted from the decoder 411, the stop request cycle, and the internal access length, a stop start cycle indicating the timing for setting the stop signal 173 to 1, and a data holding signal indicating whether there is read data to be transferred to the internal bus 153 from the memory 120 or not during a period from the time that the stop signal 173 becomes 1 to the time that the switching signal 175 becomes 1 when the access in execution from the internal bus 153 is a read access.

The switching signal generation circuit 440 controls the value of the switching signal 175 on the basis of the CPU access length, internal access cycle, and switching start cycle. The processing circuit 441 outputs the command outputted from the decoder 411, the CPU access length, the internal access cycle, the stop start cycle, and a data holding signal. The stop processing circuit 441 also outputs a push signal when there is read data to be transferred to the internal bus 153 from the memory 120 during a period from the time that the stop signal 173 becomes 1 to the time that the switching a signal 175 becomes 1 and outputs a signal for precharging the memory 120 to the internal bus 153 as a control signal when it is necessary to suspend the access from the internal bus 153 which is execution at present. When access from the internal bus 153 is suspended and the suspended access is a read access, the restart processing circuit 442 outputs a signal for requesting to output read data held in the holding buffer 180 to the internal bus 153 as a pop signal on the basis of the CPU access length, the internal access cycle, the switching signal 175, and the stop signal 173.

The constitution of the CPU access buffer 420 shown in FIG. 4 will be described with reference to FIG. 5.

In the drawing, numeral 511 indicates an AND circuit and 520 indicates a CPU access request buffer.

Figure 5:
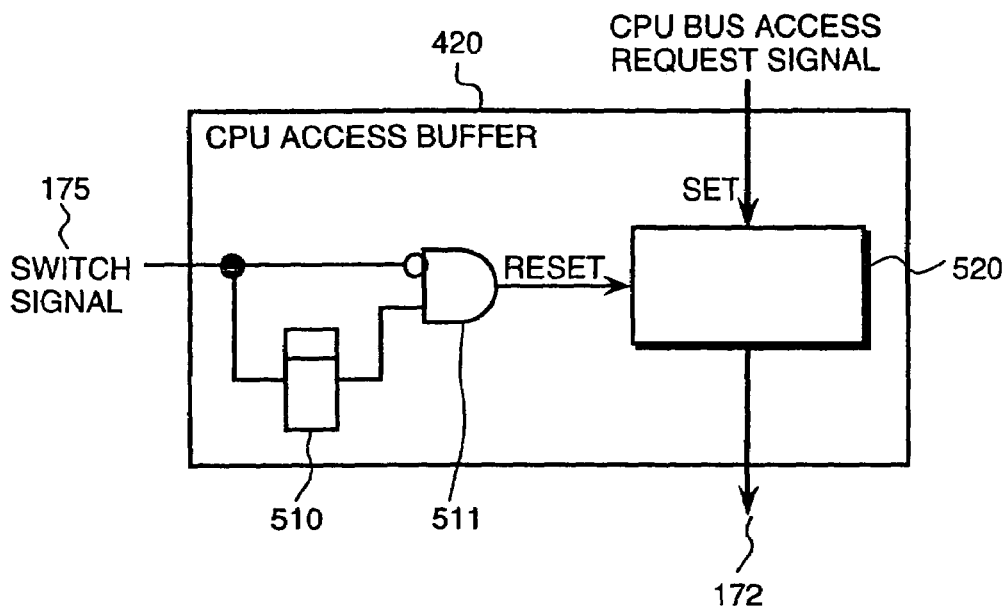
FIG. 5 is a block diagram showing the constitution of the CPU access buffer of the first embodiment.

In FIG. 5, at the timing that a CPU bus access signal is set to 1, the CPU access request buffer 520 is set to 1. The CPU access request buffer 520 outputs the set value as the CPU bus access valid signal 172. The content of the CPU access request buffer 520 is reset to 0 at the timing that the switching signal 175 is switched from 1 to 0.

An example of the CPU bus access length calculation circuit 421 shown in FIG. 4 will be described with reference to FIG. 6.

In FIG. 6, numeral 610 indicates a memory characteristic table and 611 indicates an adder.

In FIG. 6, in the memory characteristic table 610, the RAS-CAS latency, CAS latency, and precharge latency when the command is a read command or a write command are registered respectively. The CPU bus access length memory calculation-circuit 421 reads each parameter from the memory characteristic table 610 on the basis of the command outputted from the decoder 410, adds it to the burst length outputted from the decoder 410 by the adder 611, and outputs the total as a CPU access length.

The constitution of the internal bus access counter 422 shown in FIG. 4 will be described with reference to FIG. 7.

Figure 7:
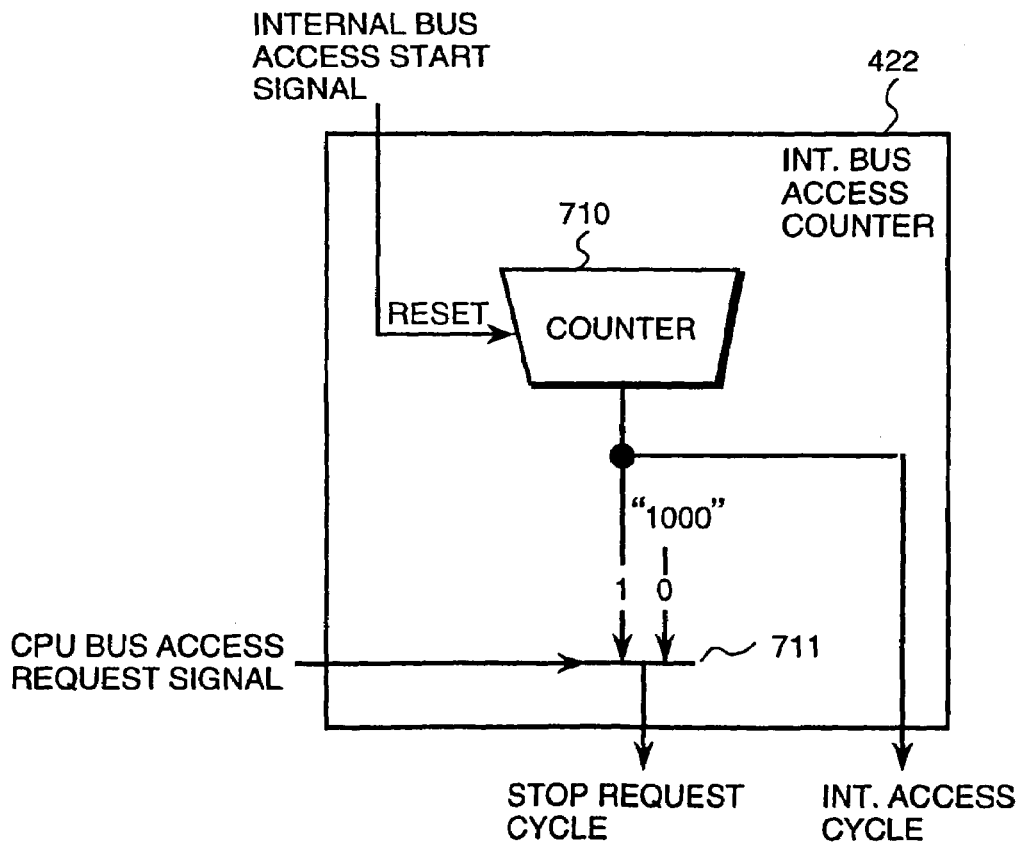
FIG. 7 is a block diagram showing the constitution of the internal bus access counter of the first embodiment.

In FIG. 7, numeral 710 indicates a counter and 711 indicates a selector.

In FIG. 7, the counter 710 is reset to 1 by the internal bus access start signal and then counts the number of execution cycles of access from the internal bus 153 and outputs it as an internal access cycle. At the timing when the CPU bus access request signal is set to 1, the CPU bus access length calculation circuit 421 outputs the output from the counter 710 as a stop request cycle. In other cases, the CPU bus access length calculation circuit 421 outputs "1000" as a sufficiently large default value.

The constitution of the internal bus access length calculation circuit 423 shown in FIG. 4 will be described with reference to FIG. 8.

Figure 8:
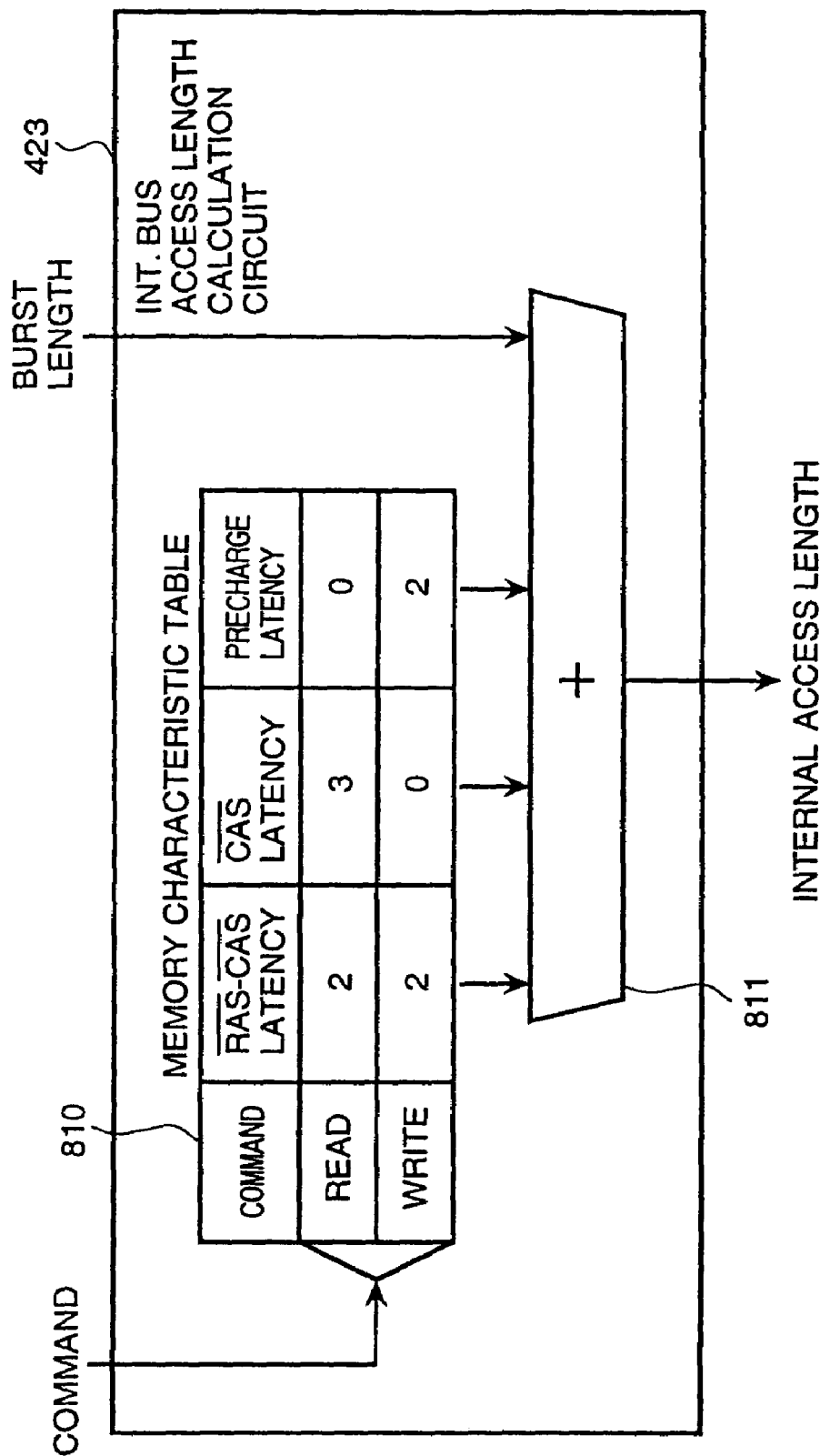
FIG. 8 is a block diagram showing the constitution of the internal bus access length calculation circuit of the first embodiment.

In FIG. 8, numeral 810 indicates a memory characteristic table and 811 indicates an adder.

In FIG. 8, in the memory characteristic table 810, the RAS-CAS latency, CAS latency, and precharge latency when the command is a read command or a write command are registered respectively. The internal bus access length calculation circuit 423 read each parameter from the memory characteristic table 810 on the basis of the command outputted from the decoder 411, adds it to the burst length outputted from the decoder 411 by the adder 811, and outputs the total as an internal access length.

The constitution of the stop decision circuit 430 shown in FIG. 4 will be described with reference to FIG. 9.

Figure 9:
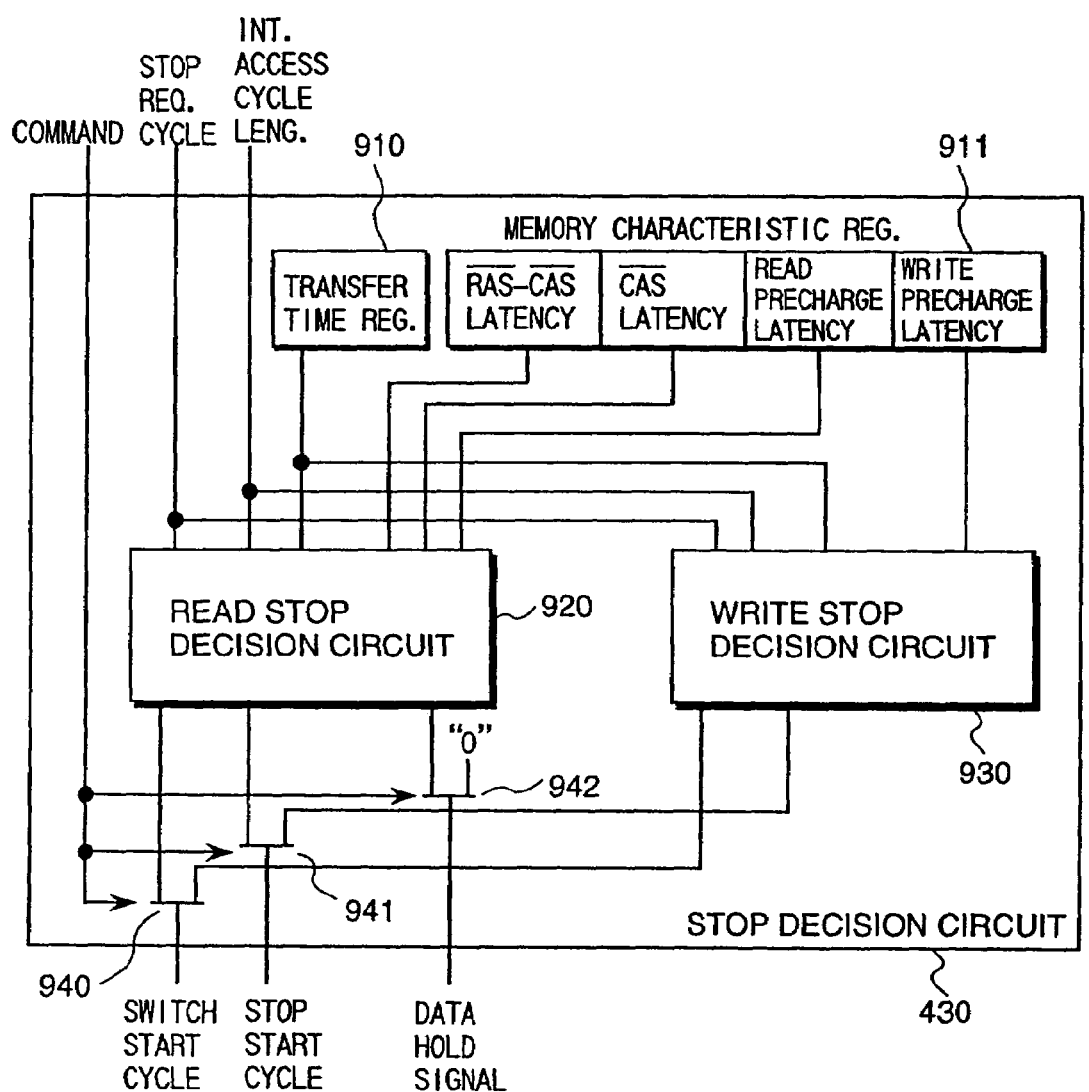
FIG. 9 is a block diagram showing the constitution of the stop decision circuit of the first embodiment.

In FIG. 9, the stop decision circuit 430 includes a transfer time register 910, a memory characteristic register 911, a read stop decision circuit 920, and a write stop decision circuit 930.

In FIG. 9, in the transfer time register 910, the transfer time (delay time) of the first command from the CPU bus 131 to the memory bus 135 which is generated by the memory interface circuit 152 of the memory controller 140 when access from the CPU 100 is generated while the memory bus 135 is used by the display controller 156 or the rendering processor 157 is registered. In the memory characteristic register 911, the RAS-CAS latency, CAS latency, and both read and write precharge latencies are registered. The read stop decision circuit 920 outputs a switching start cycle indicating the timing for setting the switching signal 175 during execution of read access to 1, a stop start cycle indicating the timing for setting the stop signal 173 to 1, and a data holding signal indicating whether or not to hold data on the internal bus 153 in the holding buffer 180 on the basis of the stop request cycle, internal access length, RAS-CAS latency, CAS latency, and read precharge latency.

The write stop decision circuit 930 outputs a switching start cycle during execution of write access and a stop start cycle on the basis of the stop request cycle, internal access length, transfer time, and write precharge latency. These signals outputted from the read stop decision circuit 920 and the write stop decision circuit 930 are selected and outputted by selectors 940 to 942 according to the command outputted from the decoder 411.

The constitution of the read stop decision circuit 920 shown in FIG. 9 will be described with reference to FIG. 10.

Figure 10:
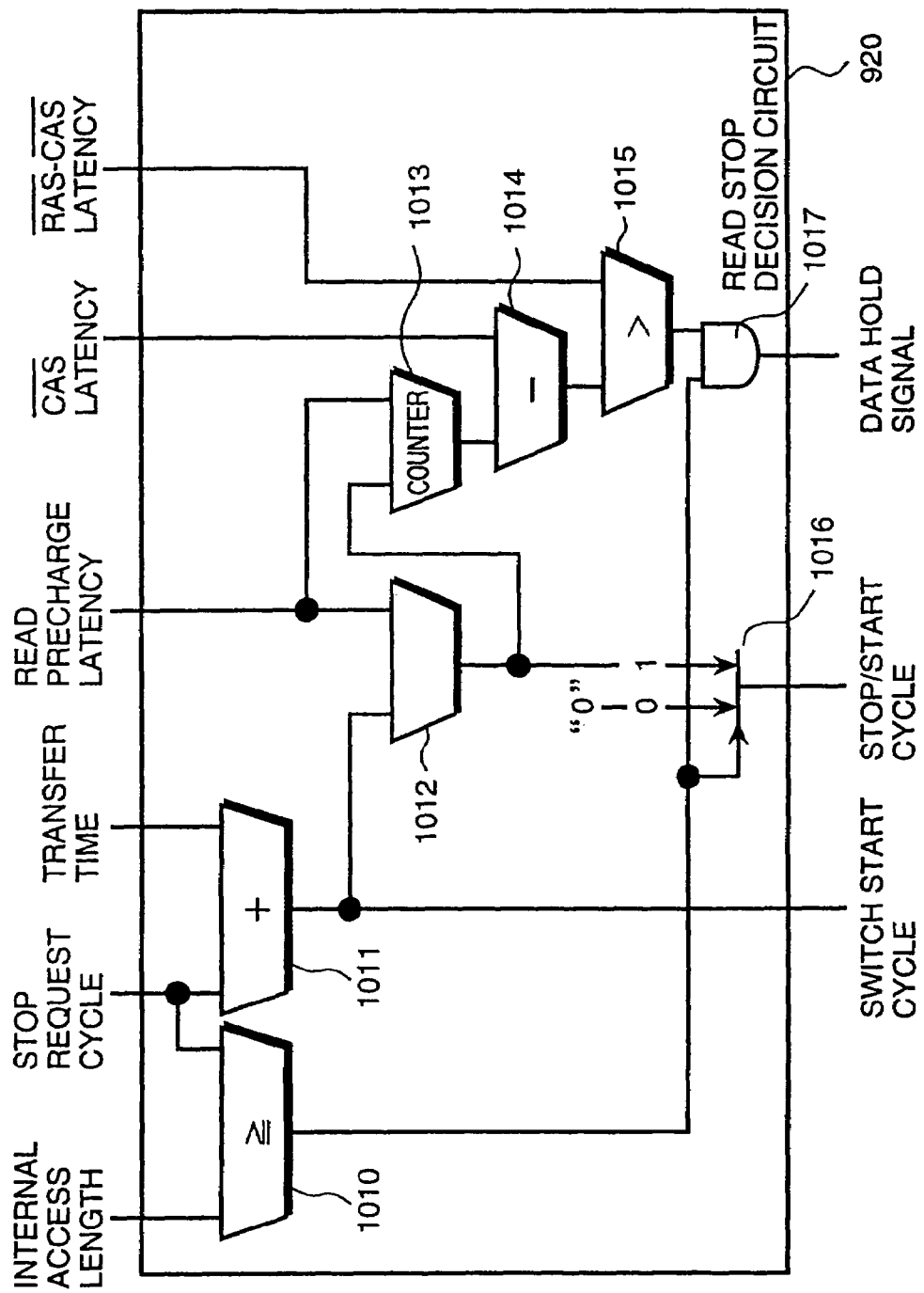
FIG. 10 is a block diagram showing the constitution of the reading stop decision circuit of the first embodiment.

In FIG. 10, the read stop decision circuit 920 includes comparators 1010 and 1015, an adder 1011, subtracters 1012 and 1014, a counter 1013, a selector 1016, an AND circuit 1017.

In FIG. 10, the comparator 1010 outputs 1 when the internal access length is the stop request cycle or more and 0 when it is not. The adder 1011 calculates and outputs the switching start cycle from the stop request cycle and transfer time. The subtracter 1012 subtracts the read precharge latency from the switching start cycle and outputs the difference. The counter 1013 counts the values from the "the output value of the subtracter 1012" up to "the output value of the subtracter plus the read precharger latency minus 1". The subtracter 1014 subtracts and outputs the CAS latency from the output value of the counter 1013. The comparator 1015 outputs 1 when the output value of the subtracter 1014 is larger than the RAS-CAS latency and 0 when it is not. The selector 1016 outputs the output value of the subtracter 1012 as a stop start cycle when the output value of the comparator 1010 is 1 and 0 as a stop start cycle when it is not. The AND circuit 1017 outputs the logical product of the output values of the comparators 1010 and 1015 as a data holding signal.

The constitution of the write stop decision circuit 930 shown in FIG. 9 will be described with reference to FIG. 11.

Figure 11:
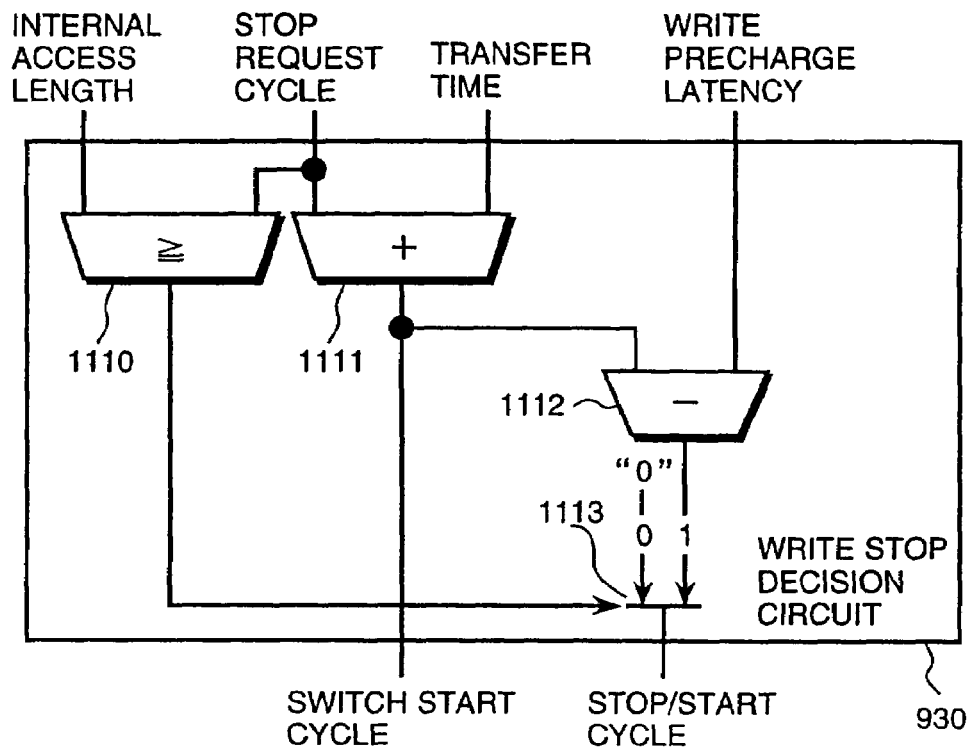
FIG. 11 is a block diagram showing the constitution of the writing stop decision circuit of the first embodiment.

In FIG. 11 the write stop decision circuit 930 includes a comparator 1110, an adder 1111, a subtracter 1112, and a selector 1113.

In FIG. 11, the comparator 1110 outputs 1 when the internal access length is the stop request cycle or more and 0 when it is not. The adder 1111 outputs the sum of the stop request cycle and the transfer time as a switching start cycle. The subtracter 1112 outputs the difference between the switching start cycle and the write precharge latency. The selector 1113 outputs the output value of the subtracter 1112 as a stop start cycle when the output value of the comparator 1110 is 1 and 0 as a stop start cycle when it is not.

Next, a an example of the switching signal generation circuit 440 of the memory bus control circuit 170 shown in FIG. 4 will be described with reference to FIG. 12.

Figure 12:
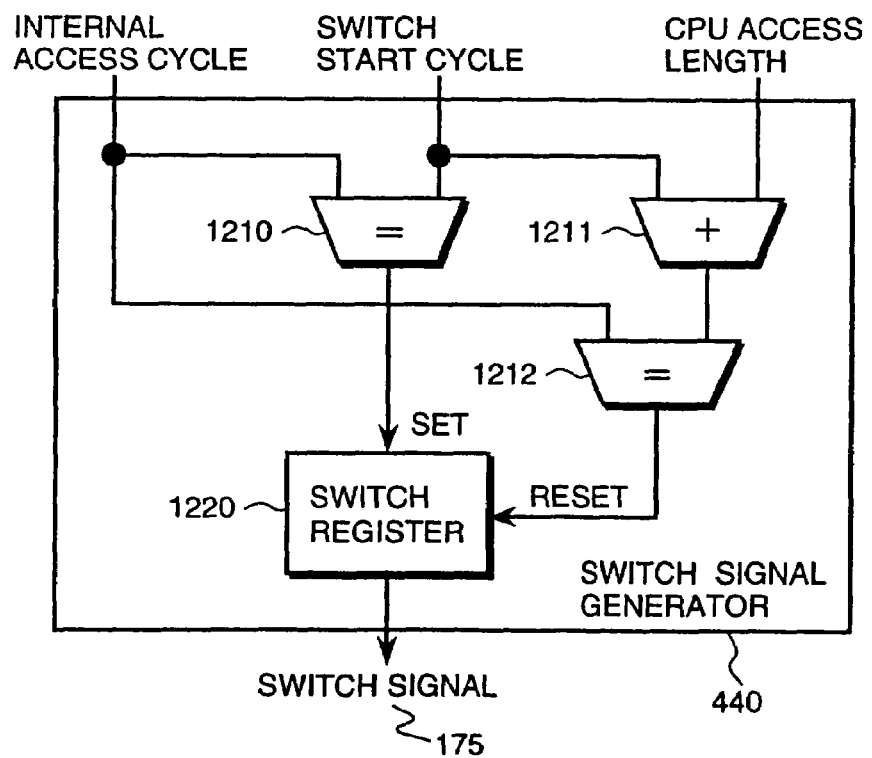
FIG. 12 is a block diagram showing the constitution of the switching signal occurrence circuit of the first embodiment.

In FIG. 12, the switching signal generation circuit 440 includes comparators 1210 and 1212, an adder 1211, a switching resister 1220.

In FIG. 12, when the internal access cycle is equal to the switching start cycle the comparator 1210 outputs 1. The adder 1211 outputs the sum of the switching start cycle and the CPU access length. When the internal access cycle is equal to the output value of the adder 1211, the comparator 1212 outputs 1. The switching register 1220 is set to 1 when the output value of the comparator 1210 is 1 and reset to 0 when the output value of the comparator 1212 is 1. The switching register 1220 outputs the held value as the switching signal 175.

Next, the constitution of the stop processing circuit 441 shown in FIG. 4 will be described with reference to FIG. 13.

Figure 13:
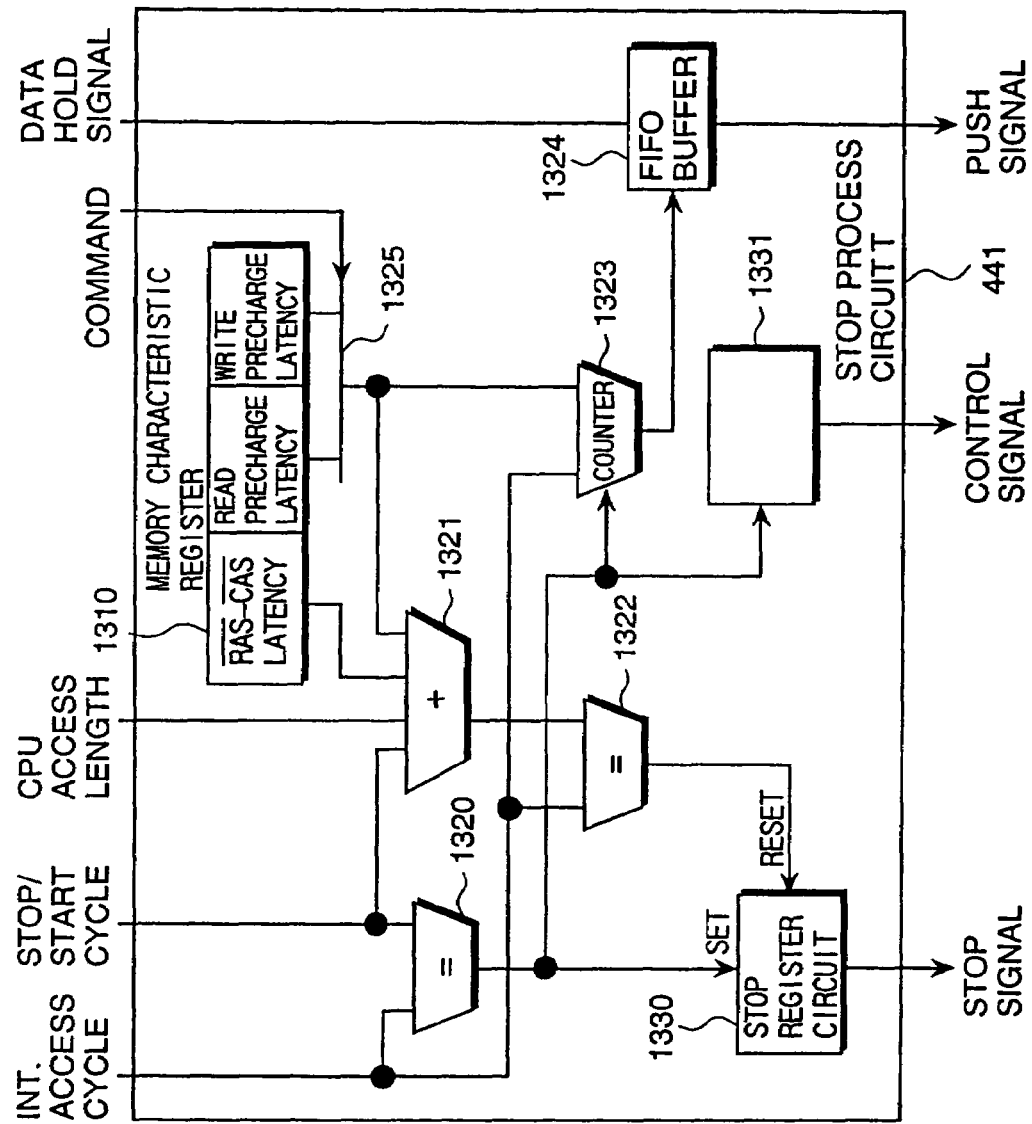
FIG. 13 is a block diagram showing the constitution of the stop processing circuit of the first embodiment.

In FIG. 13, the stop processing circuit 441 includes a memory characteristic register 1310, comparators 1320 and 1322, an adder 1321, a counter 1323, an FIFO buffer 1324, a selector 1325, a stop register 1330, a precharger issue circuit 1331.

In FIG. 13, the memory characteristic register 1310 is a register holding a RAS-CAS latency, a read precharge latency, and a write precharger latency. The comparator 1320 outputs 1 when the internal access cycle is equal to the stop start cycle. The selector 1325 outputs the read or write precharger latency depending on the command outputted from the decoder 411. The adder 1321 outputs the sum of the stop start cycle, CPU access length, RAS-CAS latency, and output value of the selector 1325. The comparator 1322 outputs 1 when the internal access cycle is equal to the sum of the adder 1321. The counter 1323 outputs 1 for the count shown by the output value of the selector 1325 at the timing that the output value of the comparator 1320 becomes 1. The FIFO buffer 1324 holds a data holding signal and outputs the held data holding signal as a push signal at the timing when the output value of the counter 1323 becomes 1. The stop register 1330 is set to 1 when the output value of the comparator 1320 is 1 and reset to 0 when the output value of the comparator 1322 is 1. The value held by the stop register 1330 is outputted as the stop signal 173. The precharger issue circuit 1331 outputs a control signal for precharging the memory 120 to the internal bus 153 at the timing when the output value of the comparator 1320 becomes 1.

Figure 14:
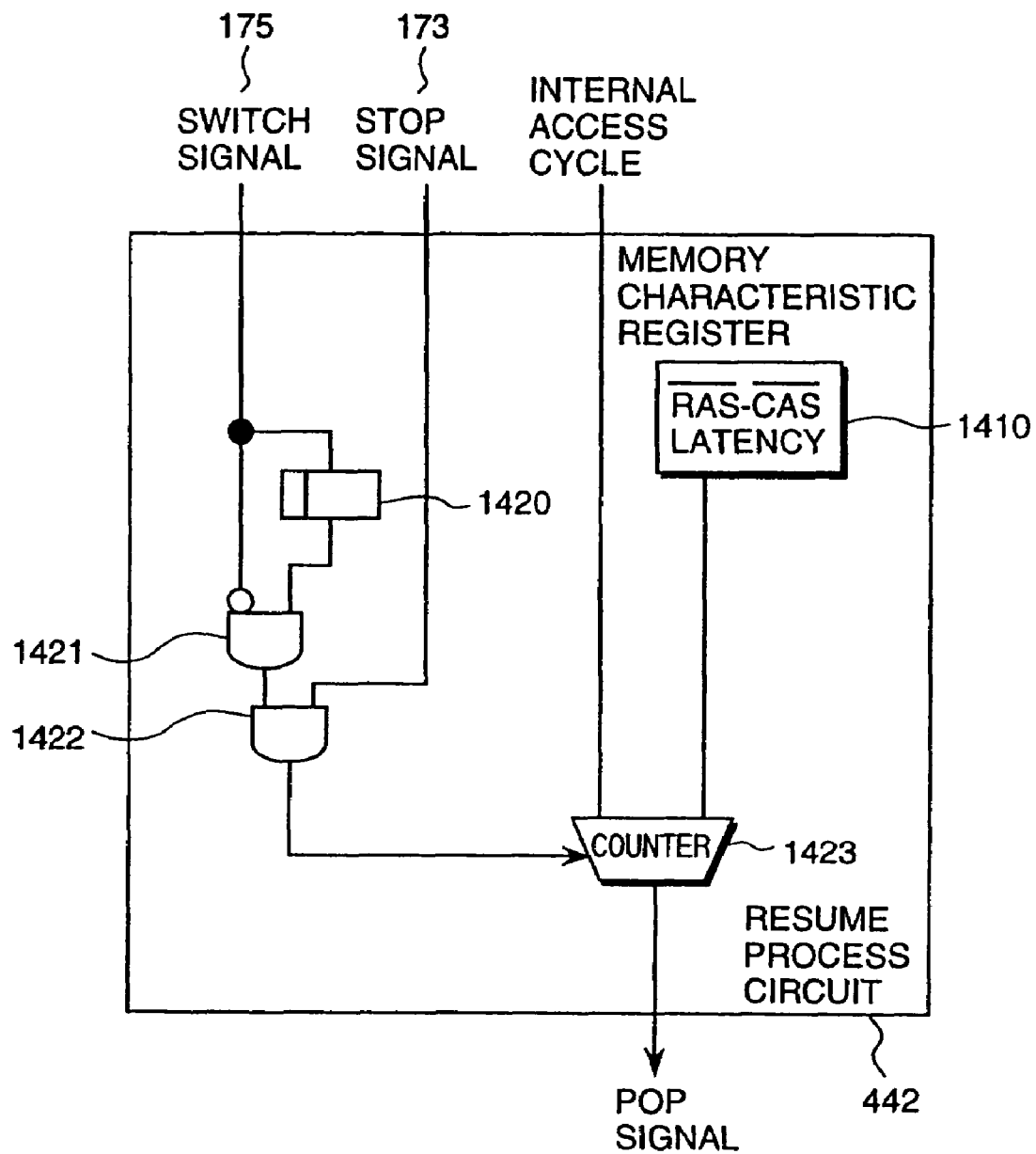
FIG. 14 is a block diagram showing the constitution of the restart processing circuit of the first embodiment.

An example of the restart processing circuit 442 shown in FIG. 14 will be described with reference to FIG. 14. In FIG. 14, the restart processing circuit 442 includes a memory characteristic register 1410, a latch 1420, AND circuits 1421 and 1422, and a counter 1423.

In FIG. 14, the memory characteristic register 1410 is a register holding a RAS-CAS latency. The AND circuit 1421 outputs 1 at the timing that the switching signal 175 is switched from 1 to 0. The AND circuit 1422 outputs 1 when the output value of the AND circuit 1421 is 1 and the stop signal 173 is 1. The counter 1423 outputs 1 as a pop signal for the RAS-CAS latency cycle at the timing when the output value of the AND circuit 1422 becomes 1.

The memory bus control circuit 170 has been explained above.

Next, the constitution of the holding buffer 180 shown in FIG. 1 will be described with reference to in FIG. 15.

Figure 15:
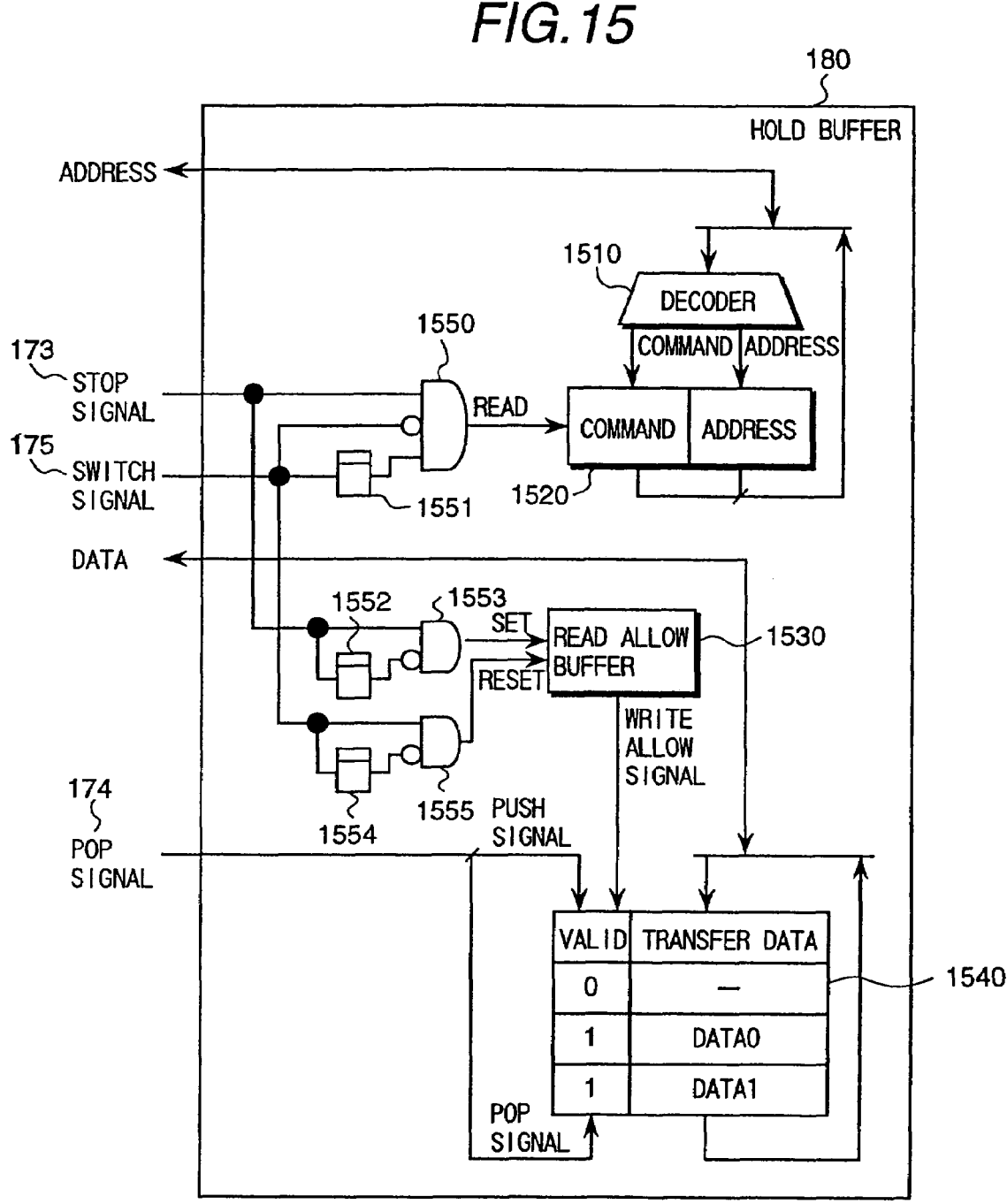
FIG. 15 is a block diagram showing the constitution of the holding buffer of the first embodiment.

In FIG. 15, the holding buffer 180 includes a decoder 1510, a suspended access register 1520, a write permission buffer 1530, a data holding register 1540, AND circuits 1550, 1553,1555 and latches 1551,1552, and 1554.

In FIG. 15, the decoder 1510 decodes an access request read from the internal bus 153 and outputs a command indicating whichever the suspended access is, reading or writing and the suspended address of the suspended access. The AND circuit 1550 outputs 1 at the timing that the switching signal 175 is switched from 1 to 0 and the stop signal 730 is 1. The suspended access register 1520 holds a command and the suspended address and outputs the held command and suspended address to the internal bus 153 at the timing that the output value of the AND circuit 1550 becomes 1. The AND circuit 1553 outputs 1 at the timing when the stop signal 173 is switched from 0 to 1. The AND circuit 1550 outputs 1 at the timing when the switching signal 750 is switched from 0 to 1. The write permission buffer 1530 is set to 1 when the output value of the AND circuit 1553 is set to 1 when the output value of the AND circuit 1553 is 1 and reset to 0 when the output value of the AND circuit 1555 is 1. The write permission buffer 1530 outputs the held value as a write permission signal. The data holding register 1540 reads data from the internal bus 153 while the write permission signal is 1 and holds a push signal as a valid flag at the same time. The data holding register 1540 also outputs the held data to the internal bus 153 in the reading order while a pop signal is 1. In this case, only when the valid flag is 1, the data holding register 1540 outputs valid data.

Each unit of the memory controller 140 has been explained in detail above.

Details realized by the aforementioned operation of each unit among the operations of this data processor whose outline has been described previously will be indicated below.

Figure 16:
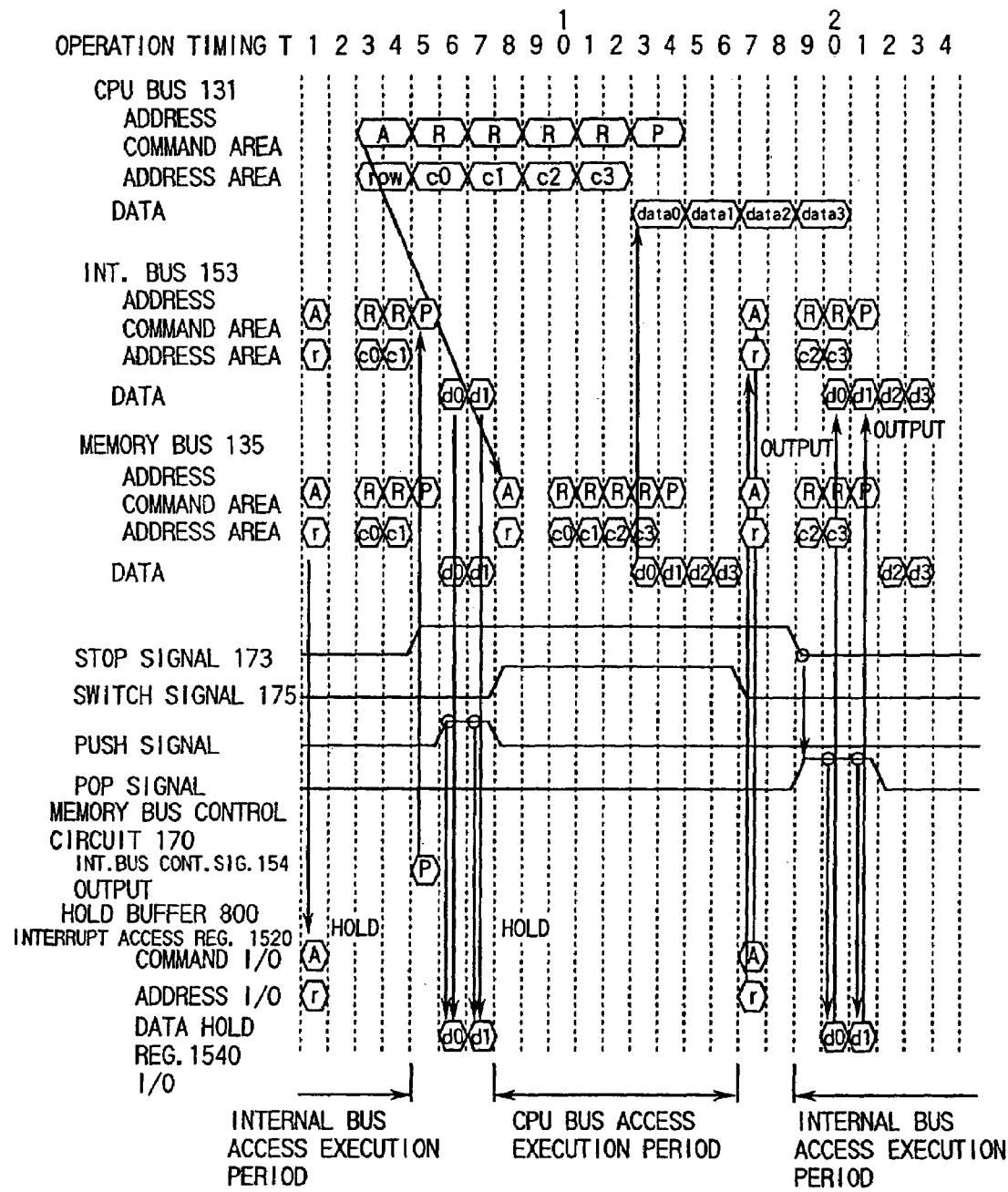
FIG. 16 is a timing chart showing an operation example of the first embodiment.

FIG. 16 shows a case in which a read access request is issued from the CPU bus 131 during execution of read access from the internal bus 153. FIG. 16 also shows 5 cycles of transfer time, 2 cycles of RAS-CAS latency, 3 cycles of CAS latency, and 3 cycles of read precharge latency. The operation timing T of the memory bus 135 is represented as one cycle.

In FIG. 16, read access from the internal bus 153 starts at T=1. At this timing, the read command and row address of read access are registered in the holding buffer 180. A read access request occurs from the-CPU bus 131 at T=3. However, to execute the access from the CPU bus 131 in a transfer time of 5 cycles, it is necessary to switch the memory bus 135 to access from the CPU bus 131 at T=8 and to suspend the read access in execution. Therefore, the stop signal 173 becomes 1 at T=5. Although the switching signal 175 becomes 1 at T=8, read data is transferred from the memory 120 at the timing of T=6 and T=7 by the read command issued at the timing of T=3 and T=4, so that the push signal is set to 1 at T=6 and T=7 and data d0 and d1 are held in the holding buffer 180. To suspend the access in execution and execute the access from the CPU bus 131 at T=8, a precharge command is outputted to the internal bus 153 from the memory bus control circuit 170 at T=5. The switching signal 175 is set to 1 at T=8 and the read access from the CPU bus 131 is executed until T=16. The switching signal 175 becomes 0 at T=17 and the command and row address held by the holding buffer 800 are outputted to the internal bus 153 at this timing. The stop signal 173 becomes 0 at T=19 and the pop signal becomes 1 in synchronization with it. The pop signal is kept at 1 between T=19 and T=21. However, since no valid data is held, no data is outputted to the internal bus 153 at T=19. At T=20 and T=21, the data d0 and d1 are outputted to the internal bus 530.

Figure 17:
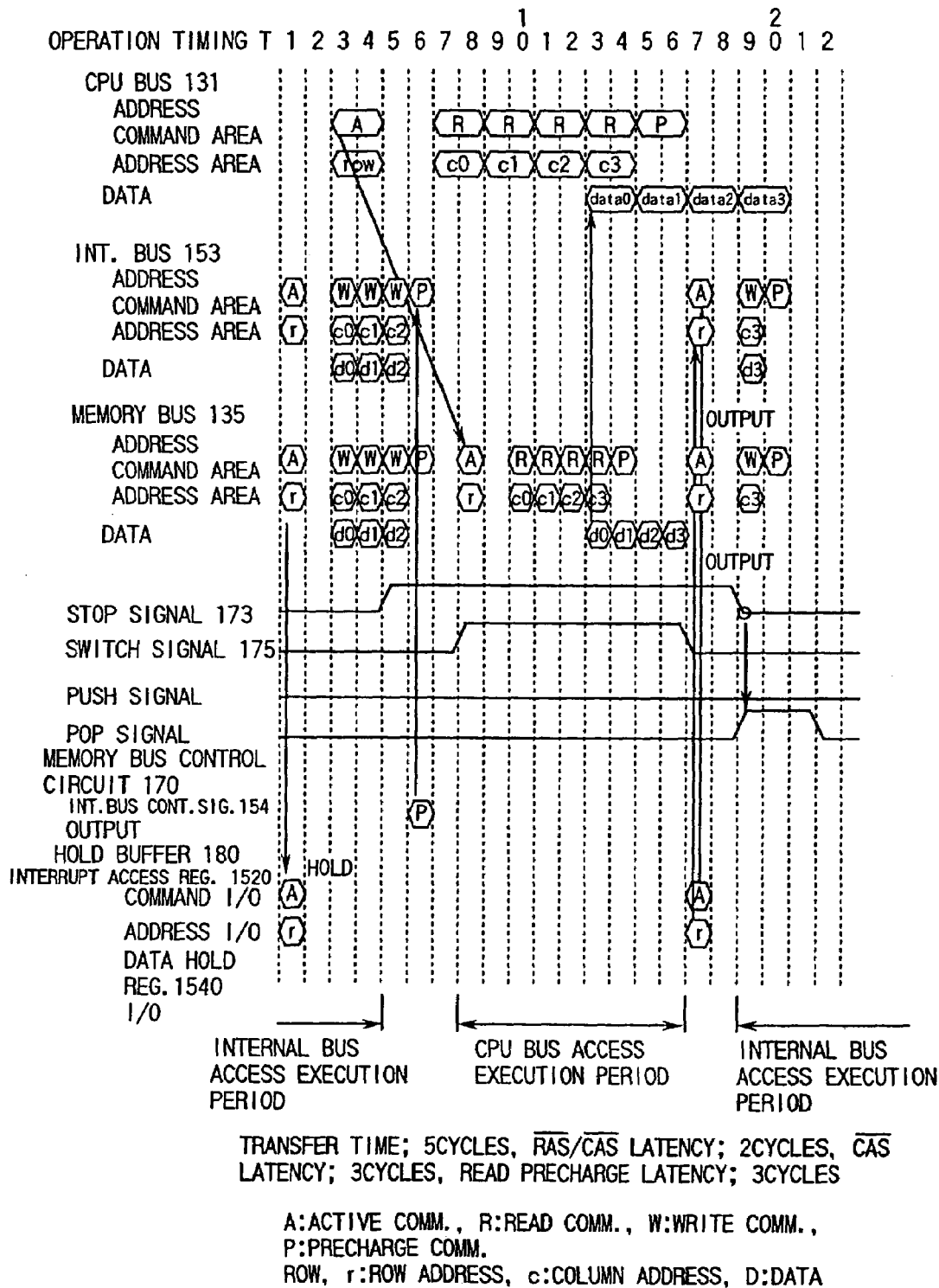
FIG. 17 is a timing chart showing an operation example of the first embodiment.

Next, an example in which a read access request is issued from the CPU bus 131 during execution of write access from the internal bus 153 is shown in FIG. 17 as a time chart of 5 cycles of transfer time, 2 cycles of RAS-CAS latency, 0 cycle of CAS latency, and 2 cycles of write precharge latency. The time chart shown in FIG. 17 is represented on the basis of the operation timing T of the memory bus 135.

In FIG. 17, write access, from the internal bus 153 starts at T=1. At this timing, the write command and row address of write access are registered in the holding buffer 180. A read access request occurs from the CPU bus 131 at T=3. However, to execute the access from the CPU bus 131 in a transfer time of 5 cycles, it is necessary to switch the memory bus 135 to access from the CPU bus 131 at T=8 and to suspend the write access in execution. Therefore, the stop signal 173 becomes 1 at T=6. To execute the access from the CPU bus 131 at T=8, a precharge command is outputted to the internal bus 153 from the memory bus control circuit 170 at T=6. The switching signal 175 is set to 1 at T=8 and the read access from the CPU bus 131 is executed until T=16. The switching signal 175 becomes 0 at T=17 and the command and row address held by the holding buffer 800 are outputted to the internal bus 153 at this timing. The stop signal 173 become 0 at T=19 and the pop signal becomes 1 in synchronization with it. The pop signal is kept at 1 between T=19 and T=21. However, there is no data held in the holding buffer 180 when the suspended access is a write command, so that no valid data is outputted from the holding buffer 180.

The first embodiment of the present invention has been explained above.

Figure 18:
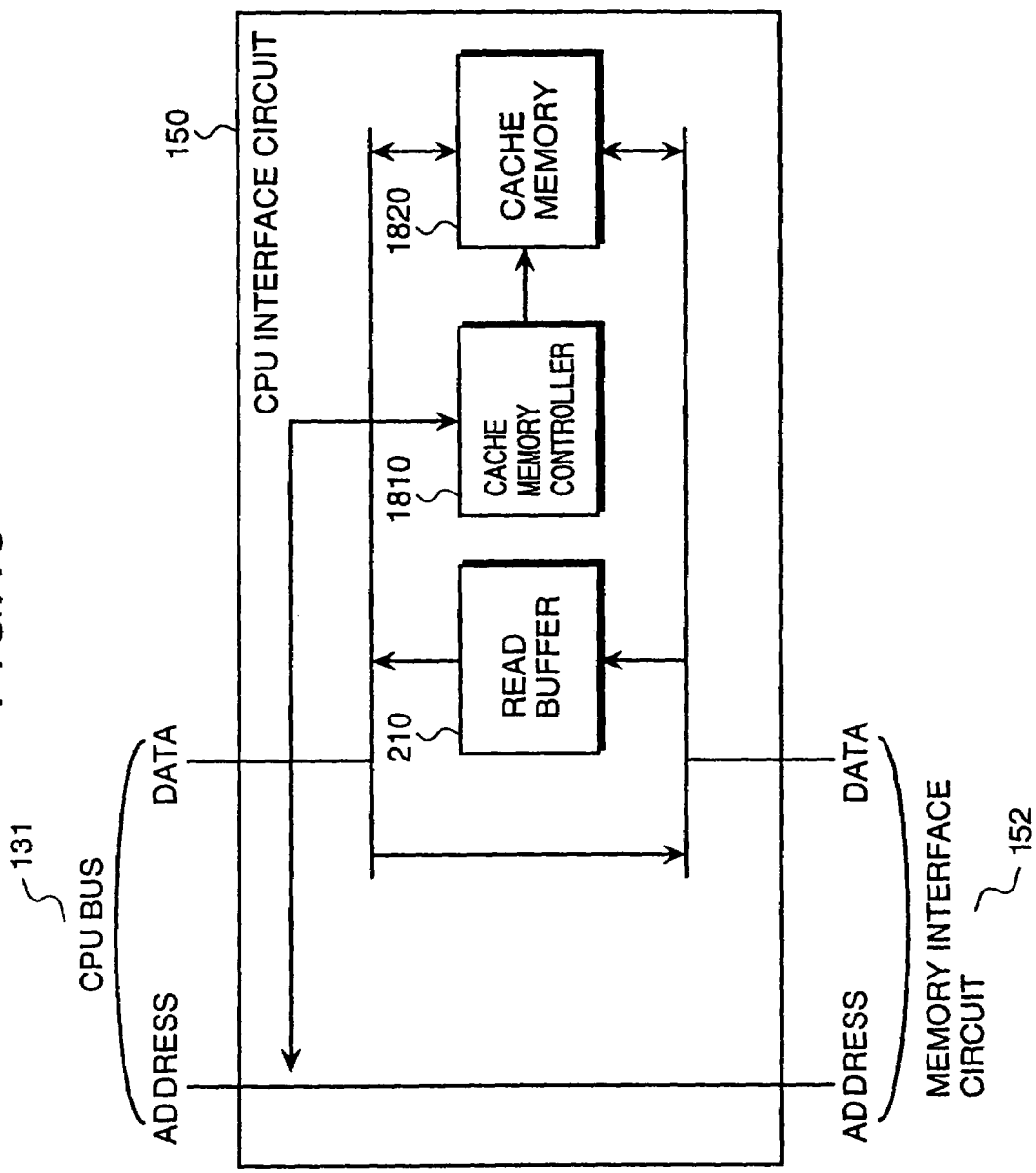
FIG. 18 is a block diagram showing the second constitution of the CPU interface circuit of the first embodiment.

The CPU interface circuit 150 shown in FIG. 1 may be structured as shown in FIG. 18.

In FIG. 18, numeral 210 indicates a read buffer, 1810 denotes a cache memory control circuit, and 1820 denotes a cache memory.

In FIG. 18, the cache memory control circuit 1810 and the cache memory control circuit 1810 decodes an access request from the CPU bus 131 and checks whether the corresponding data is registered in the cache memory 1820. When it is registered, the cache memory control circuit 1810 does not transfer the access request from the CPU bus 131 to the memory interface circuit 152 but outputs data to the CPU bus 131 from the cache memory 1820 in the case of read access and registers data from the CPU bus 131 in the cache memory 1820 in the case of write access. When it is not registered, the cache memory control circuit 1810 transfers the access request to the memory interface circuit 152 and stores the read data w. To control the replacement of the content of the cache memory, the cache memory control circuit 1810 also controls the writing of the content of the cache memory 1820 into the memory 120. A write request issued by the cache memory control circuit 1810 is processed in the memory controller 140 in the same way as with the write request from the CPU 100.

The cache memory 1820 has a capacity larger than that of the cache memory built in the CPU 100. When the large capacity cache memory 1820 is built in the CPU interface circuit 150 as a secondary cache, access to the memory 120 from the CPU 100 can be reduced, so that the frequency of suspension of access from the internal bus 153 can be reduced and the performance degradation of display and drawing due to memory unification can be reduced.

As mentioned above, according to the first embodiment, the waiting time for access to the memory 120 by the CPU 100 can be guaranteed by the aforementioned transfer time value. Therefore, compared with the conventional method, the degradation of processing performance can be reduced. Access from the internal bus 153 is forcibly suspended when access from the CPU 100 occurs, though the access sequence can be restarted from the suspended location after the access from the CPU 100 ends. Therefore, the reduction in access efficiency from the internal bus due to use of this embodiment is extremely small.

The second embodiment of the data processor of the present invention will be explained hereunder.

Figure 19:
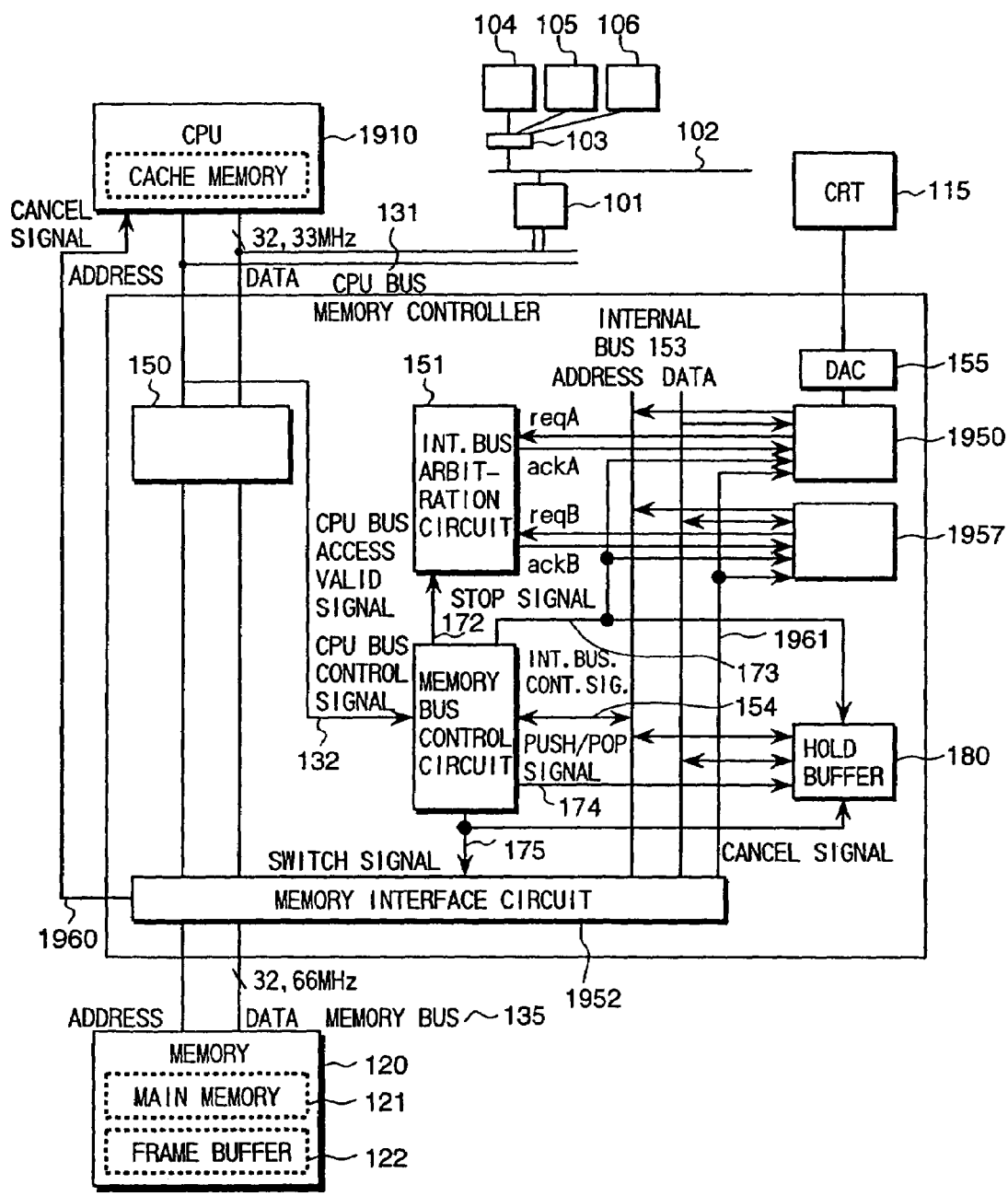
FIG. 19 is a block diagram showing the constitution of the data processor of the second embodiment.

The constitution of a data processor representing a second embodiment is shown in FIG. 19.

As shown in the drawing, the constitution of the data processor of the second embodiment is almost the same as that of the data processor of the first embodiment, and only the constitution of a memory interface circuit 1952 and a modification in which a cancel signal is sent from the memory interface circuit 1952 to a display controller 1956 and a rendering processor 1957 are different.

The memory interface circuit 1952 controls the predetermined address area of the memory 120 where access is permitted from the CPU 100 and the predetermined address of the memory 120 where access is permitted for the display controller 1956 and the rendering processor 1957. When an access request is issued for an address other than the permitted address areas, the memory interface circuit 1952 outputs a cancel signal 1960 for an access request from the CPU bus 131 and a cancel signal 1960 for an access request from the internal bus 153.

Figure 20:
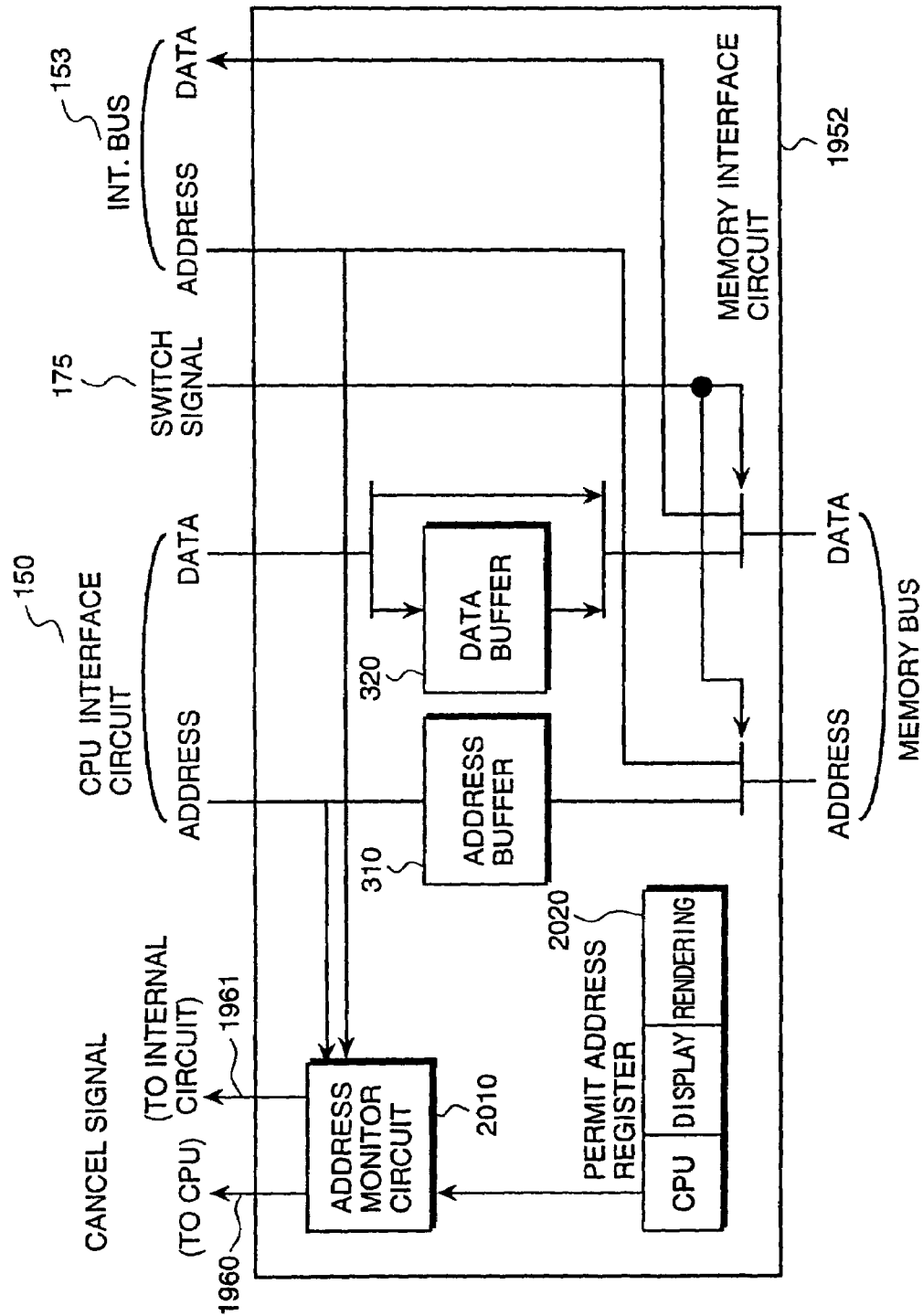
FIG. 20 is a block diagram showing the constitution of the memory interface circuit of the second embodiment.

The constitution of this memory interface circuit 1952 is shown in FIG. 20.

In FIG. 20, numeral 2010 indicates an address monitor circuit and 2020 indicates a permitted address register.

An example of the memory interface circuit 1952 shown in FIG. 19 will be described with reference to FIG. 20. In FIG. 20, numeral 2010 indicates an address monitor circuit and 2020 indicates a permitted address register. The other elements are the same as the elements to which the same numerals are assigned in the first embodiment.

In FIG. 20, in the permitted address register 2020, the access permitted addresses for the CPU 1910, the display controller 1956, and the rendering processor 1957 are registered. The address monitor circuit 2010 checks access requests from the CPU bus 131 and the internal bus 153. When there is access to other than the permitted area, the access monitor circuit 2010 outputs the cancel signal 1960 or 1961 and notifies that it is incorrect access.

When the memory interface circuit 1952 for monitoring addresses and outputting the cancel signals 1960 and 1961 like this when an access request to other than the access permitted address area is issued is installed, malwriting due to incorrect access to data in the memory 120 can be prevented and the system reliability can be improved.

A third embodiment of the present invention will be explained hereunder.

Figure 21:
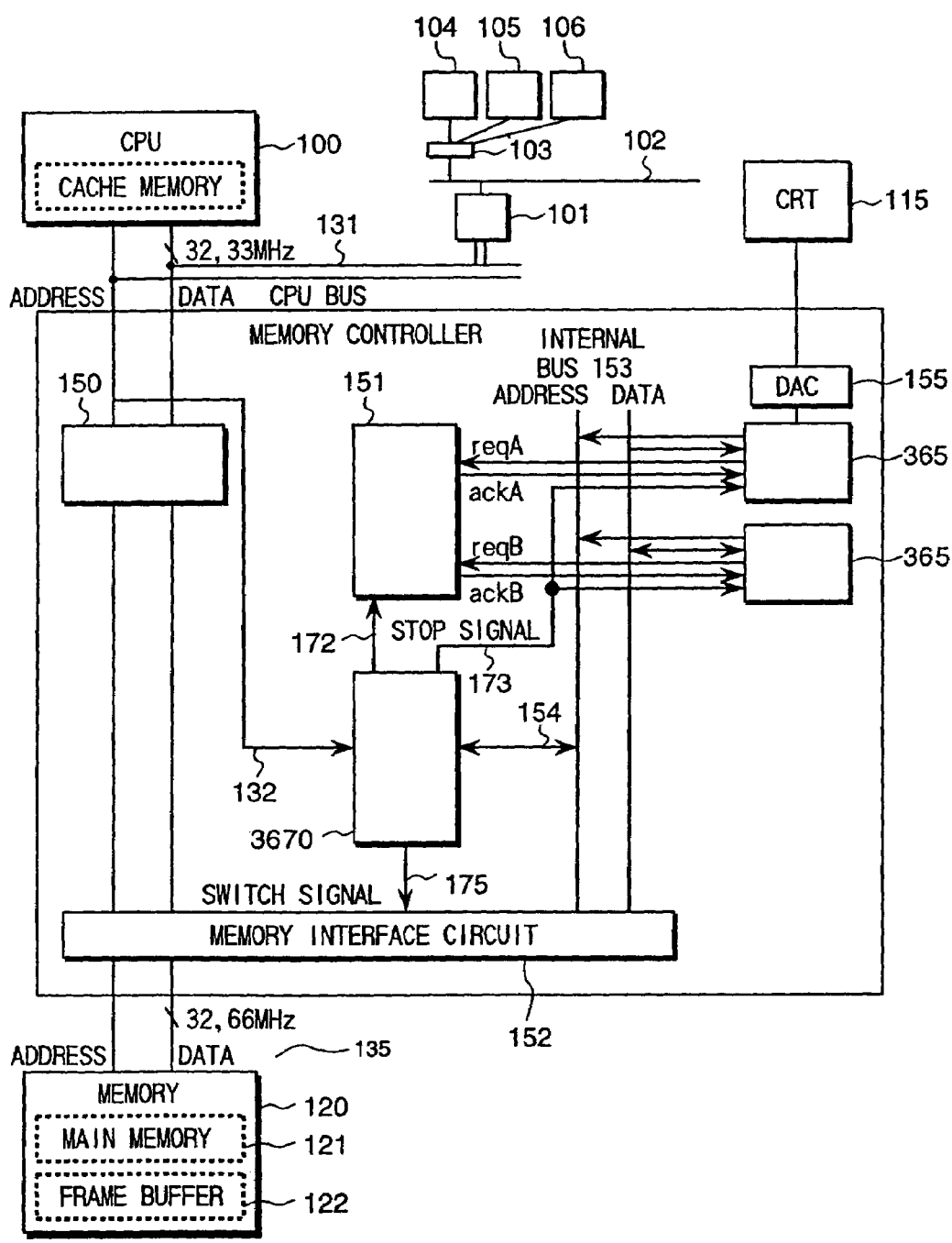
FIG. 21 is a block diagram showing the constitution of the data processor of the third embodiment.

The constitution of the data processor of the third embodiment is shown in FIG. 21.

In FIG. 21, numeral 3656 indicates a display controller, 3657 denotes a rendering processor, and 3670 denotes a memory bus control circuit. The other units are the same as the units to which the same numerals are assigned in FIG. 1. As shown in the drawing, the third embodiment has a constitution in which the holding buffer 180 is omitted from the first embodiment shown in FIG. 1.

Firstly, an outline of the operation of the data processor of the third embodiment will be explained.

In the data processor, the operation when one of the CPU 100, the display controller 3656, and the rendering processor 3657 accesses the memory 120 and the memory bus 135 executes no valid memory access is the same as the operation in the first embodiment. The operation when an access request is issued from the internal bus 153 during memory access by the CPU 100 is also the same as that of the first embodiment.

On the other hand, if an access request is issued from the CPU 100 when the memory bus 350 is executing access from the internal bus 153, the data processor operates as described below.

Even if access to the memory bus 135 from the internal bus 153 is by a read request or by a write request, the operation of the memory controller 140 which is a center of operation is not changed. Therefore, a case in which an access request from the CPU 100 occurs when the rendering processor 3657 is executing a read access will be explained hereunder as an example.

When an access request is outputted from the CPU 100, the CPU bus control signal 132 is inputted to the memory bus control circuit 3670 in the same way as with the first embodiment. The memory bus control circuit 3670 sets the switching signal 175 to 1 and allows execution of access from the CPU 100 at the same timing as that when the memory bus 135 executes no valid memory access. When the memory access by the rendering processor 3657 does not end before the switching signal 175 becomes 1, the memory bus control circuit 3670 sets the stop signal 173 to 1 before setting the switching signal 175 to 1 and indicates a the halting of the access in execution at present to the rendering processor 3657. When the stop signal 173 becomes 1 during execution of the access, the rendering processor 3657 makes the data read up to halfway invalid and stops until the stop signal 173 becomes 0.

The memory bus control circuit 3670 stops the memory access of the rendering processor 3657 in this way and then sets the switching signal 175 to 1 and allows execution of an access by the CPU 100. When the access by the CPU 100 ends, the memory bus control circuit 3670 sets the switching signal 175 to 0 and allows execution of an access to the memory 120 from the internal bus 153. The memory bus control circuit 3670 sets the switching signal 175 to 0 and also sets the stop signal 173 to 0 at the same time. When the stop signal 173 becomes 0, the rendering processor 3657 which is stopped executes the access which has been suspended due to changing of the stop signal 173 from 0 to 1 from the beginning of the side.

The constitution of the memory bus control circuit 3670 for controlling such an operation will be described with reference to FIG. 22.

Figure 22:
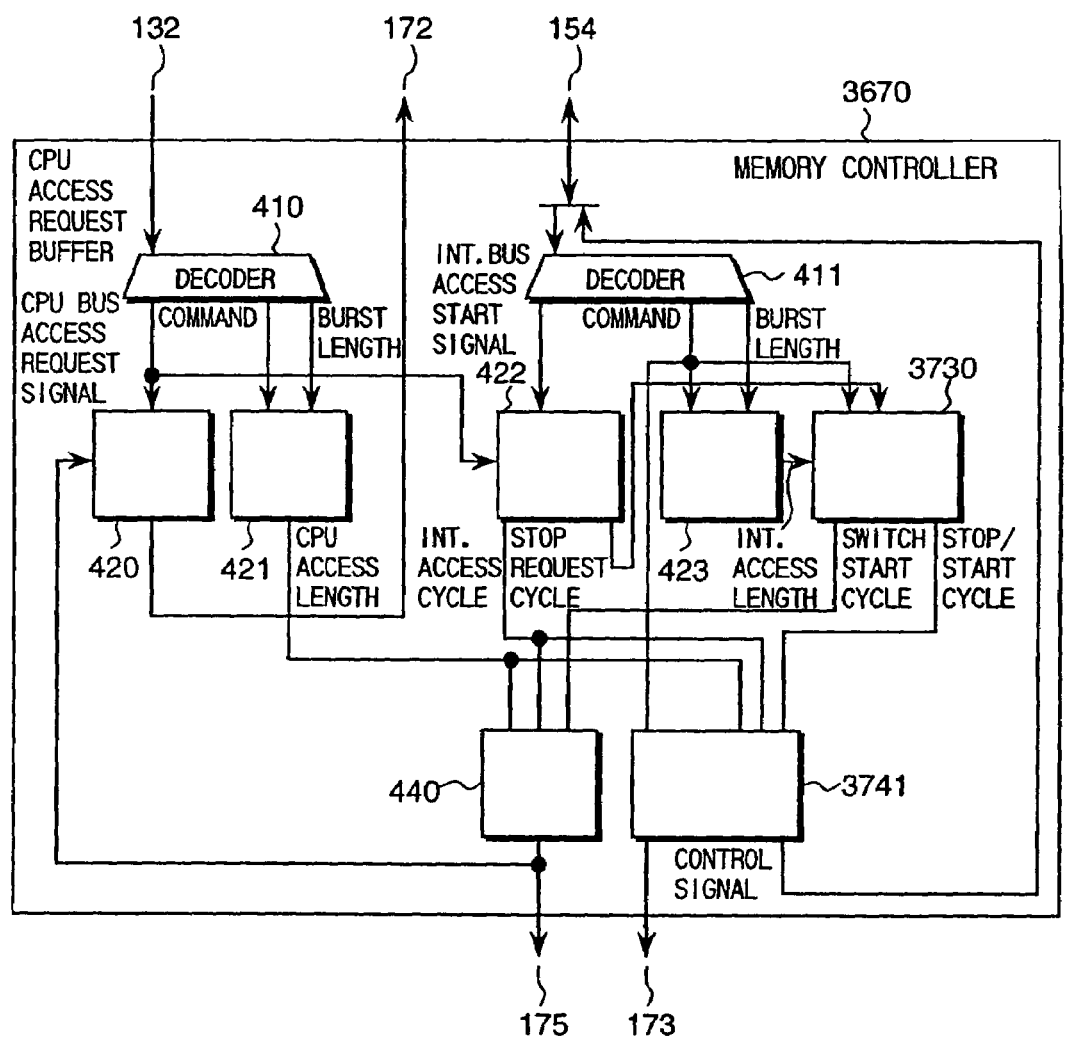
FIG. 22 is a block diagram showing the constitution of the memory bus control circuit of the third embodiment.

In FIG. 22, numeral 3730 indicates a stop decision circuit and 3741 indicates a stop processing circuit. The other elements are the same elements as the elements to which the same numerals are assigned in the first embodiment.

The stop decision circuit 3730 outputs the switching start cycle indicating the timing for setting the switching signal 175 to 1 and the stop start cycle indicating the timing for setting the stop signal 173 to 1 on the basis of a command outputted from a decoder 4411, a stop request cycle outputted from the internal bus access counter 422, and an internal access length outputted from the internal bus access length calculation circuit 423. The stop processing circuit 3741 outputs the stop signal 173 on the basis of a command outputted from the decoder 411, a CPU access length outputted from the CPU bus access length calculation circuit 421, an internal access cycle outputted from the internal bus access counter 422, and the stop start cycle. When it is necessary to suspend the access from the internal bus 153 which is in execution at present, the stop processing circuit 3741 outputs a signal for precharging the memory 120 to the internal bus 153 as a control signal.

Figure 23:
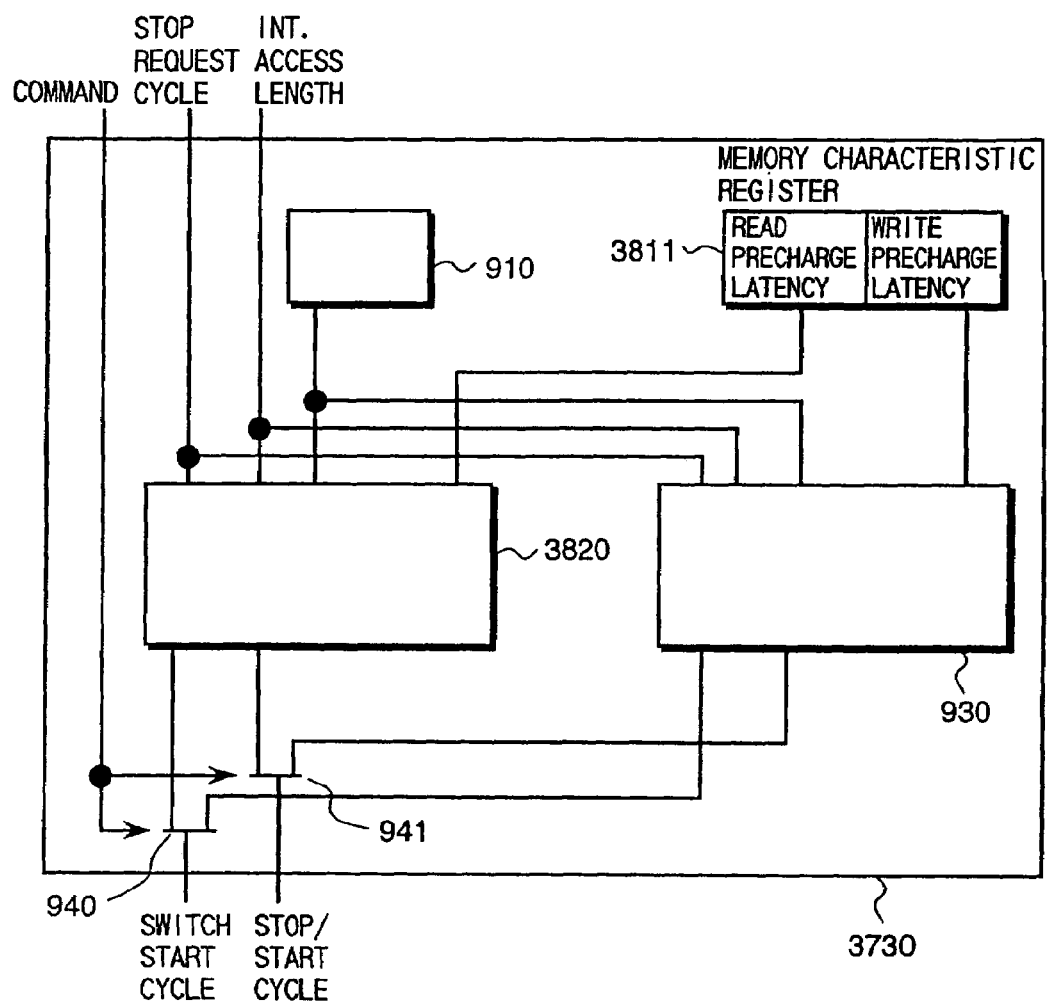
FIG. 23 is a block diagram showing the constitution of the stop decision circuit of the third embodiment.

The constitution of the stop decision circuit 3730 shown in FIG. 22 is shown in FIG. 23.

In the drawing, numeral 3811 indicates a memory characteristic register and 3820 indicates a read stop decision circuit. The other elements are the same elements as the elements to which the same numerals are assigned in the first embodiment.

The memory characteristic register 3811 holds the read and write precharge latencies. The read stop decision circuit 3820 outputs the switching start cycle indicating the timing for setting the switching signal 175 during execution of read access to 1 and the stop start cycle indicating the timing for setting the stop signal 173 to 1 on the basis of the stop request cycle, internal access length, transfer time, and read latency.

The selectors 940 and 941 select an output from the read stop decision circuit 3820 or an output from the write stop decision circuit 930 according to a command outputted from the decoder 411 and output it as a switching start cycle or a stop start cycle.

Figure 24:
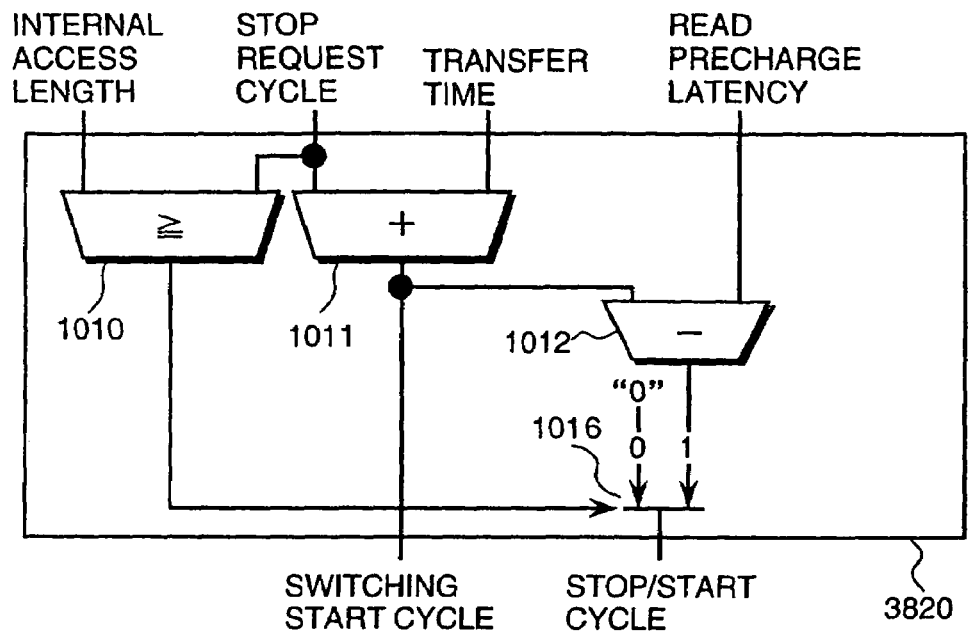
FIG. 24 is a block diagram showing the constitution of the reading stop decision circuit of the second embodiment.

The constitution of the read stop decision circuit 3820 shown in FIG. 23 will be described with reference to FIG. 24.

In the drawing, the comparator 1010 outputs 1 when the internal access length is the stop request cycle or more and 0 when it is not. The adder 1011 calculates and outputs the switching start cycle from the stop request cycle and transfer time. The subtracter 1012 subtracts the read precharge latency from the switching start cycle and outputs the difference. The selector 1016 outputs the output value of the subtracter 1012 as a stop start cycle when the output value of the comparator 1010 is 1 and a default value of 0 as a stop start cycle when it is not.

Figure 25:
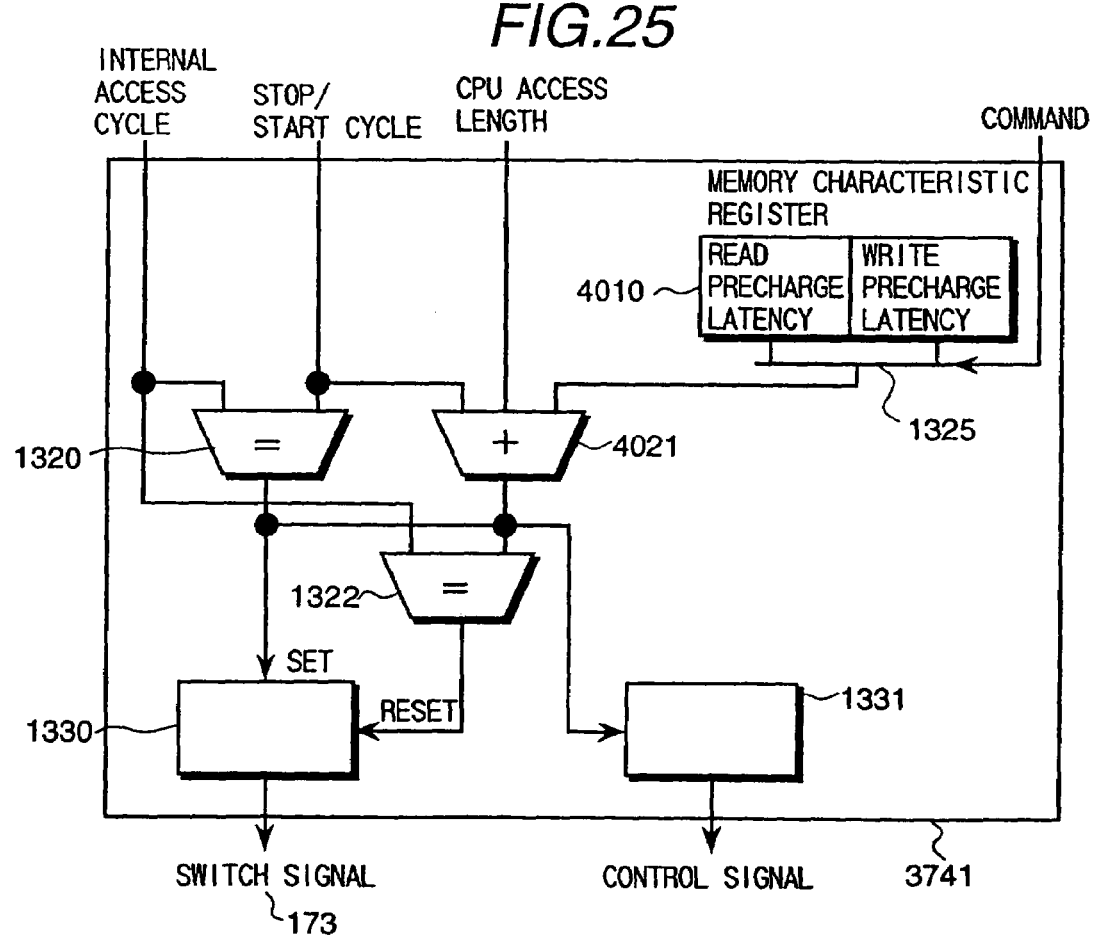
FIG. 25 is a block diagram showing the constitution of the stop processing circuit of the third embodiment.

Next, the constitution of the stop processing circuit 3741 shown in FIG. 22 will be described with reference to FIG. 25.

In the drawing, numeral 4010 indicates a memory characteristic register and 4021 indicates an adder.

The memory characteristic register 4010 holds the read and write precharge latencies. The comparator 1320 outputs 1 when the internal access cycle is equal to the stop start cycle. The adder 4021 outputs the sum of the stop start cycle, CPU access length, and output value of the selector 1325. The comparator 1322 outputs 1 when the internal access cycle is equal to the output value of the adder 4021. The stop register 1330 is set when the output value of the comparator 1322 is 1. A value held in the stop register 1330 is outputted as a stop signal 173.

An actual example of the operation whose outline has been described before which is realized by the aforementioned constitution will be indicated hereunder.

Figure 26:
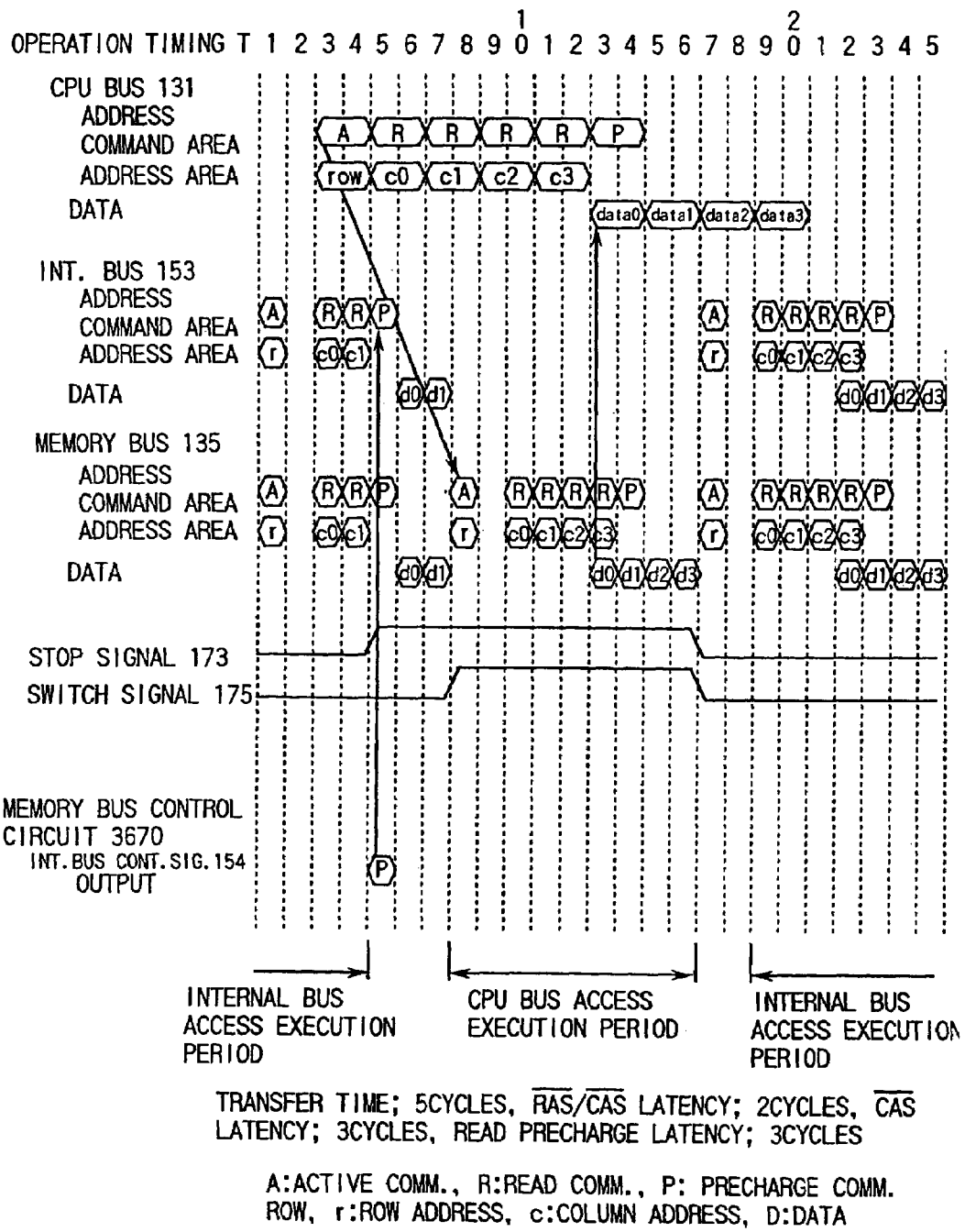
FIG. 26 is a timing chart showing an operation example of the third embodiment.

FIG. 26 shows a timing chart when a read access request is generated from the CPU bus 131 during execution of the read access from the internal bus 153. In this example, the transfer time is 5 cycles, the RAS-CAS latency 2 cycles, the CAS latency 3 cycles, and the read precharge latency 3 cycles.

In FIG. 26, read access from the internal bus 153 starts at T=1. A read request from the CPU bus is generated at T=3. However, to execute the access from the CPU bus 131 in a transfer time of 5 cycles, it is necessary to switch the memory bus to access from the CPU 131 at T=8. For that reason, to set the stop signal 173 to 1 at T=3, suspend the access in execution from the internal bus 153, and allow access from the CPU bus 131 at T=8, a precharge command is sent to the memory 120 by outputting the precharge command to the internal bus 153 from the memory bus control circuit 3670 at T=5. The switching signal 175 is set to 1 at T=8, and the read access from the CPU bus 131 is executed up to T=16, and the switch signal 175 is set to 1 and also the stop signal 173 is set to 0 at T=7 when the read access ends, and the stopped access from the internal bus 153 is restarted.

The third embodiment of the present invention has been explained above.

A fourth embodiment of the present invention will be explained hereunder.

Figure 27:
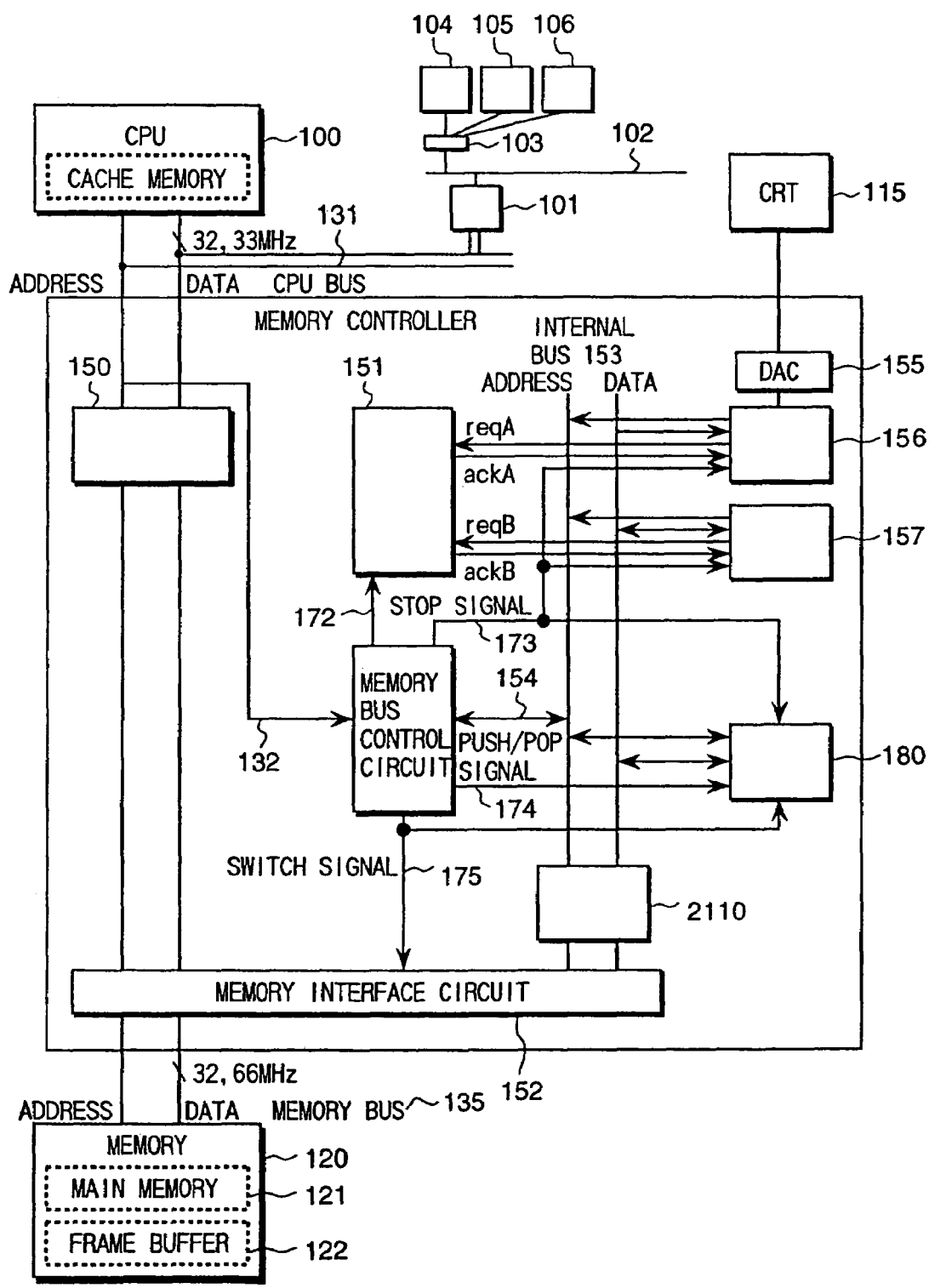
FIG. 27 is a block diagram showing the constitution of the data processor of the fourth embodiment.

The constitution of the data processor of the fourth embodiment is shown in FIG. 27.

As shown in the drawing, the data processor of the fourth embodiment has a constitution in which a compression and recovery circuit 2110 is added to the data processor of the first embodiment shown in FIG. 1.

In the data processor having the aforementioned constitution, when the write address at the time of the write access to the memory 120 from the internal bus 153 coincides with the predetermined address to be compressed, the compression and recovery circuit 2110 compresses the data sent from the internal bus 153 and when it does not coincide, the compression and recovery circuit 2110 outputs the data sent from the internal bus 153 to the memory bus 135.

When the read address at the time of the read access to the memory 120 from the internal bus 153 coincides with the address to be compressed, the compression and recovery circuit 2110 expands the dada sent from the memory bus 135 and when it does not coincide, the compression and recovery circuit 2110 outputs the data sent from the memory bus 135 to the internal bus 153 as it is.

As mentioned above, when the compression and recovery circuit 2110 for monitoring the address of access from the internal bus 153 and for selecting whether or not to execute the compression/expansion process depending on the address is installed, control such that, for example, the compression/expansion process is performed for access to the source data of the frame buffer 122 or the texture but the compression/expansion process is not performed for access to the display list of the rendering processor 157 is made possible. Therefore, control such that data in which it is necessary that data before compression and data which is expanded after compression coincide with each other like a display list is transferred as it is and data in which it is not always necessary that data before compression and data which is expanded after compression coincide with each other like pixel data in the frame buffer 122 is compressed and/or expanded and then transferred is made possible.

Therefore, the access time to the memory bus 135 from the internal bus 153 can be shortened with the data accuracy kept as required, and the frequency of suspension of the access from the internal bus 153 due to generation of access from the CPU bus 131 during execution of the access from the internal bus 153 can be reduced, and the performance degradation of display and drawing can be reduced in a constitution that may cause such a degradation. There are an advantage of valid use of the memory 130 and also an advantage that the CPU 100 can be released from the compression and recovery processes.

In the following explanation, a case where compression for reducing the amount of pixels is carried out by approximating the color of four pixels to the color of two pixels selected from the four pixels is used as an example. Therefore, in the following example, when compressed data is recovered, the original image before compression is not always recovered as it is.

Figure 28:
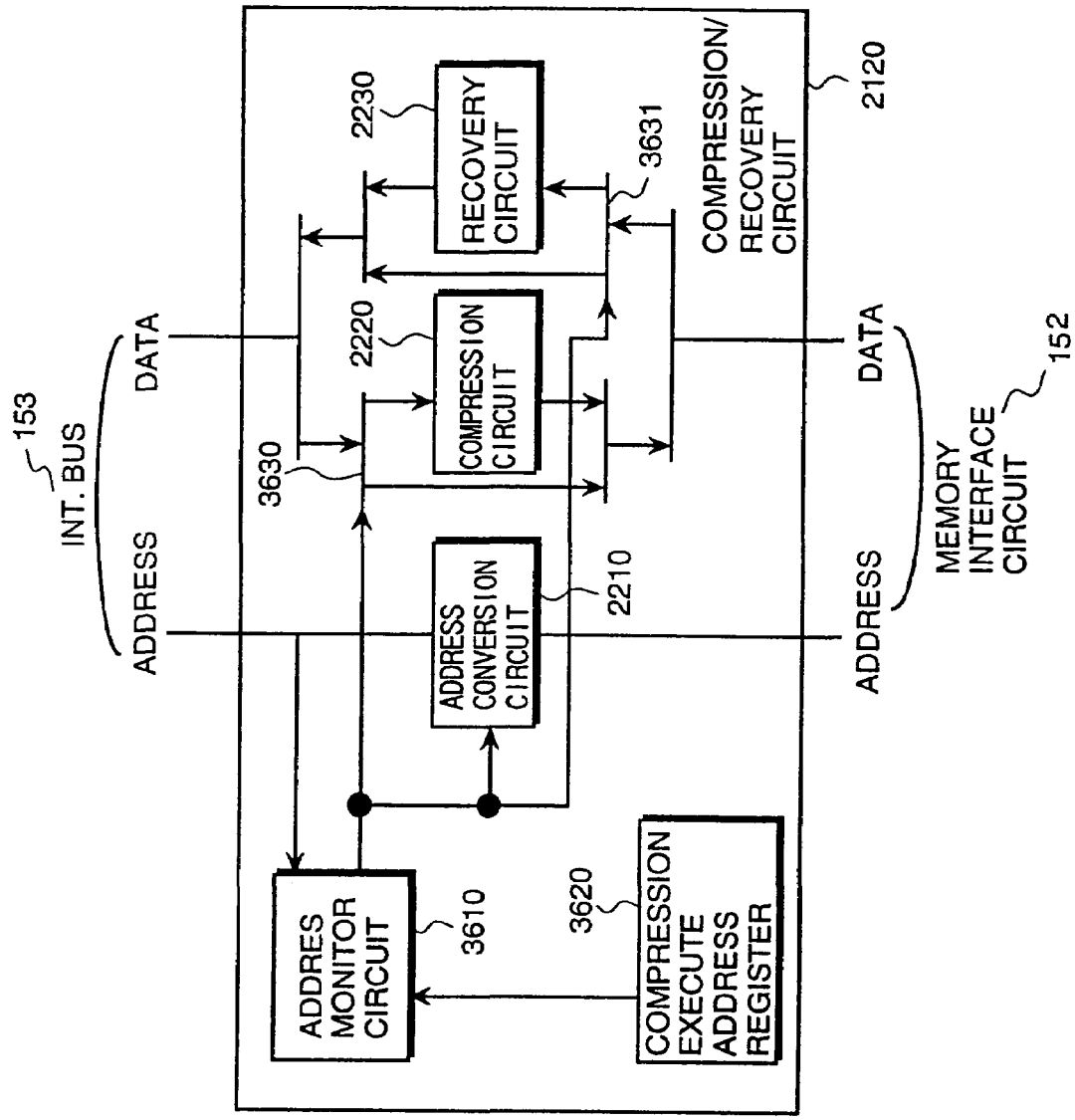
FIG. 28 is a block diagram showing the constitution of the compression recovery circuit of the fourth embodiment.

The constitution of the compression and recovery circuit 2110 performing such a process is shown in FIG. 28.

In the drawing, the circuit 2110 includes an address conversion circuit 2210, a compression circuit 2220, a recovery circuit 2230, an address monitor circuit 3610, a compression execution address register 3620, and selectors 3630 and 3631.

In FIG. 28, the compression execution address register 3620 is a register where an address to be compressed is registered. The address monitor circuit 3610 monitors an access request from the internal bus 153, compares it with the address registered in the compression execution address register 3620, and outputs the result as a selection signal.

The address conversion circuit 2210 selects whether or not to convert the address sent from the internal bus 153 by the selection signal to the address of the memory 120 storing the data which is obtained by compressing the data which is the target of the said address which is decided by the said address and the data size before and after compression and outputs it to the memory bus 135 via the memory interface circuit 152. The compression circuit 2220 compresses and outputs the data sent from the internal bus 153. The recovery circuit 2230 expands the data sent from the memory bus 135 and outputs it to the internal bus 153. The selectors 3630 and 3631 select and output one of the data compressed and/or recovered according to the selection signal and inputted data.

The constitution of the compression circuit 2220 shown in FIG. 28 will be described with reference to FIG. 29.

Figure 29:
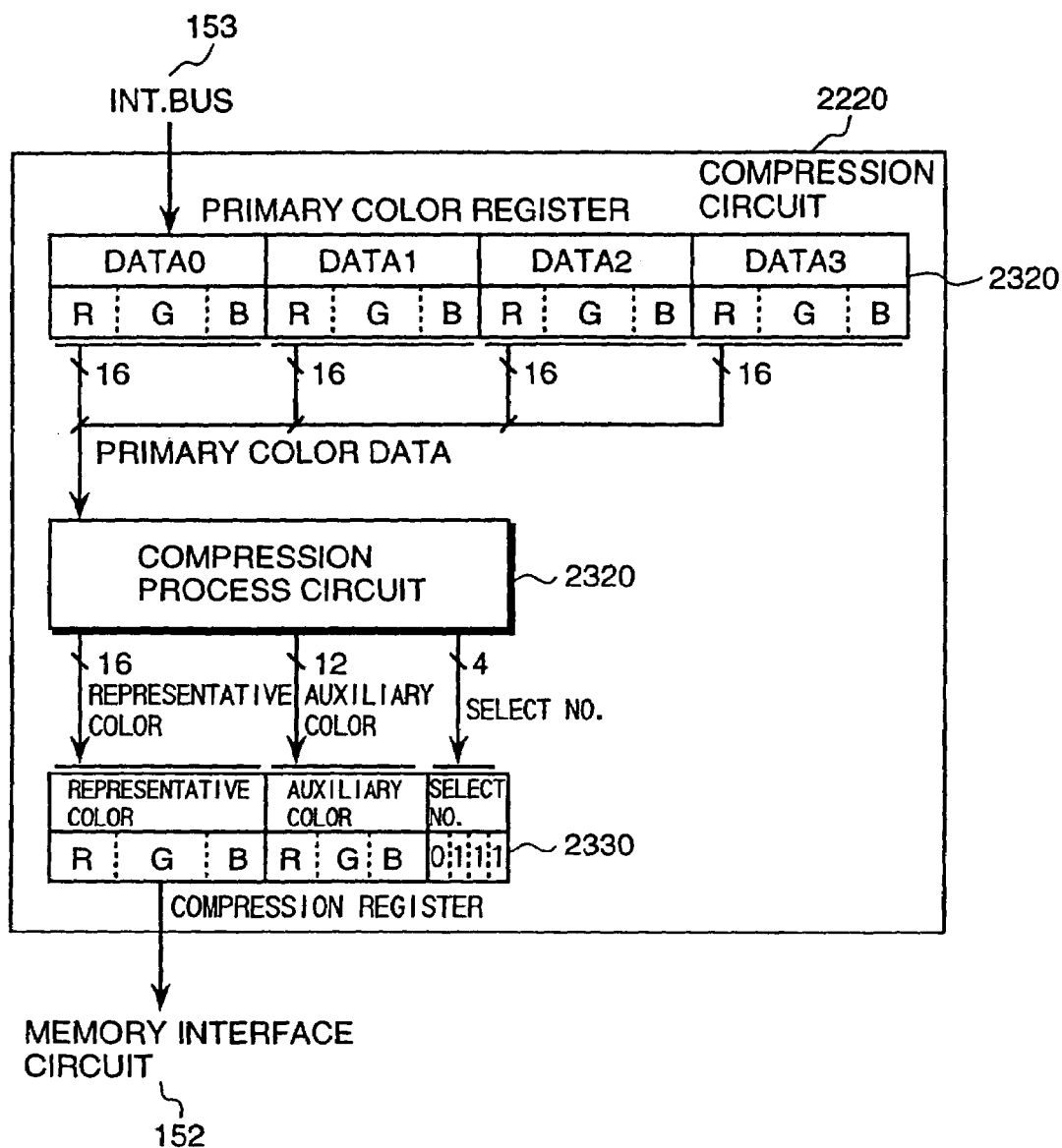
FIG. 29 is a block diagram showing the constitution of the compression circuit of the fourth embodiment.

In FIG. 29, numeral 2310 indicates a primary color register, 2320 denotes a compression processing circuit, and 2330 denotes a compression register.

In the drawing, it is assumed that data before compression is data in pixel units (16 bits per pixel) and comprises fields of R (red, 5 bits), G (green, 6 bits), and B (blue, 5 bits). A case where the display controller 156 reads and accesses this pixel data from the frame buffer 122 will be explained hereunder as an example.

In FIG. 29, the primary color register 2310 is a register for holding data of four pixels before compression which is outputted from the internal bus 153. The primary color register 2310 outputs the held data as primary color data. The compression processing circuit 2320 compresses the primary color data and outputs the representative color (16 bits), auxiliary color (12 bits), and selection number (4 bits). The compression register 2330 is a register holding the representative color, auxiliary color, and selection number. The compression register 2330 outputs the held data to the memory interface circuit 152.

The constitution of the compression processing circuit 2320 shown in FIG. 29 will be described with reference to FIG. 30.

Figure 30:
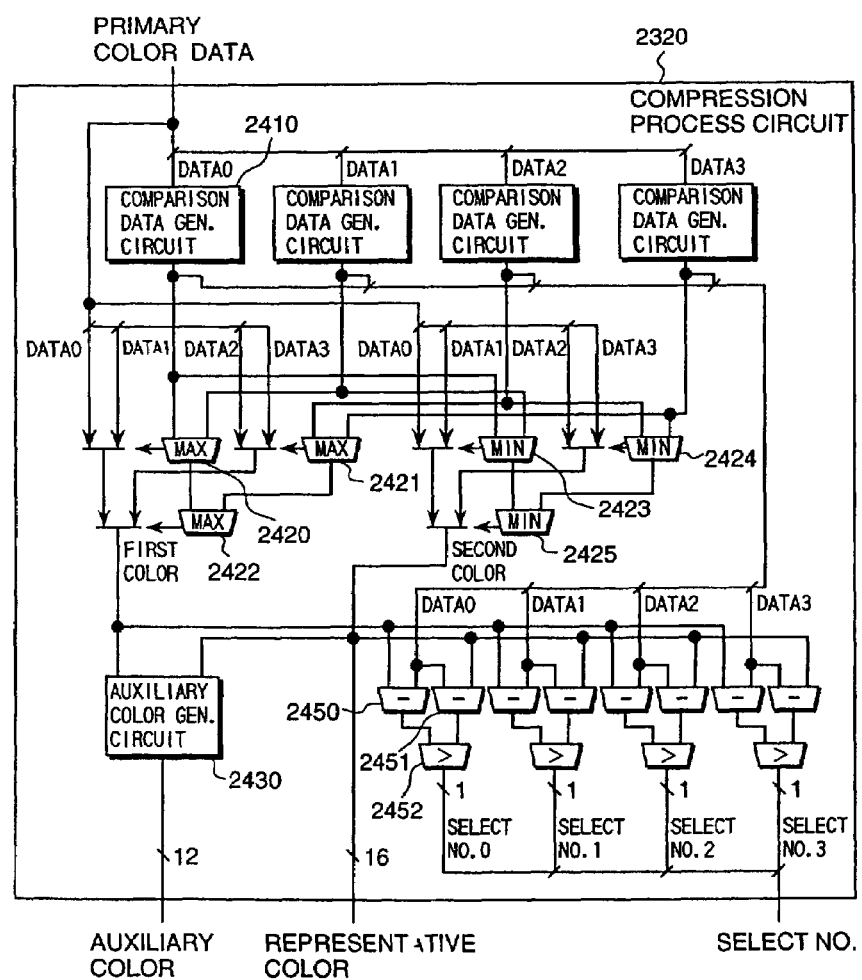
FIG. 30 is a block diagram showing the constitution of the compression processing circuit of the fourth embodiment.

In FIG. 30, numeral 2410 indicates a comparison data creation circuit, 2420 to 2425 and 2452 denote comparators, 2430 denotes an auxiliary color creation circuit, and 2450 and 2451 denote subtracters.

The comparison data creation circuit 2410 creates and outputs comparison data for determining the size of primary color data. Since data of each pixel comprises three different fields of R, G, and B, comparison data is data which is processed from the primary color data so as to prevent the relative sizes during comparison deviation due to color. Comparison data for four primary color data is created and then primary color data corresponding to the maximum comparison data is selected by the comparators 2420 to 2422 and the selector controlled by the output of each comparator as a first color and primary color data corresponding to the minimum comparison data is selected by the comparators 2423 to 2425 and the selector controller controlled by the output of each comparator as a second color.

The auxiliary color creation circuit 2430 creates and outputs the difference between the first color and the second color as an auxiliary color 12 bits in length. The subtracters 2450 and 2451 and the comparator 2452 decide which color the primary color data is closer to, the first color or the second color. When it is closer to the first color, they output 1 as a selection number and when it is closer to the second color, they output 0 as a selection number. The selection number is outputted for each of the 4 primary color data stored in the primary color register 2310, so that 4 bits in total are outputted.

Figure 31:
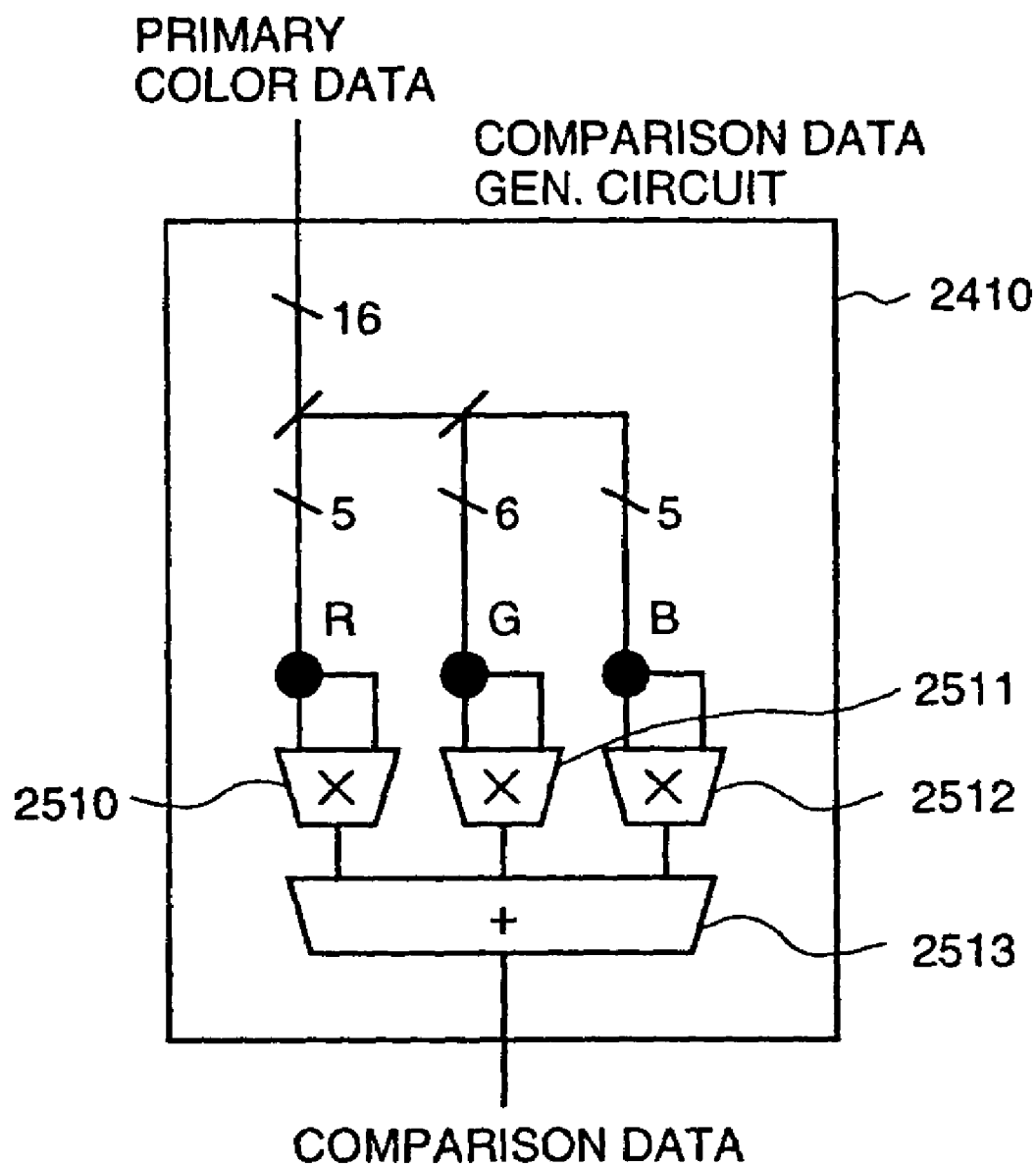
FIG. 31 is a block diagram showing the constitution of the comparison data creation circuit of the fourth embodiment.

The constitution of the comparison data circuit 2410 shown in FIG. 30 will be described with reference to FIG. 31.

In the drawing, numerals 2510 to 2512 indicate multipliers and 2513 indicates an adder.

The multiplier 2510 outputs the square of the R component of the primary color data. In the same ay, the multipliers 2511 and 2512 output the square of the G and B components. The adder 2513 outputs the sum of output values of the multipliers 2510 and 2512. In the data processor having the aforementioned constitution, the sum of the square of the three independent variables of R, G, and B is calculated, so that the accuracy for decision of relative sizes of the primary color data can be improved.

Figure 32:
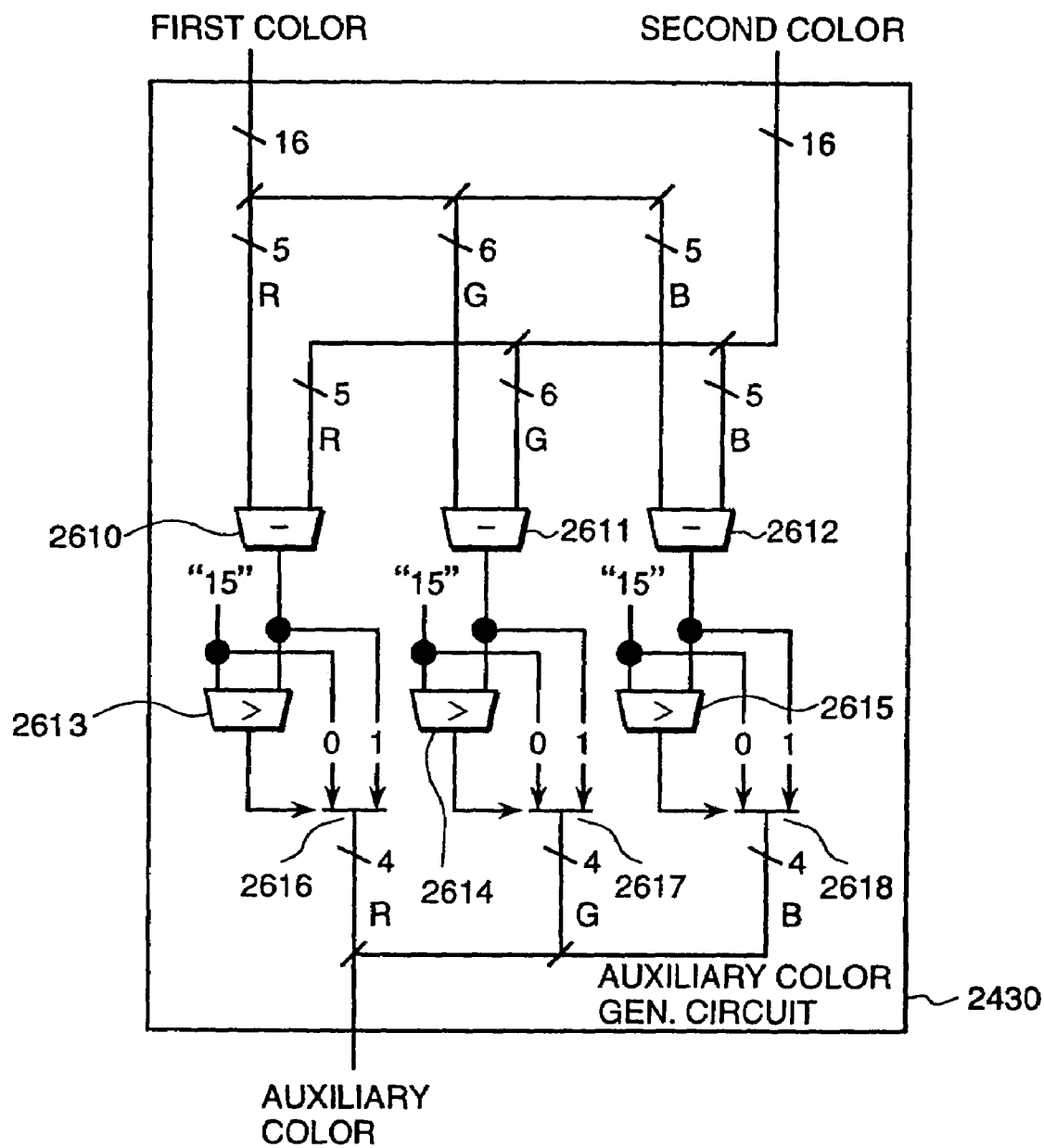
FIG. 32 is a block diagram showing the constitution of the auxiliary color creation circuit of the fourth embodiment.

The constitution of the auxiliary color creation circuit 2430 shown in FIG. 30 is shown in FIG. 32. In the drawing, numerals 2610 to 2612 indicate subtracters, 2613 to 2615 denote comparators, and 2616 to 2618 denote selectors.

The subtracter 2610 outputs the difference of the R component of the second color from the R component of the first color. When the output value of the subtracter 2613 is larger than 15 (maximum value expressed in 4 bits), the comparator 2613 outputs 0 and when it is not larger, the comparator 2613 outputs 1. The selector 2616 outputs the output value of the subtracter 2610 or 15 as an auxiliary color of the R component depending on the output value of the comparator 2613. The selector 2616 outputs as an auxiliary color 4 bits in length also for the G and B components respectively. In this constitution example, if the difference between the first color and the second color is larger than 15 when the difference in color component between the first color and the second color is to be obtained so as to create an auxiliary color, the auxiliary color is clamped at 15.

A unit for recovering four primary color data which is compressed as a representative color 16 bits in length, an auxiliary color 12 bits in length, and a selection number 4 bits in length as shown in FIG. 29 is constituted by the compression circuit 2220 shown in FIG. 28.

Figure 33:
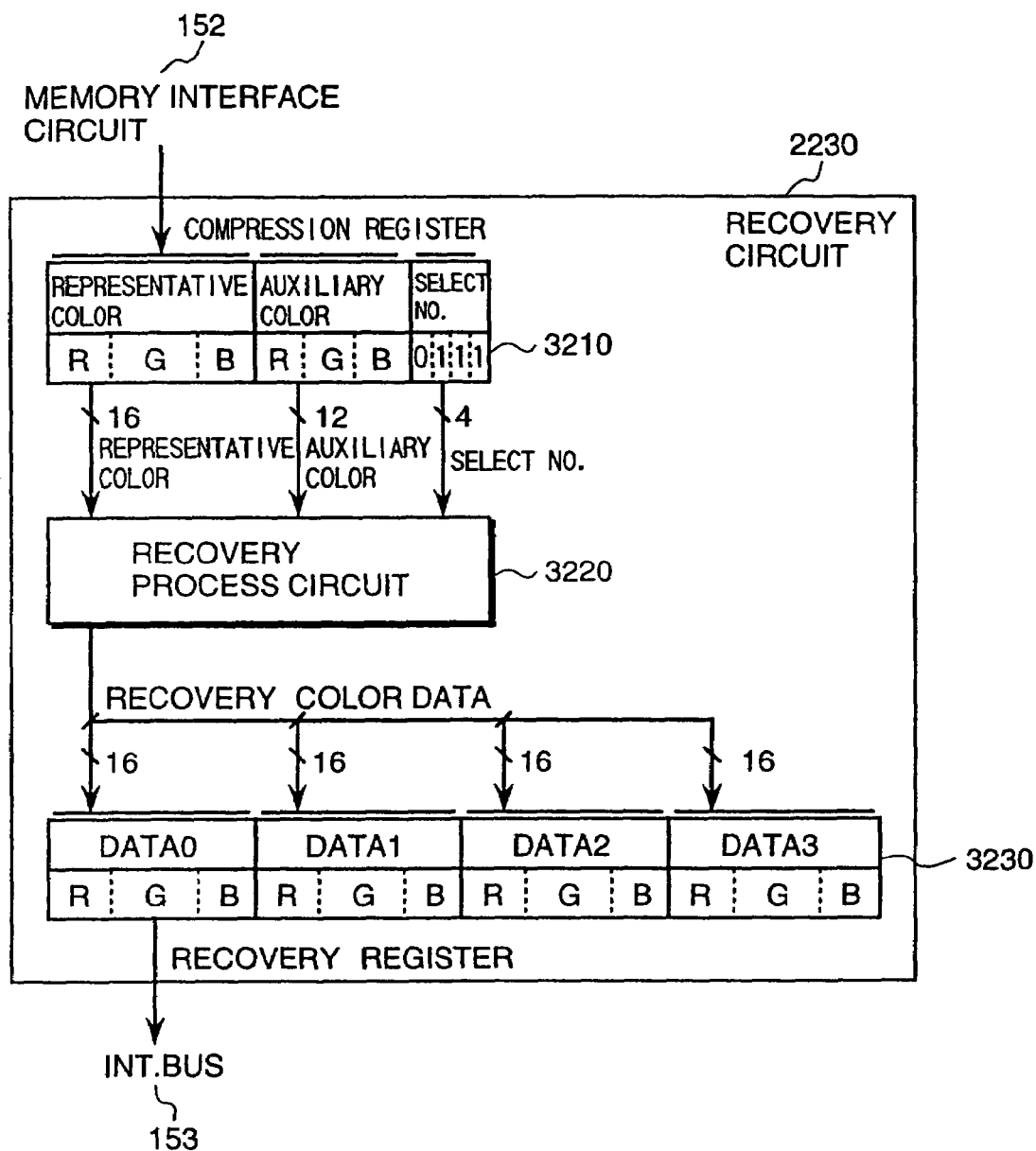
FIG. 33 is a block diagram showing the constitution of the recovery circuit of the fourth embodiment.

The constitution of the recovery circuit 3220 is shown in FIG. 33.

In FIG. 33, numeral 3210 indicates a compression register, 3220 denotes a recovery processing circuit, and 3230 denotes a recovery register.

The compression register for holding data sent from the memory interface circuit 520. The compression register 3210 outputs the representative color (16 bits), auxiliary color (12 bits), and selection number (4 bits). The recovery processing circuit 3220 recovers and outputs the primary color data on the basis of the representative color, auxiliary color, and selection number. The recovery register 3230 is a register for holding the primary color data. The recovery register 3230 outputs the held recovered primary color data to the internal bus 530.

The constitution of the recovery processing circuit 3220 shown in FIG. 33 will be described with reference to FIG. 34.

Figure 34:
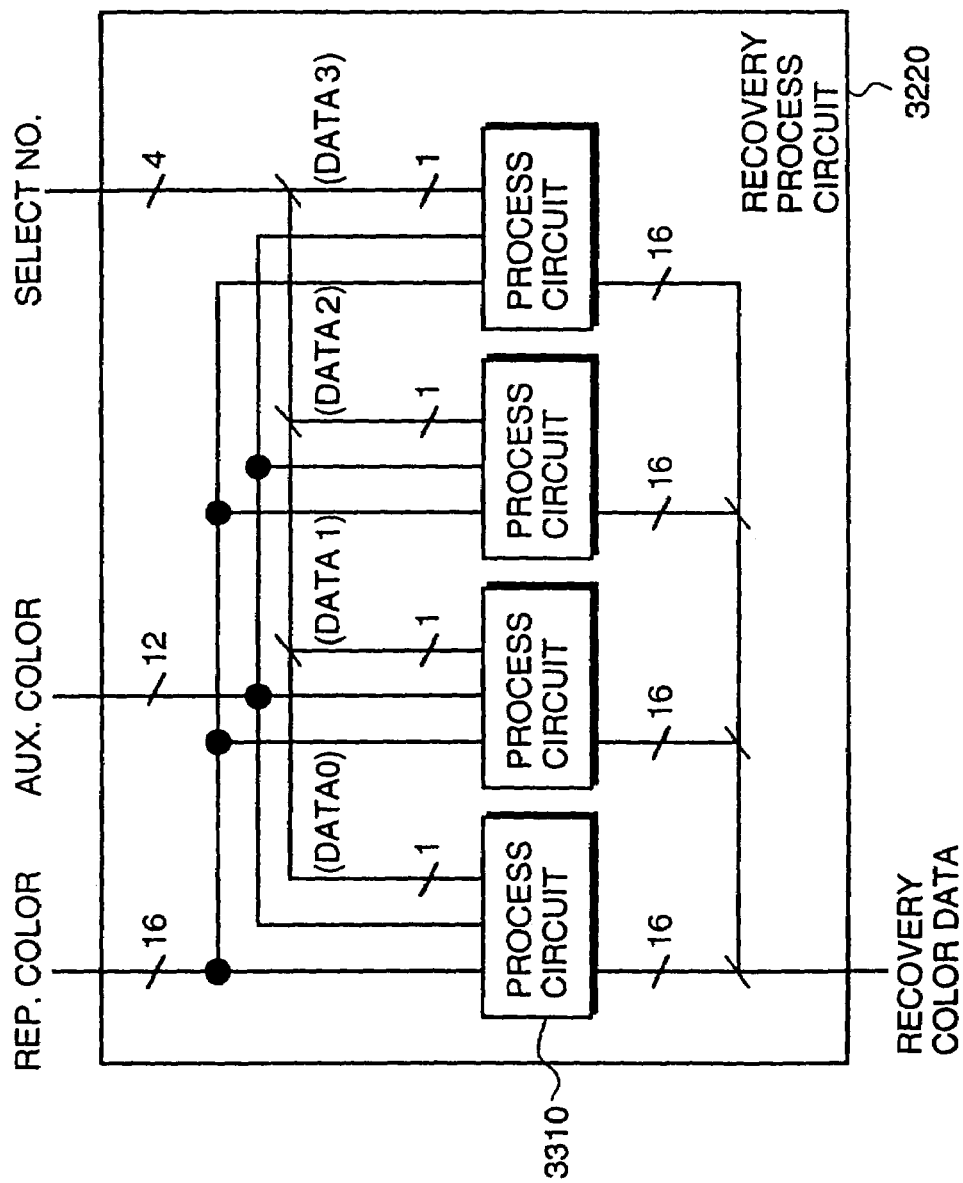
FIG. 34 is a block diagram showing the constitution of the recovery processing circuit of the fourth embodiment.

In FIG. 34, numeral 3310 indicates a processing circuit.

In FIG. 34, the processing circuit 3310 performs the recovery process for expanding data compressed on the basis of the representative color, auxiliary color, and selection number and outputs recovered color data.

The constitution of the processing circuit 3310 shown in FIG. 34 will be described with reference to FIG. 35.

Figure 35:
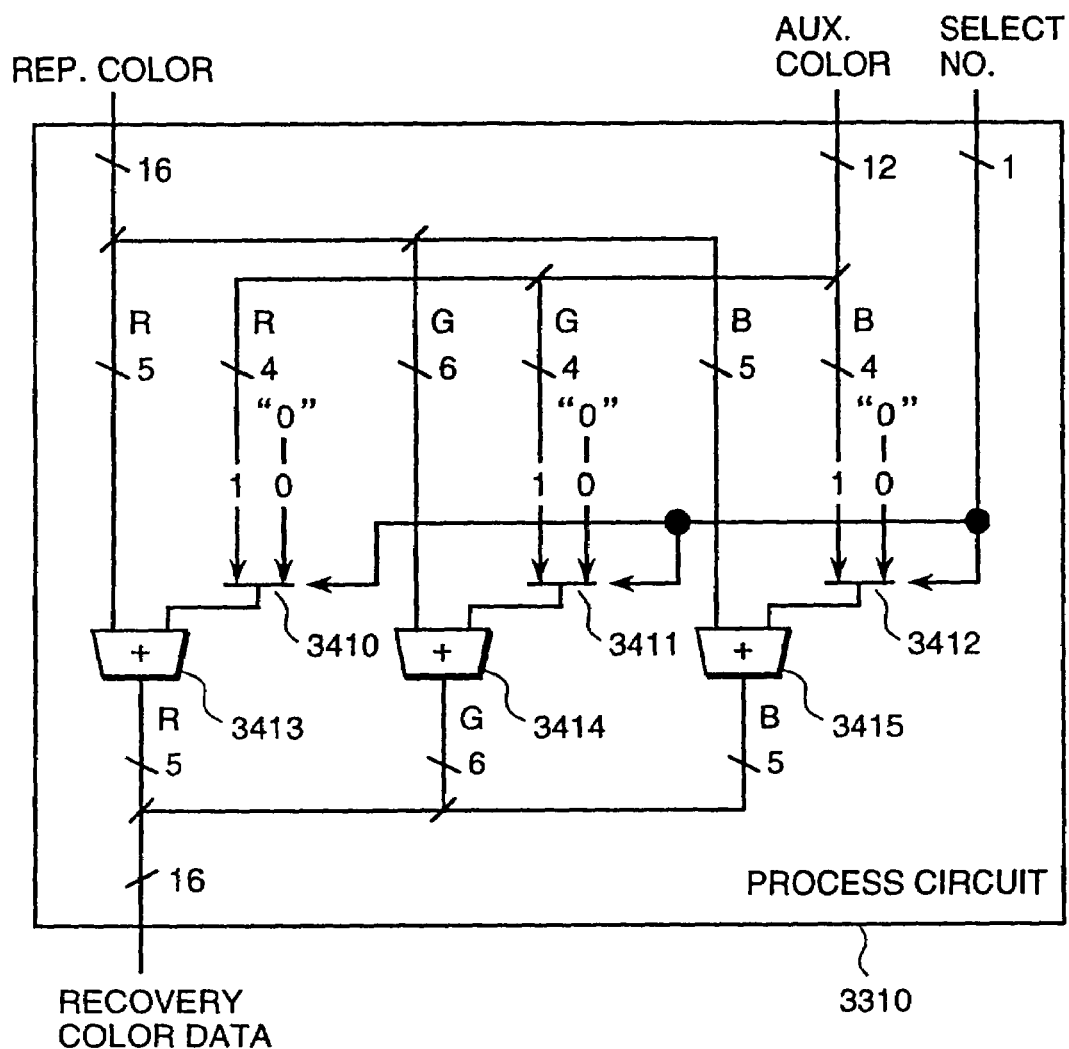
FIG. 35 is a block diagram showing the constitution of the processing circuit of the fourth embodiment.

In FIG. 35, numerals 3410 to 3412 indicate selectors and 3413 to 3415 indicate adders.

When the selection number is 0, the selector 3410 outputs 0 and when it is 1, the selector 3410 outputs the R component of the auxiliary color. The adder 3413 outputs the sum of the R component of the representative color and the R component of the representative color outputted by the selector 3410 as an R field of recovered primary color data. The G and B components are processed in the same way.

The fourth embodiment of the present invention has been explained above.

Figure 36:
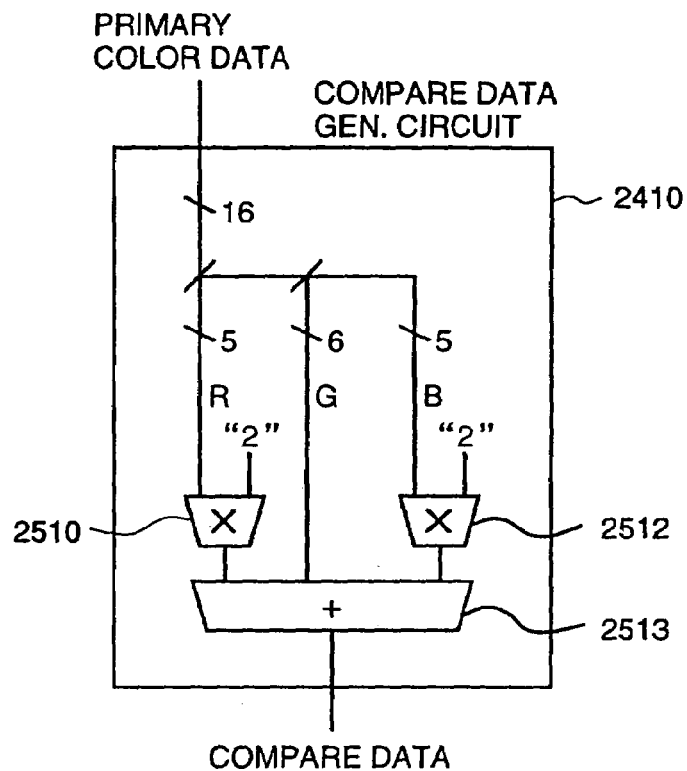
FIG. 36 is a block diagram showing the second constitution of the comparison data creation circuit of the fourth embodiment.
Figure 37:
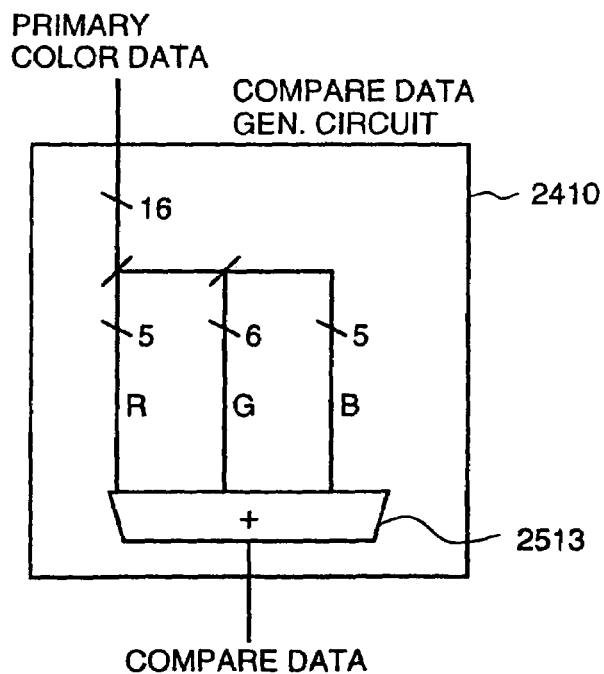
FIG. 37 is a block diagram showing the third constitution of the comparison data creation circuit of the fourth embodiment.

The comparison data creation circuit 2410 shown in FIG. 30 may be structured as shown in FIG. 36 or FIG. 37.

In the constitution shown in FIG. 36, comparison data is obtained by doubling the R and B components few bits in length and calculating the sum after making the weights of the most significant bits thereof equal to that of the G component. In this constitution, unlike the constitution shown in FIG. 31, the multiplier of the G component is not necessary and the multipliers of the R and B components are good enough if only the operation of doubling can be carried out. Since this can be structured by a shifter, the amount of materials of the hardware can be reduced.

In the constitution shown in FIG. 37, comparison data is obtained by calculating the sum of the R, G, and B components as they are. In this constitution, unlike the constitution shown in FIG. 31, the multiplier of each component is not necessary, so that the amount of materials of the hardware can be reduced. The weight of the most significant bit of the G component is double that of each of the R and B components. However, when display data is to be read from the frame buffer 220, color data of 4 continuous pixels is compared and the change of each color component is little, so that the comparison data created as mentioned above may be used.

Figure 38:
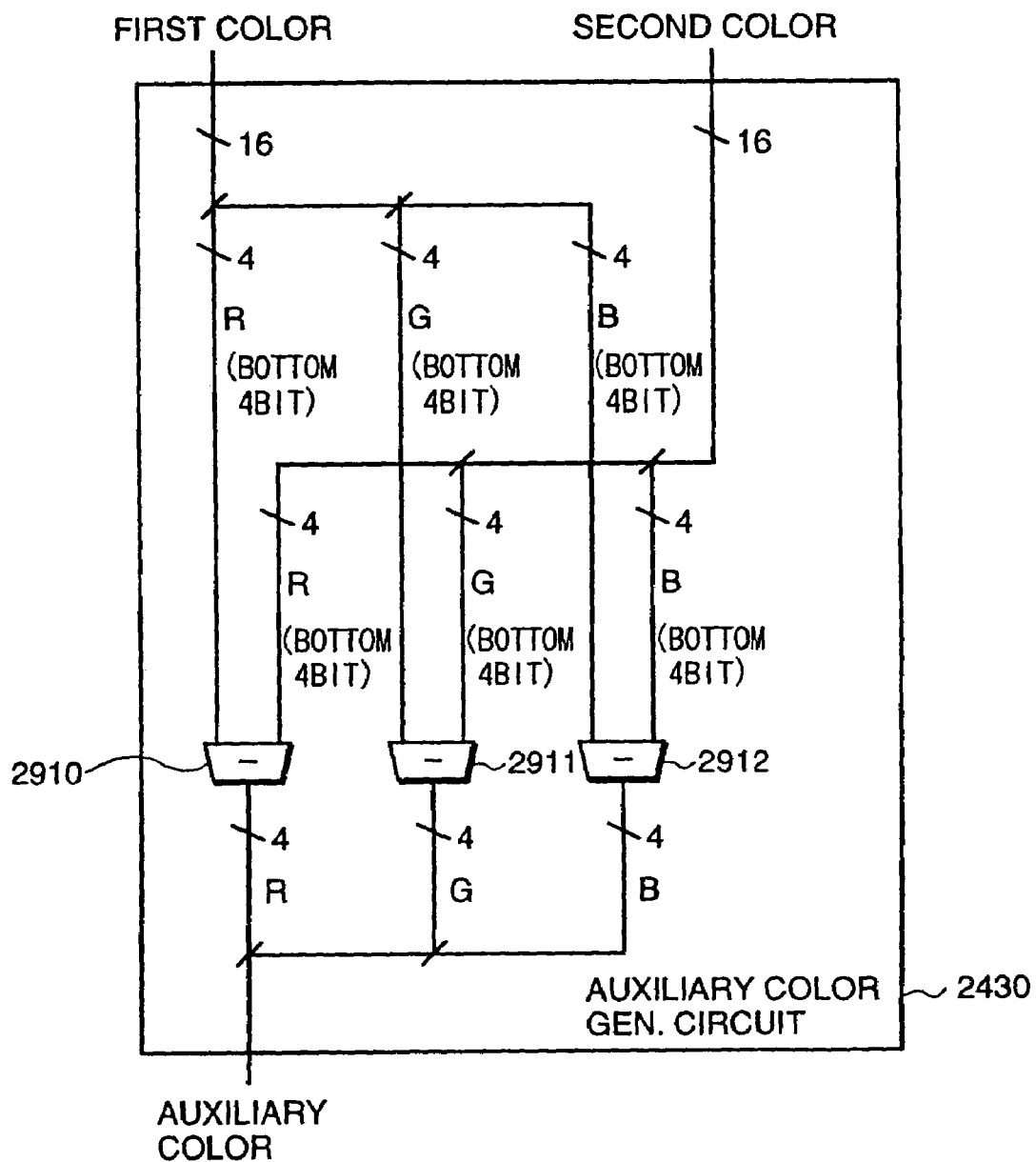
FIG. 38 is a block diagram showing the second constitution of the auxiliary color creation circuit of the fourth embodiment.

The auxiliary color creation circuit 2430 shown in FIG. 30 may be structured as shown in FIG. 38.

In FIG. 38, numerals 2910 to 2912 indicate subtracters and the constitution shown in FIG. 38 is system in which an auxiliary color is created by obtaining the difference only from the low-order four bits of the first and second colors. In this constitution, unlike the example shown in FIG. 32, the comparators and selectors are not necessary, so that the amount hardware can be reduced. When display data is to be read from the frame buffer 122, the difference is obtained from color data of two pixels among 4 continuous pixels, and the change of each color component is little, and the values of the fifth and sixth bits of each color are equal to each other in 4 continuous pixels and offset by subtraction, so that the first color can be recovered correctly by adding the auxiliary color obtained as mentioned above to the second color (representative color).

Figure 39:
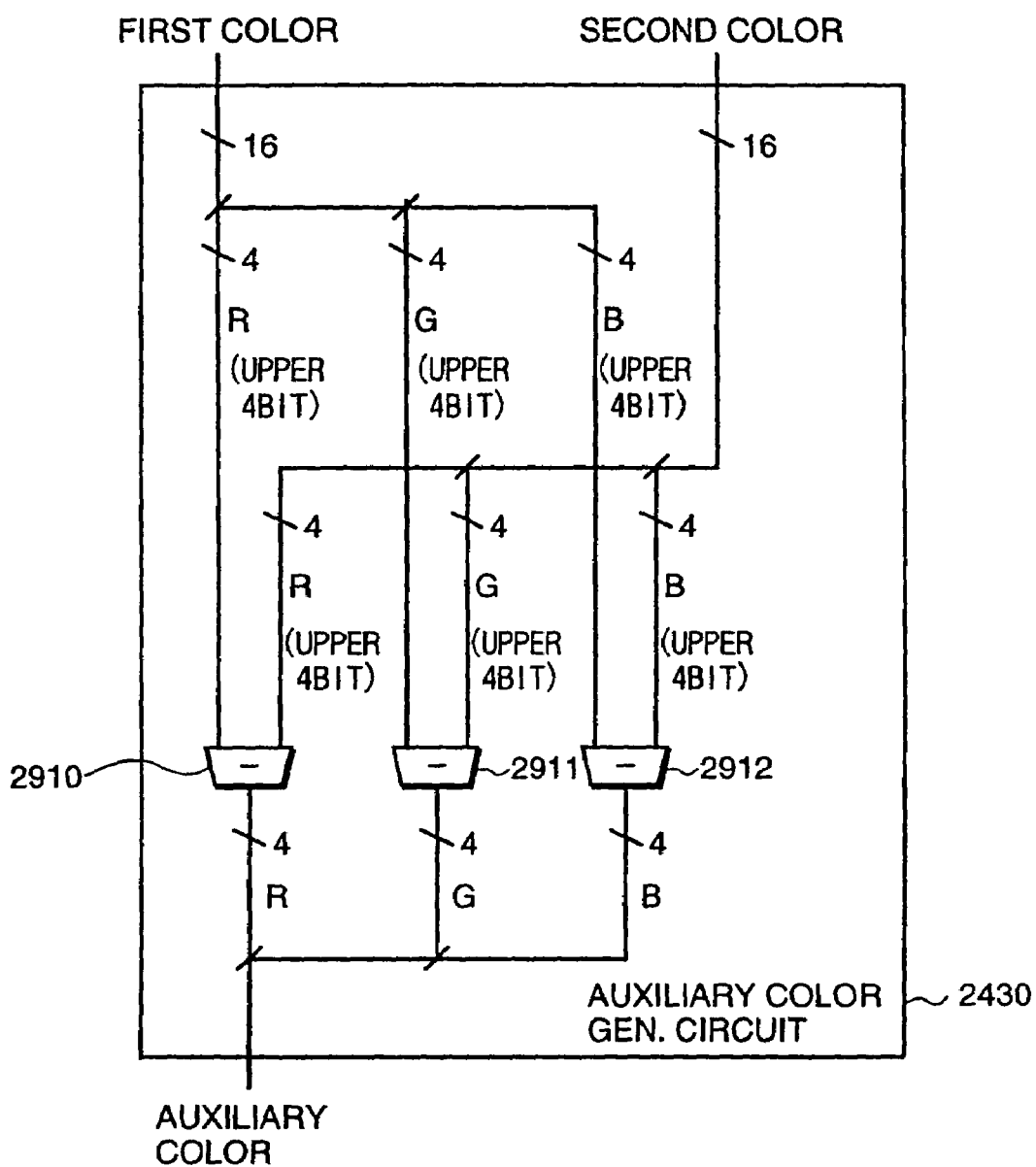
FIG. 39 is a block diagram showing the third constitution of the auxiliary color creation circuit of the fourth embodiment.
Figure 40:
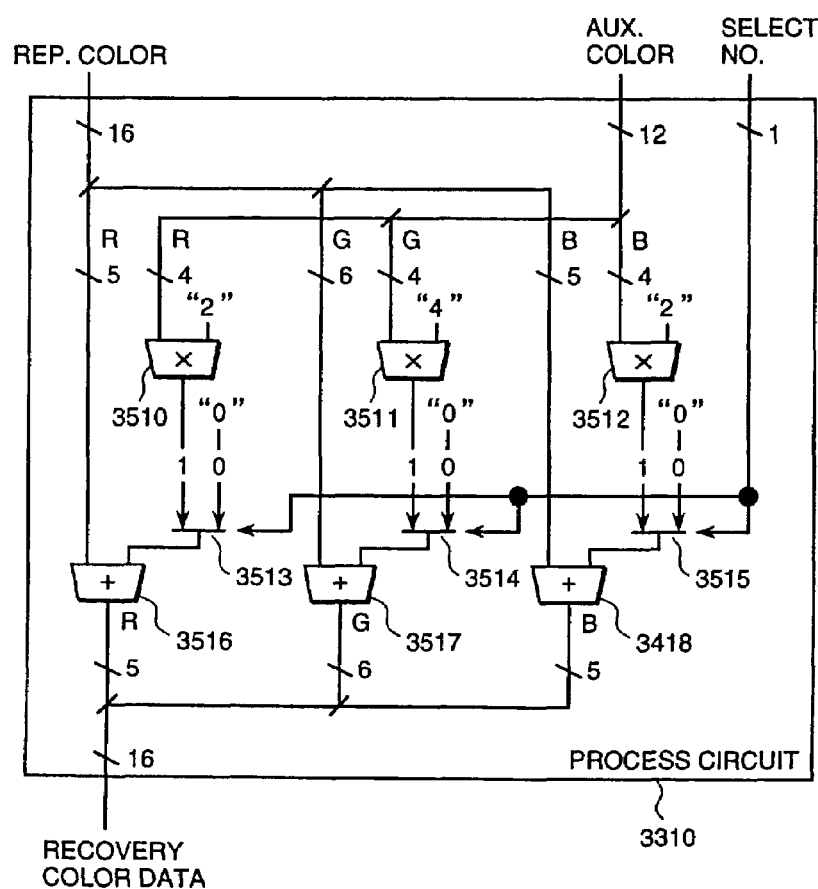
FIG. 40 is a block diagram showing the second constitution of the compression processing circuit of the fourth embodiment.

It is possible to structure the auxiliary color creation circuit 2430 shown in FIG. 30 as shown in FIG. 39 and the processing circuit shown in FIG. 34 as shown in FIG. 40.

The auxiliary color creation circuit 2430 shown in FIG. 39 creates an auxiliary color by obtaining the difference only from the high-order four bits of the first and second colors.

In the processing circuit 3310 shown in FIG. 40, numerals 3510 to 3512 indicate multipliers, 3513 to 3515 denote selectors, and 3516 to 3518 denote adders.

In FIG. 40, the multiplier 3510 outputs a result of doubling the R component of the auxiliary color. The selector 3513 outputs 0 when the selection signal is 0 and outputs the output value of the multiplier 3510 when it is 1. The adder 3516 obtains the sum of the R component of the representative color and the output value of the selector 3513 and outputs it as recovered color data. The adder 3516 outputs recovered color data also for the B component. The G component is the same as the R component except that the multiplier 2351 outputs quadruple the G component of the auxiliary color.

In the constitution shown in FIGS. 39 and 40, unlike the constitution shown in FIG. 32, the auxiliary color creation circuit 2430 requires no comparators and selectors, so that the amount of materials of the hardware can be reduced. By doing this, the first color cannot be recovered correctly including the accuracy of the low-order bits, though there arises no big problem for making the target visible.

Figure 41:
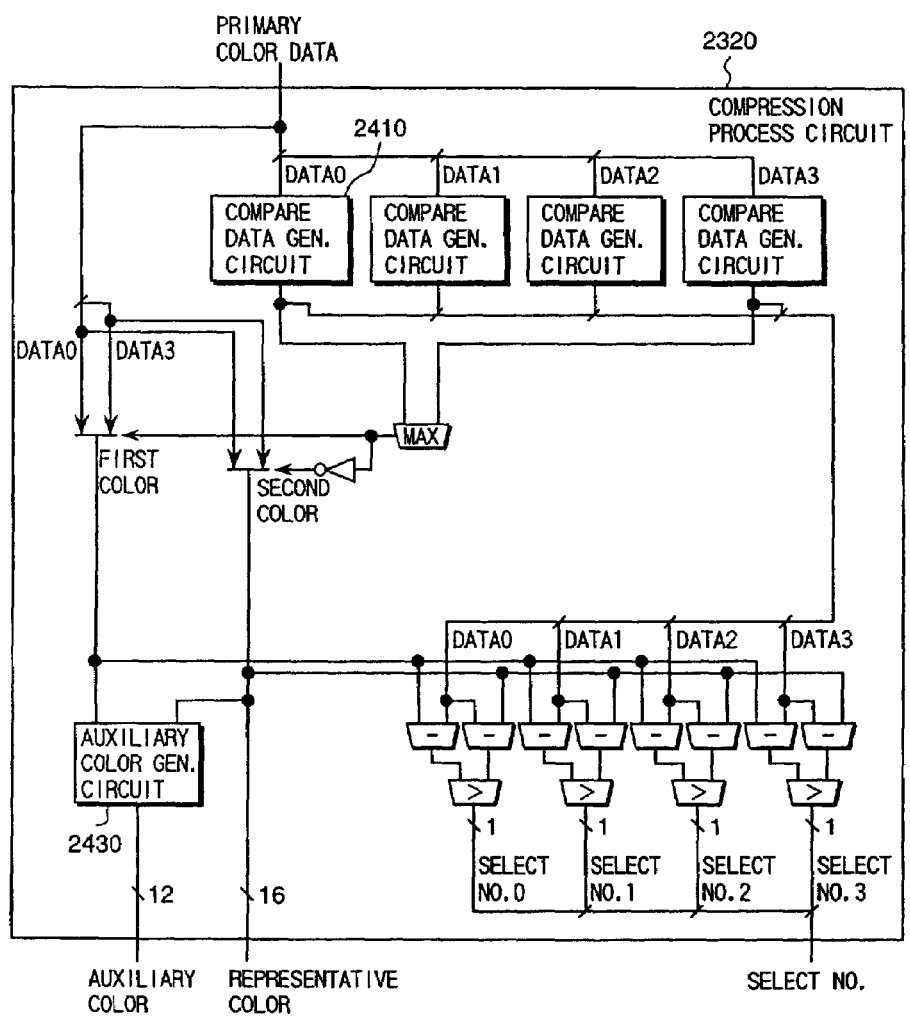
FIG. 41 is a block diagram showing the second constitution of the compression processing circuit of the fourth embodiment.

The whole compression processing circuit 2320 shown in FIG. 30 may be structured as shown in FIG. 41.

In the constitution shown in FIG. 41, comparison data is created by selecting two optional data from the primary color data, and the primary color data having large comparison data is set as a first color, and the other is set as a second color. In this constitution, the image quality is degraded slightly compared with that shown in FIG. 30. However, five comparators and four selectors are not needed in the example shown in FIG. 30, so that the amount of the hardware can be reduced.

Finally, it will be described hereunder that in the constitution of each of the aforementioned embodiments, for example, data is displayed on the CRT 115 by the display controller 156 without hindrance.

As shown in FIG. 1 and other drawings, in each of the aforementioned embodiments, the CPU bus 131 has a throughput of 32 bits×33 MHz and the memory bus 135 has a throughput of 32 bits×66 MHz. Therefore, even if the CPU 100 accesses the memory 120 up to the limit of the throughput of the CPU bus 131, only half of the throughput of the memory bus 132 is used but the capacity of the memory bus 132 will not be used. Therefore, assuming that the rendering processor 157 does not access the memory 120, a rough estimate of the remainder (66−33) MHz×32 bits=1056 M bits/second can be used for memory access by the display controller 156. In this case, when a 24-bit full color image of 800 dots×600 dots is displayed on the CRT 150 at a refresh rate of 60 Hz, the bit rate at which the display controller 156 is required to read from the memory 120 is (800×600)×60 Hz×24 bits=691.2 M bits/second. Therefore, even if the CPU 100 accesses the memory 120 up to the limit of the throughput of the CPU bus 131, data is displayed on the CRT 115 without hindrance and the opportunity of access to the memory 120 by the rendering processor 157 can be reserved sufficiently.

In this embodiment, the throughput of the CPU bus 131 and the throughput of the memory bus 132 are set as mentioned above. However, if the difference between the throughput of the memory bus 132 and the throughput of the CPU bus 131 is the read rate from the memory 120 or more which is required by the display controller 156 for display, settings other than the aforementioned settings may be used.

Actually, it is impossible for the CPU 100 to access the memory 120 up to the limit of the throughput of the CPU bus 131. Therefore, the throughput of the memory bus 132 may be set to the maximum use rate of the CPU bus 131 and the read rate from the memory 120 which is required by the display controller 156 for display or more.

The memory controller explained above has a built-in rendering processor for performing the drawing process. However the present invention is not limited to thereto. Namely, even if a rendering processor for drawing is installed outside a memory controller, when a data processing system is structured so that a CPU, a drawing rendering processor, a main memory, and a memory having a frame buffer memory can send and receive data via the memory controller, the timing for the CPU and rendering processor to access the memory is adjusted by the memory controller as explained already.

Furthermore, in this embodiment, even if the memory controller and memory or the memory controller, memory, and CPU are structured on the same semiconductor board, the processing performance is improved by the memory controller of the present invention.

Next, with respect to a data processor for optimizing the continuous time of one display access according to the cache system of the CPU when a graphics memory which is accessed by both the CPU and graphics processor is used, increasing the memory access efficiency, and realizing high speed graphics display, the embodiment thereof will be explained with reference to the drawings.

Figure 42:
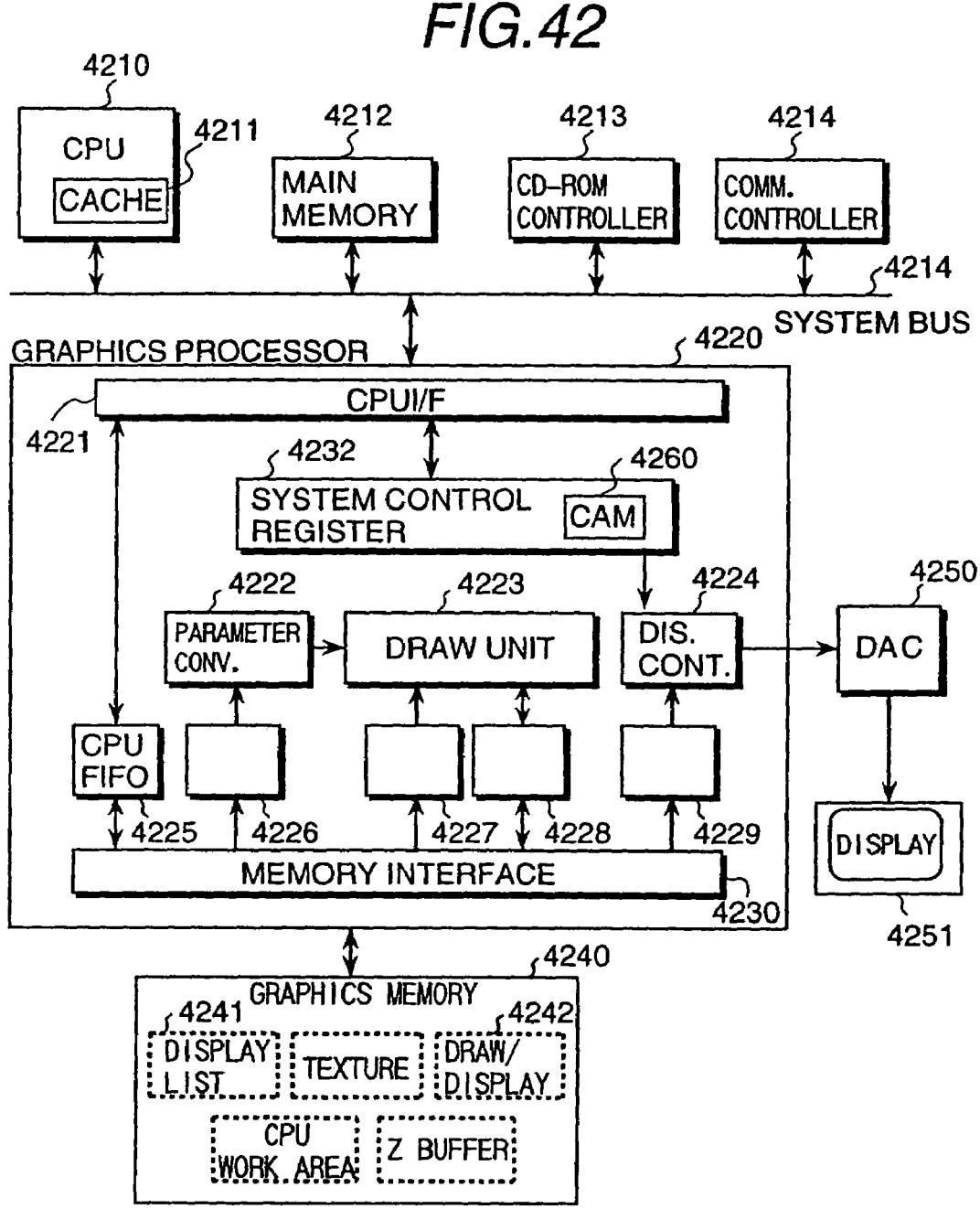
FIG. 42 is a block diagram of the data processor of the position embodiment of the present invention.

FIG. 42 shows the constitution of the data processor of the present invention.

A CPU 4211 controls the whole apparatus and executes a program for displaying a figure on a display unit 4251. A main memory 4212 stores data and a program which are processed by a CPU 4210. A CD-ROM controller 4213 accesses figure information of the CD-ROM and a communication controller 4214 sends or receives information to or from another apparatus now shown in the drawing.

A graphics processor 4220 draws a figure in the display area of a graphics memory 4240 and further reads the drawn data and displays the figure on the display unit 4251. A DAC (digital to analog converter) 4250 converts display data in the digital format outputted from the graphics processor 4220 to analog data.

As an element constituting the graphics memory 4240, it is desirable to use a DRAM. The reason is that the DRAM has a higher degree of integration of transistors for the chip area compared with other memories. The DRAM has an access system called high speed page mode access and in continuous access when the high order portions (for example, bit 9 and upper bits) of addresses match with each other, high speed access is possible.

A figure displayed by this apparatus changes in size and location of the figure little by little in a cycle of ⅟₆₀ s or ⅟₃₀ s and screens can be seen continuously, so that a graphics figure is displayed as a moving image. Therefore, the CPU 4210 and the graphics processor 4220 draw a figure for one screen within ⅟₆₀ s or ⅟₃₀ s. A figure is drawn by the following procedure and a figure for one screen is processed repeatedly.

(1) Coordinate transformation of figure data by CPU 4210 will be explained.

The CPU 4210 calculates the direction and size of a figure to be displayed and calculates the vertex coordinates of the figure. In the case of a complicated figure structured by combining a number of simple figures such as a triangle and quadrangle, the CPU 4210 calculates the vertex coordinates of all the simple figures.

(2) Creation of display list by CPU 4210 will be explained.

To draw a complicated figure comprising a number of simple figures on the graphic memory 4240, the CPU 4210 converts a drawing command (hereinafter called just a command) into a command format which can be executed by the graphics processor 4220 and transfers it to the graphics memory 4240. Generally, commands in units of simple figure are combined and connected to commands for one figure. The connected commands are called a display list. The display list is several tens to several hundreds of kilobytes in length and is stored in a display list area 4241.

(3) Drawing by graphics processor 4220 will be explained.

The graphics processor 4220 reads the display list sequentially and draws a figure in a drawing/display area 4242 in the graphics memory 4240 according to a command shown in the list.

(4) Display by graphics processor 4220 will be explained.

A figure drawn in the drawing/display area 4242 is read by the graphics processor 4220 at the display timing and displayed on the display unit 4251. The drawing display area 4242 comprises a double buffer and the drawing and display buffers are switched alternately.

The processes (1) to (4) mentioned above are repeated in a cycle of 1/60 seconds or 1/30 seconds. The system bus 4214 transfers data of the display list in the aforementioned cycle.

Next, the constitution and outline of operation of the graphics processor 4220 will be explained. A CPU interface 4221 executes control for the CPU 4210 to access a register such as a system control register 4232 or the graphics memory 4240. A drawing unit 4223 checks the display list in the graphics memory 4240 and draws a figure according to a command shown in the list. A parameter converter 4222 converts a parameter of a command as required. A display controller 4224 executes control for displaying data drawn by the drawing unit 4223.

The graphics processor 4220 accesses the graphics memory 4240 as mentioned above whenever each element thereof performs a certain process, so that increasing the access efficiency of the graphics memory 4240 results in improvement of the processing speed. Therefore, the graphics processor 4220 has a cache and FIFO for each access request so as to increase the access efficiency.

A CPU FIFO 4225 speeds up access to the graphics memory 4240 by the CPU 4210. A cache (1) 4226 is used only for a command, and a cache (2) 4227 is used only for a texture, and a cache (3) 4228 is used only for drawing. The graphics processor 4220 has a display buffer 4229 for display data.

A memory controller 4230 receives an access request to the graphics memory 4240 from the caches (1) to (3) and the FIFO 4225, decides on the priority, and controls access. The memory interface circuit 4230 gives priority to access from the display controller 4224. However, while access from the CPU 4210 or the drawing unit 4223 is made, it will not be suspended and access from the display controller is forced to wait.

The system control register 4232 is a register for designating the operation mode of the graphics processor 4220. The register 4232 has a CAM (CPU access mode) bit for designating the cache mode of the CPU 4210.

Figure 43:
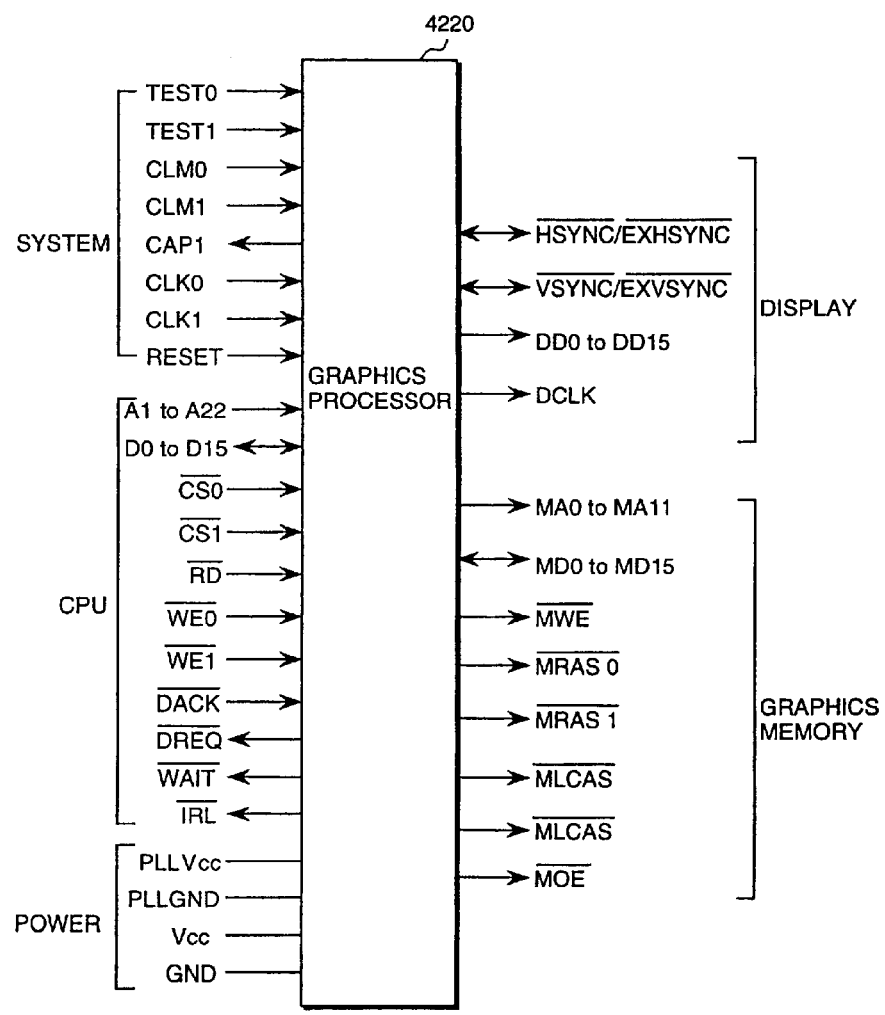
FIG. 43 is a diagram showing the terminal functions of a graphics processor.

The terminal functions (1) to (5) of the graphics processor 4220 are shown in FIG. 43.

(1) System Group

The terminals set the system mode and input clock and reset signals. The graphics processor 4220 can input independent clock signals in the drawing and display lines and the drawing line always can perform the high speed process.

(2) CPU Group

The terminals are for the CPU interface 4221. The CPU 4210 can access the whole space of the graphics memory 4240 and the internal registers of the system control register 4232 and others. To access the graphics memory 4240, the CS0 terminal is set low and to access the registers, the CS1 terminal is set low. To allow write access to the graphics memory 4240 in byte units, the line has two write enable terminals. In addition to them, there are DREQ and DACK terminals for controlling DMA transfer, a WAIT terminal for prolonging the bus cycle, and an IRL terminal for generating an interruption for the CPU 4210 available (3) Power Group The terminals for supplying power are a PLL exclusive terminal for clock control and other general terminals.

(4) Display Group

The display terminal are a dot clock output terminal (DCLK), display data output terminals (DD0 to DD15), and synchronizing signal I/O terminals (HSYNC, VSYNC).

(5) Memory Group

As interfaces with the graphics memory 4240, terminals for directly connecting the DRAM are provided.

The drawing commands of the graphics processor are shown in FIG. 44. The Quadrangle Drawing command draws a figure by changing texture data of a rectangle to an optional quadrangle. When the texture data is binary, the command performs color expansion. The LINE command draws a single straight line or a plurality of straight lines. The MOVE command moves the drawing start point. The LOFS command shifts the origin of drawing coordinates. A command after the MOVE command is executed draws a figure by shifting the coordinates of a coordinate parameter shown in the display list by the values designated by this command. The AFFIN command designates rotation, enlargement, or reduction during drawing of a figure. A command rotates (or enlarges or reduces) and draws a coordinate parameter shown on the display by the value designated by the AFFIN command. The JUMP command branches the display list. The GOSUB command calls the subroutine of the display list. The RET command returns form the subroutine. The TRAP command finishes the display list fetch. The FLASH command makes data existing in the cache (2) 4227 which is a cache of texture data invalid and newly reads data from the graphics memory 4240.

A data list of each register in the graphics processor is shown in FIG. 45 and the functions thereof will be explained hereunder.

(1) System Control Register

SRES initializes the drawing unit 4223 according to the software and DRES initializes the display controller 4224 according to the software. DAC switches the display area (frame buffer area). FS starts fetching of the display list. CAM designates the kind of the cache 4211 in the CPU 4210.

When the cache 4211 uses the copy back system as a characteristic of the operation that the CPU 4210 stores data in the graphics memory 4240, the cache 4211 writes all data in the line size of the cache. On the other hand, when the cache 4211 uses the write through system, it writes data in word units. Therefore, the cache system of the CPU can be designated or switched by setting of CAM.

(2) Status Register

VBK notifies switching of the display frame. TRA notifies that the TRAP command is executed and the display list fetch ends. DBF indicates which one of the two frame buffers is displayed at present.

(3) Status Register Clearing Register

The register clears the bit of the corresponding status register.

(4) Interrupt Enable Register

The register designates occurrence of an interruption to the CPU 4210 by each bit of the corresponding status register.

(5) Rendering Mode

MWX designates whether the width of the screen is 512 pixels or less or within a range from 513 pixels to 1024 pixels. GBM designates whether 1 pixel is 8 bits or 16 bits in length.

(6) Display Mode

SCM designates whether the display is interlaced or not interlaced. TVM designates the TV synchronization mode or master mode. RCYN designates the number of refresh cycles of the graphics memory 4240.

(7) Display Size

The register designates the dimensions of the display screen in the X and Y directions.

(8) Display Start Address

The register designates the start addresses of the two frame buffers in the graphics memory 4240.

(9) Display Address List

The register designates the start address of the display list in the graphics memory 4240.

(10) Source Area Start Address

The register designates the start address of the texture data storage area.

(11) Display Control Relating Register

Register Nos. 10 to 1A indicate registers relating to display control. The registers set the timing for reading display data in accordance with the size of the display screen and the cycle of a horizontal or vertical synchronizing signal. During display reset, the output register sets a color value to be displayed on the screen when the display is not read. For example, when the display operation is stopped, the output register can put the screen into the blue black state (blue display).

(12) Command Status Register

This is a register for notifying the memory address when the display list fetch is stopped.

Next, the constitution and operation of the CPU FIFO 4225 for access to the graphics memory 4240 by the CPU 4210 will be explained.

Figure 46:
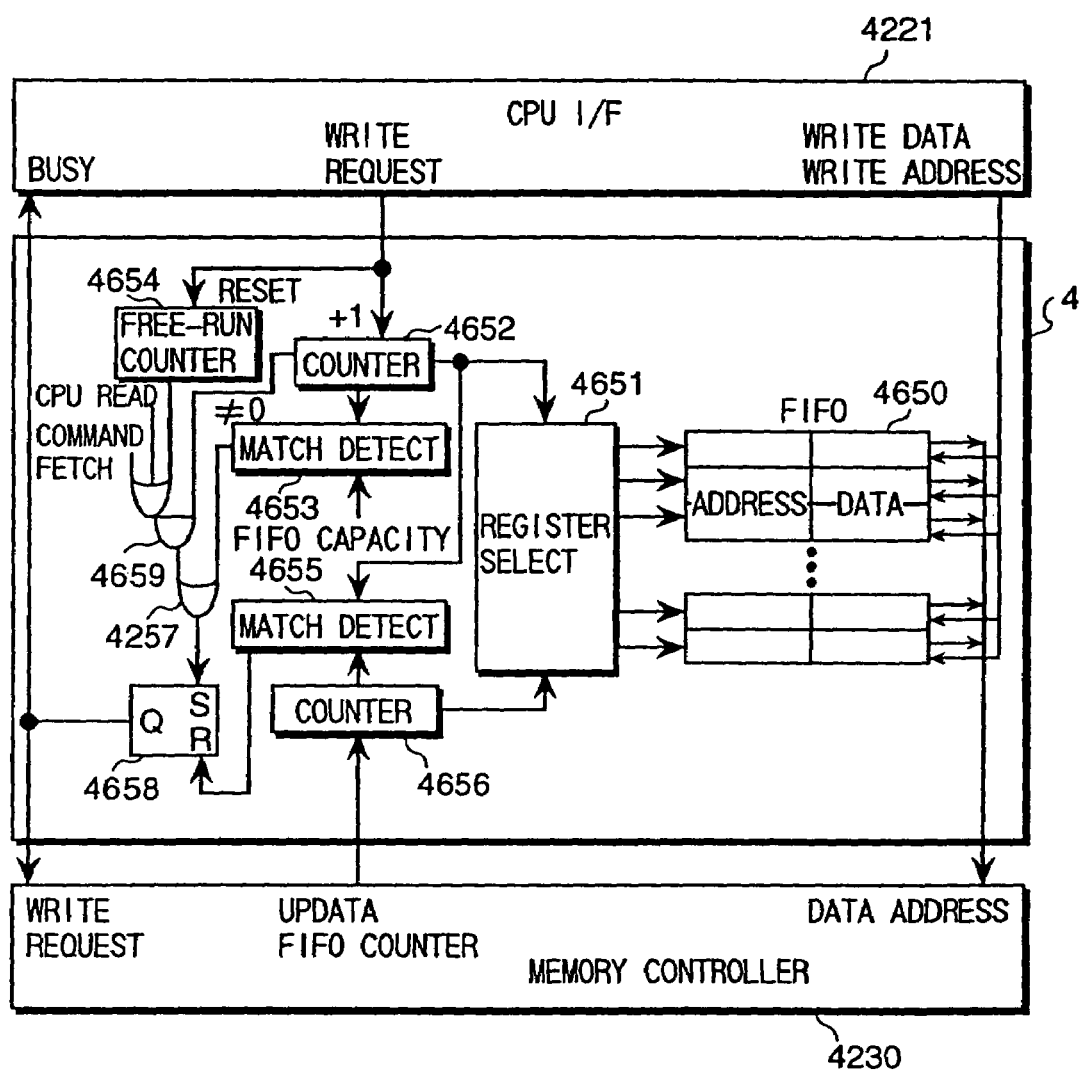
FIG. 46 is a diagram of the functions of CPUFIFO.

FIG. 46 is a functional block diagram of the CPU FIFO. Whenever the CPU 4210 performs a store operation to the graphics memory 4240, a write request signal is sent from the CPU interface 4221. Then, a counter 4652 is incremented and the write address and data of the CPU 4210 at that time are stored in an FIFO 4650. A match detector 4653 compares the value of the counter 4652 and the FIFO capacity and sets an flip-flop 4658 when it finds that the FIFO is full. As a result, the CPU interface 4221 is notified that the FIFO 4650 is busy and the CPU 4210 is prevented from storing data any more.

On the other hand, a write request into the graphic memory 4240 is outputted to the memory interface circuits 4230. Whenever data of one word is written, the memory interface circuit 4230 outputs an FIFO counter updating signal for updating the counter 4656. The value of a counter 4656 is compared with the value of the counter 4652 by a match detector 4655. The counter 4656 is a read counter of the FIFO 4650 and the counter 4652 is a write counter of the FIFO. When the two values match with each other (namely, when the words written by the CPU 4210 are all read by the memory interface circuit 4230), the flip-flop 4658 for stopping the writing into the graphics memory 4240 is reset.

When the CPU 4210 does not write data for a given period, a free running counter 4654 operates so as to write the data of the FIFO 4650 into the graphics memory 4240. When the CPU 4610 reads the graphics memory 4640 or the drawing unit 4223 starts fetching of the display list, the free running counter 4654 operates so as to write the data of the FIFO 4650 into the graphics memory 4240 prior to them.

Next, the difference in the access time of the graphics memory 4240 due to the difference in the system of the internal cache 4211 of the CPU 4210 will be explained.

As cache systems of the CPU 4210, the copy back system and the write through system are known. In the copy back system, even if the CPU 4210 executes the store instruction for the memory 4240, only the cache 4211 in the CPU 4210 is changed but the data in the memory 4240 will not be changed soon. The memory 4240 is changed when data of a plurality of words which is called a cache line is all released from the cache 4211 to the memory 4240. Data of the cache line is a plurality of continuous addresses. Namely, the addresses of data written into the graphics memory 4240 via the FIFO 4650 are continuous. Therefore, by high speed mode access of the DRAM, data can be written into the graphics memory 4240 in a short time from the FIFO 4225 of the CPU.

On the other hand, in the write through system, when the CPU 4210 executes the store instruction for the memory 4240, data is written into the memory 4240 immediately in word units. Therefore, in the FIFO 4650, data to be written in the graphics memory 4240 may be discontinuous addresses. In the worst case, all the addresses may be discontinuous. When the addresses are discontinuous, the writing time into the graphics memory 4240 from the FIFO 4225 of the CPU becomes longer due to the characteristic of the DRAM. In the worst case, the time may be about four times of that of the copy back system (maximum 80 cycles).

Figure 47:
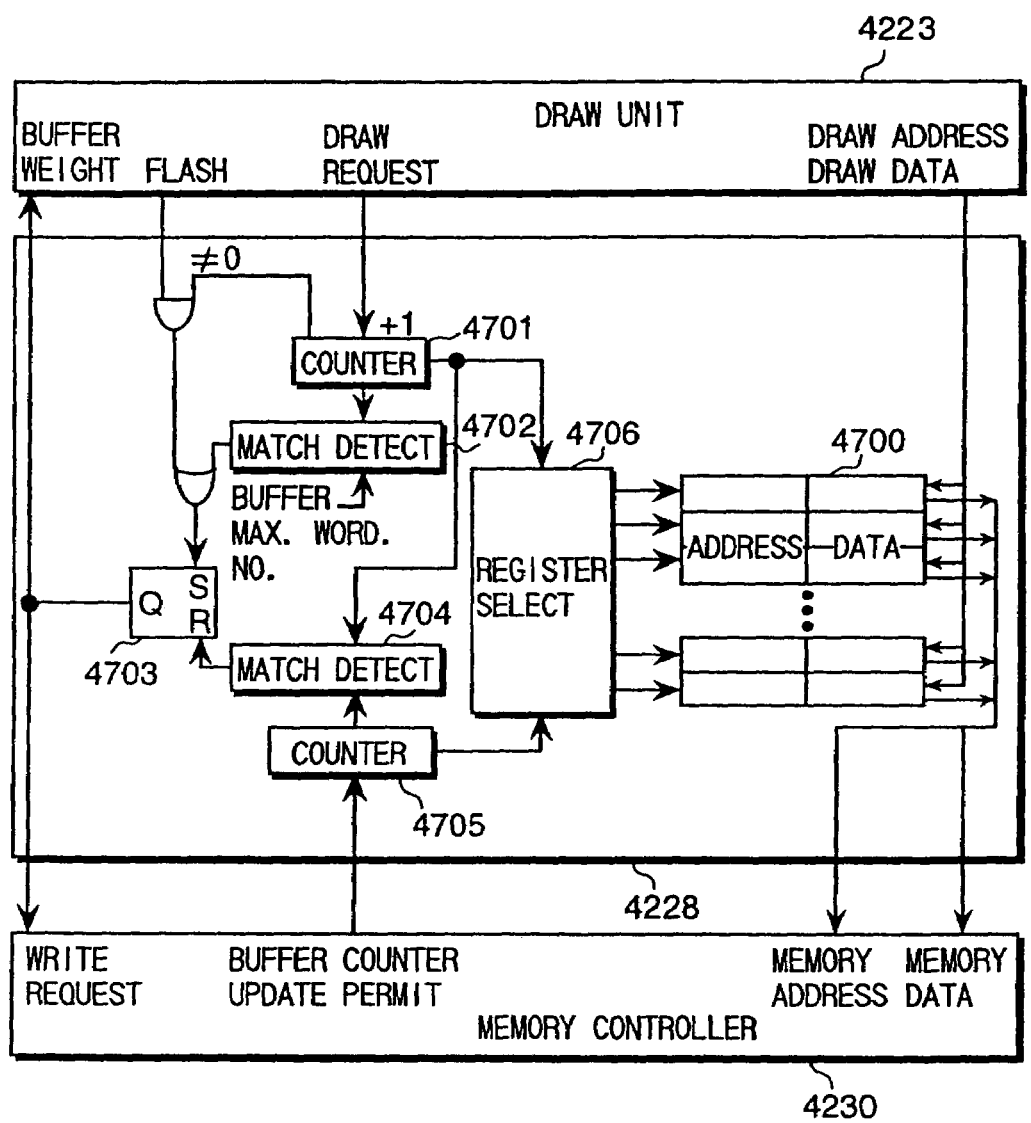
FIG. 47 is a diagram of the functions of a drawing cache (3).

Next, the constitution and operation of the drawing cache 4228 will be explained. FIG. 47 is a block diagram of the drawing cache. The cache (3) is only for drawing, though the drawing unit 4223 will not read data in the cache (3) 4228. Namely, since the drawing cache 4228 has no function for carrying out data operations with a preliminary sketch of the drawing destination, it performs only the writing operation. Since there is not need to read a preliminary sketch, a high speed operation in which the memory access amount is extremely reduced can be performed.

When the drawing unit 4223 writes data, the drawing address and the drawing data are stored in a register file 4700 and a counter 4701 is incremented. The value of the counter 4701 is compared by a match detector 4702 and when the register file 4700 is full, the match director 4702 outputs a write request to the memory interface circuit 4230 via the flip-flop 4703. The drawing unit 4223 has a function for flashing data of the cache (3) 4228 when a figure drawing command ends in the state that the cache has a free space. When the flash signal becomes active, the cache writes data in the number of words shown by the counter 4701 into the graphics memory 4240.

A common aspect of the CPU FIFO 4225 and the cache 4228 is that they transfer write data in the number of words detected by the counter 4652 or the counter 4701 and do not execute useless data transfer. On this point, a general cache used in the CPU or others also transfers data in the portion where no data is rewritten due to writing in line size units.

Figure 48:
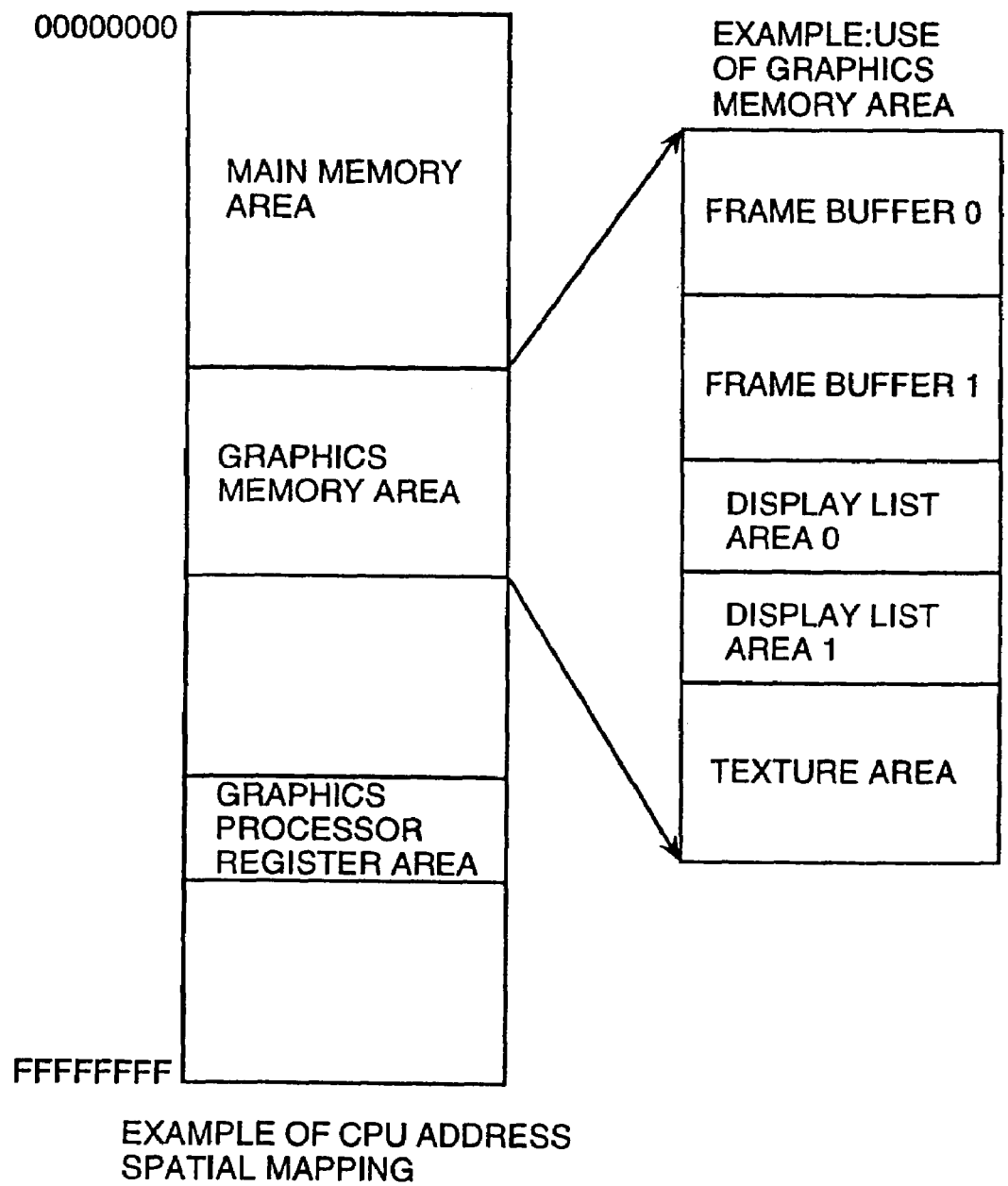
FIG. 48 is a diagram showing address mapping of an CPU.

FIG. 48 shows address mapping of the CPU. The software of the CPU 4210 can be accessed without discriminating the graphics memory 4240 from the main memory 11.

In the graphics memory area, a frame buffer 0 and a frame buffer 1 are provided. When graphics moving images are displayed, the frame buffer area 0 or 1 is switched every ⅟₆₀ seconds (or ⅟₃₀ seconds). The drawing unit 4223 always draws a figure in the frame buffer which is displaying no figure. By doing this, the halfway drawing status is not displayed and moving images of high quality can be displayed. There are two display list areas provided, which are used by the drawing unit 4223 and the CPU 4210 alternately.

Next, display access to the graphics memory 4240 by the display controller 4224 and the control method display buffer 4229 will be explained.

Figure 49:
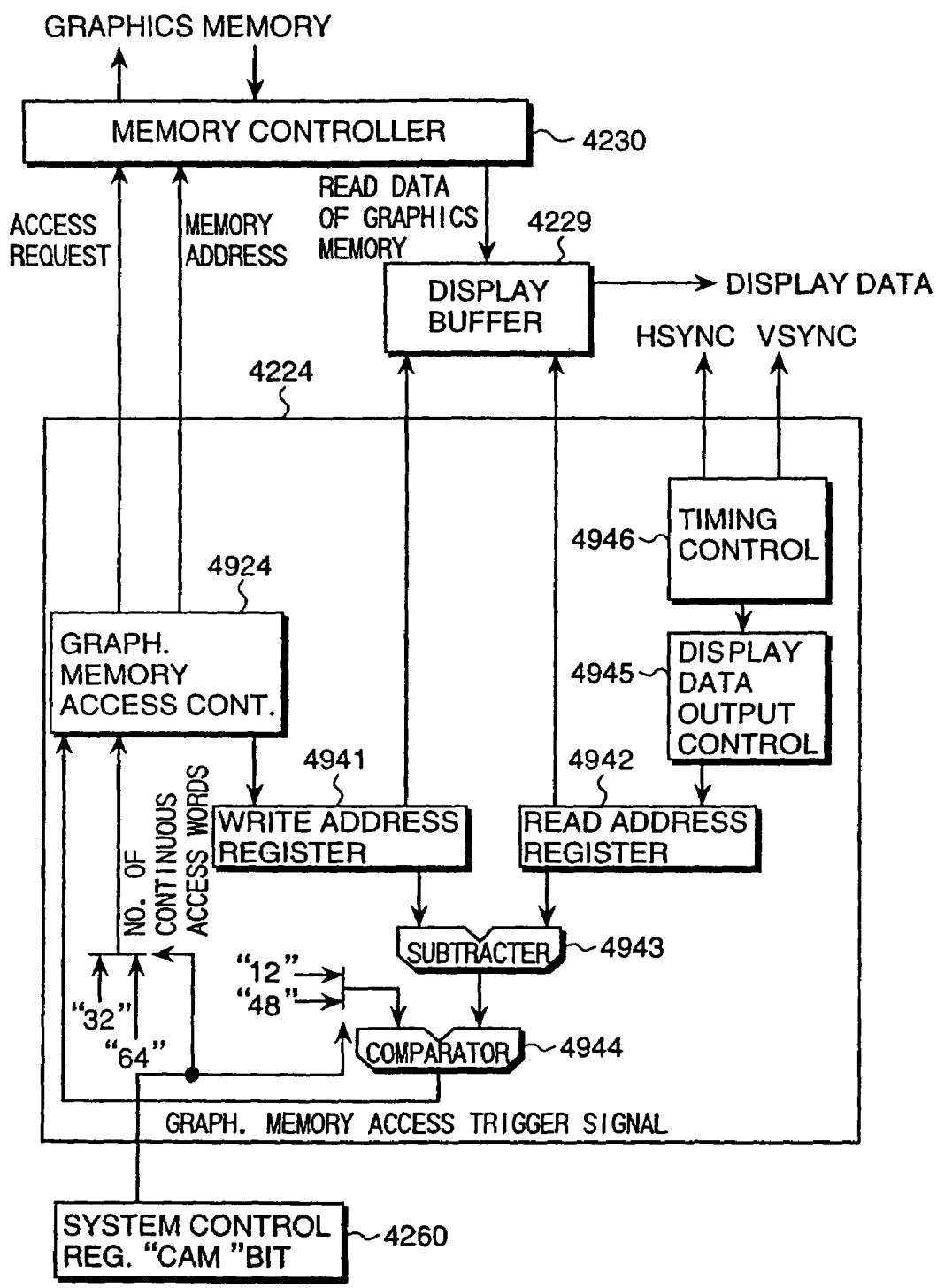
FIG. 49 is a block diagram of a display controller.

FIG. 49 is a functional block diagram of the display controller. The display controller 4224 outputs a synchronizing signal (HSYNC, VSYNC) and display data to the display unit 4251 and displays a figure on the screen of the display unit 4251. A timing controller 4946 generates a synchronizing signal (HSYNC, VSYNC) and also indicates the output timing of data in the display buffer 4229 to a display data output controller 4945.

The display buffer 4229 buffers a part of the data in the display area of the graphics memory 4240. For example, when the display buffer 4229 is 128 words in length, a system in which one pixel is 1 byte in length holds data of 256 pixels.

The data transfer speed from the graphics memory 4240 to the display buffer 4229 is sufficiently higher than that from the display buffer 4229 to the display unit 4251. For example, the former operates at 28 MHz and the latter operates at 14 MHz. Therefore, even if the read timing for display data from the graphics memory 4240 lags slightly, the data transfer timing to the display unit 4251 can be kept constant always.

The display buffer 4249 reads and writes data as indicated below. The display data output controller 4945 reads the display buffer 4229 sequentially from the address shown by a read address register 4942 according to the display dot clock (output of the DCLK terminal of the graphics processor 4220, which is a clock per each pixel of the display unit 4251), outputs the display data to the display unit 4251, and also updates the read address register 4942.

On the other hand, a graphics memory access controller 4940 is started by a graphics memory access trigger signal and reads the graphics memory 4240 in the number of words set in the number of continuous access words (for example, 32 words or 64 words) via the memory interface circuit 4230 and writes the read data into the display buffer 4229. The write address is instructed from a write address register 4941.

The write address register 4941 and the read address register 4942 are always subtracted by a subtracter 4943 and the difference is compared with a fixed number by a comparator 4944. Namely, when the difference becomes the set fixed number (for example, 12 words or 48 words) or less, the aforementioned trigger signal is outputted and the graphics memory access controller 4940 makes display access to the graphics memory 4240 and stores the display data in the display buffer 4229.

Figure 50:
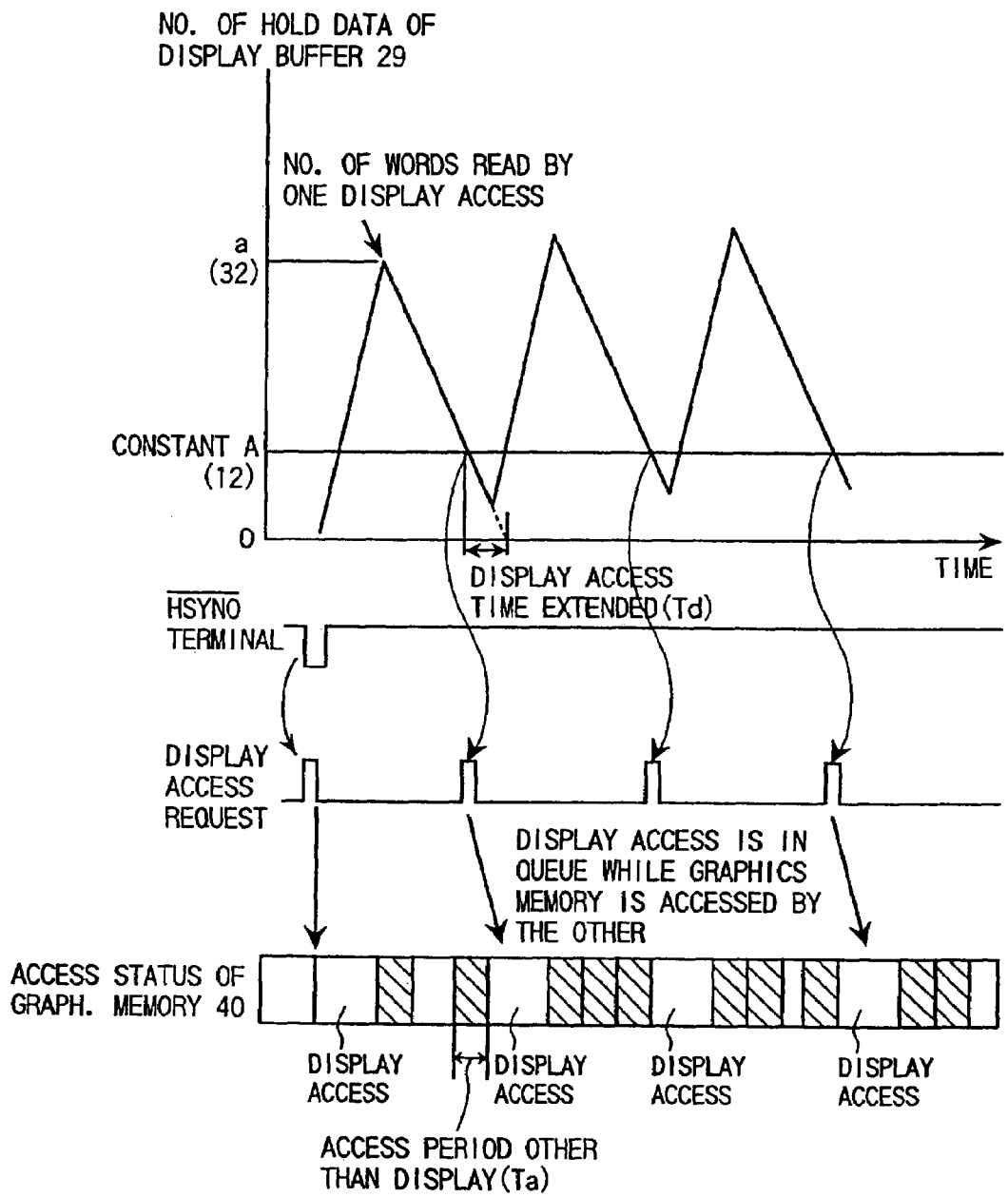
FIG. 50 is a timing chart showing an example of access to a graphics memory and control of a display buffer.

FIG. 50 is a time chart showing the aforementioned operations. The first operation of display access to the graphics memory 4240 is started by the HSYNC signal. The number of data held by the display buffer 4229 is increased by this display access and when the number reaches the number of continuous access words (32 words in the drawing) read by one display access, the display access is suspended and the display data stored in the display buffer 4229 is transferred to the display unit 4251 and reduces gradually. When the number of display data reduces to the fixed number A (12 words in the drawing) or less, a display access request is issued to the memory interface circuit 4230 from the display controller 4224 and when the request is permitted, the display access to the graphics memory 4240 is executed again. When one screen is 320 dots×240 dots in this example, display access is repeated 1200 times to display one screen.

Writing into the display buffer 4229 is carried out at a higher speed than reading, so that there is enough time between issue of a display access request signal and start of display access. The display access extension time Td shown in the drawing is equivalent to it and when the display access does not start even if Td elapses, the display buffer 4229 becomes empty and the screen of the display unit 4251 is disordered. As mentioned above, the memory interface circuit 4230 gives top priority to display access. However, when another access by the CPU or others is in execution at the time of request, the display access is forced to wait until it ends.

Therefore, to keep the display buffer 4229 away from empty, it is necessary to keep the relationship that another access time Ta of the graphics processor 4240 is shorter than Td. The fixed number A is decided from the maximum of Ta.

The frequency of access from others, particularly write access of the drawing command by the CPU 4210 is high, and the access time varies with the cache system, and there is a maximum difference of about 4 times between the copy back system and the write through system.

Figure 51:
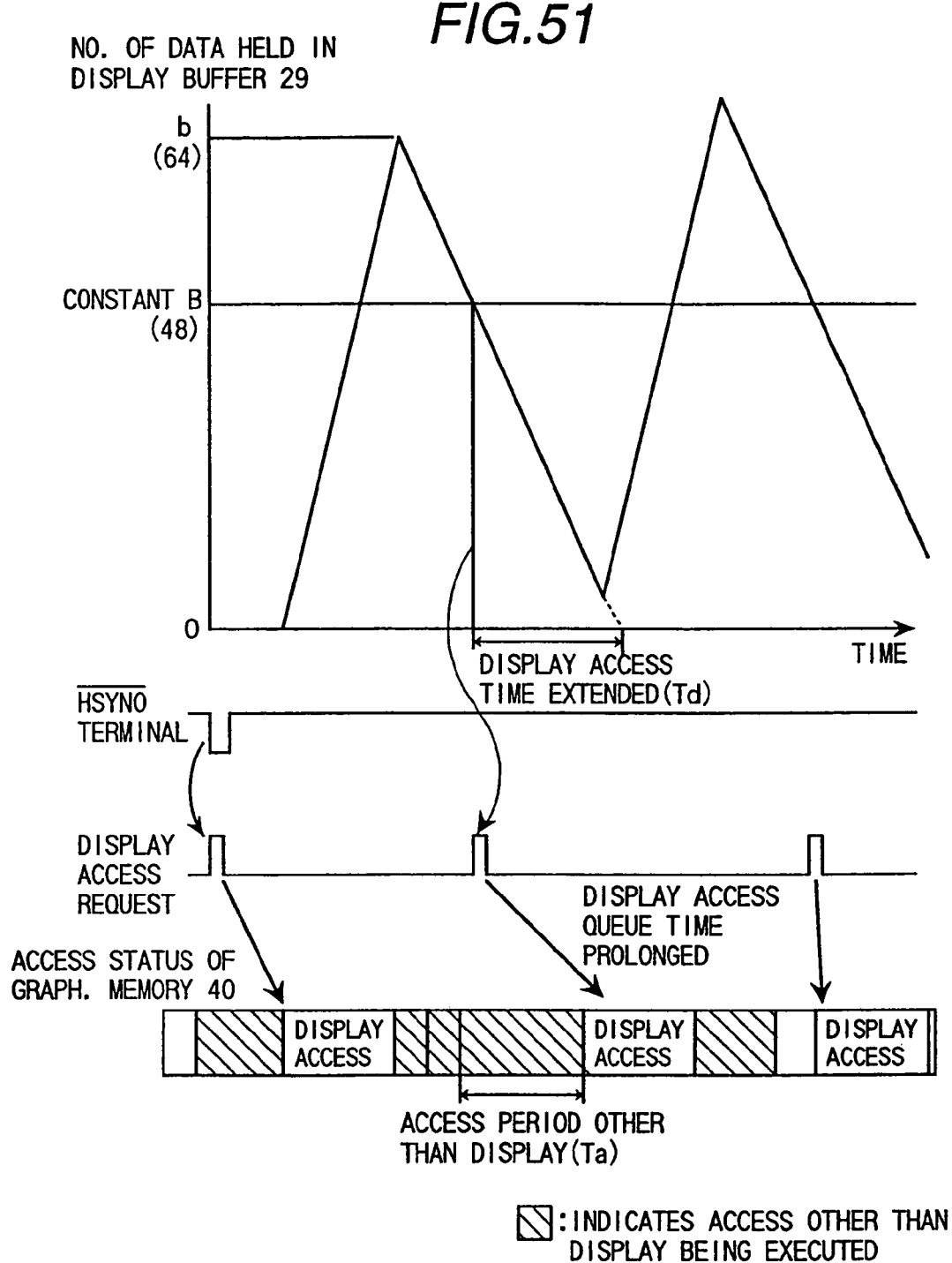
FIG. 51 is a timing chart showing another example of access to a graphics memory and control of a display buffer.

FIG. 51 is a time chart showing the operation of an example in which Ta is 4 times that shown in FIG. 50. The fixed number B for issuing a display access request is 48 words in length which are 4 times the number of words of the fixed number A. The number of continuous words read by one display access also increases and is 64 words in this example. In this connection, display access for one screen in this example is repeated 600 times.

As shown in FIG. 49, this embodiment is structured so that there are two kinds of fixed numbers to be set in the comparator 4944 such as A=12 and B=48 provided in the display controller 4224, and there are two kinds of numbers of continuous access words to be set in the graphics memory access controller 4940 such as a=32 and b=64 provided, and they are selected in correspondence to designation of the CAM bit (FIG. 45) of the aforementioned system control register in accordance with the cache system of the CPU 10. Namely, when the value of the CAM bit indicates the copy back system, the values of A and a are selected and when it indicates the write through system, the values of B and b are selected.

By doing this, when the CPU uses the copy back system, the time of one display access can be shortened to ¼ of that of the write through system and the write access count of the CPU can be increased for the extra time, so that high speed graphics can be realized without using a high speed memory system.

By only switching the CAM bit value, the graphics processor can correspond to different cache system, so that the wide usability of the graphics processor increases. Furthermore, in a system in which the graphics memory is written by a plurality of CPUs having different cache systems, the display access system of the graphics processor is switched depending on the cache system of a CPU issuing write access, so that graphics by a high speed cache system will not be sacrificed.

What is claimed is:

1. A graphics display device comprising:
   a CPU, the CPU generating drawing procedure information including graphic diagrams to be displayed and top (apex) parameters thereof;
   a graphics memory, the graphics memory storing the drawing procedure information generated by the CPU and drawing data to be output to a display unit; and
   a graphics processor which performs drawing access for the drawing procedure information, stores the drawing data in the graphics memory and further reads out the drawing data for outputting the same to the display unit, the graphics memory permitting access from both the CPU and the graphics processor,
   wherein when the CPU writes the data in the graphics memory, the CPU causes to temporarily store an address and the data to be written in a FIFO within the graphics processor, and when under the condition that the data is stored in the FIFO and no new data are written from the CPU to the FIFO for a predetermined period, the graphics processor writes the data stored in the FIFO into the graphics memory according to the address, wherein the graphics processor varies data storing timing in the graphics memory according to a cache system of a cache memory, said cache system being provided in the CPU and transferring data to the graphics memory, and wherein the graphics processor further comprises:
a CPU interface;
a counter;
a match detector; and
a flip-flop, wherein when the CPU performs a store operation to the graphics memory, a write request signal is sent from the CPU interface, the counter is incremented, and a write address and data of the CPU are stored in the FIFO, wherein the match detector compares a value of the counter with a capacity of the FIFO, and wherein the flip-flop is set if it is determined that the FIFO is full as a result of the comparison, such that the CPU interface is notified that the FIFO is busy and the CPU is prevented from storing any more data.

2. The graphic display device according to claim 1, wherein the CPU interface receives drawing procedure information generated by the CPU including graphic diagrams to be displayed and top (apex) parameters thereof.

3. A graphics display device comprising:
a CPU, the CPU generating drawing procedure information including graphic diagrams to be displayed and top (apex) parameters thereof;
a graphics memory, the graphics memory storing the drawing procedure information generated by the CPU and drawing data to be output to a display unit; and
a graphics processor which performs drawing access for the drawing procedure information, stores the drawing data in the graphics memory and further reads out the drawing data for outputting the same to the display unit, the graphics memory permitting access from both the CPU and the graphics processor, wherein when the CPU writes the data in the graphics memory, the CPU causes to temporarily store an address and the data to be written in a FIFO within the graphics processor, and when under the condition that the data is stored in the FIFO and no new data are written from the CPU to the FIFO for a predetermined period, the graphics processor writes the data stored in the FIFO into the graphics memory according to the address, wherein the graphics processor varies data storing timing in the graphics memory according to a cache system of a cache memory, said cache system being provided in the CPU and transferring data to the graphics memory, and wherein the graphics processor further comprises:
a memory interface circuit;
a read counter;
a write counter;
a match detector; and
a flip-flop, wherein when a write request to the graphics memory is output to the memory interface circuit, and data is written, the memory interface circuit updates the read counter, wherein the match detector compares a value of the read counter with a value of the write counter, and wherein the flip-flop is reset if it is determined that the value of the read counter and the value of the write counter match.

4. The graphic display device according to claim 3, wherein the memory interface circuit provides an interface for storing the drawing procedure information and drawing data in the graphics memory and reading out the drawing data from the graphics memory for outputting to the display unit.

5. A graphics display device comprising:
a CPU, the CPU generating drawing procedure information including graphic diagrams to be displayed and top (apex) parameters thereof;
a graphics memory, the graphics memory storing the drawing procedure information generated by the CPU and drawing data to be output to a display unit; and
a graphics processor which performs drawing access for the drawing procedure information, stores the drawing data in the graphics memory and further reads out the drawing data for outputting the same to the display unit, the graphics memory permitting access from both the CPU and the graphics processor, wherein when the CPU writes the data in the graphics memory, the CPU causes to temporarily store an address and the data to be written in a FIFO within the graphics processor, and when the CPU performs reading from the graphics memory, the graphics processor writes the data stored in the FIFO into the graphics memory according to the address, before the CPU starts the reading, wherein the graphics processor varies data storing timing in the graphics memory according to a cache system of a cache memory, said cache system being provided in the CPU and transferring data to the graphics memory, and wherein the graphics processor further comprises:
a CPU interface;
a counter;
a match detector; and
a flip-flop, wherein when the CPU performs a store operation to the graphics memory, a write request signal is sent from the CPU interface, the counter is incremented, and a write address and data of the CPU are stored in the FIFO, wherein the match detector compares a value of the counter with a capacity of the FIFO, and wherein the flip-flop is set if it is determined that the FIFO is full as a result of the comparison, such that the CPU interface is notified that the FIFO is busy and the CPU is prevented from storing any more data.

6. The graphic display device according to claim 5, wherein the CPU interface receives drawing procedure information generated by the CPU including graphic diagrams to be displayed and top (apex) parameters thereof.

7. A graphics display device comprising:
a CPU, the CPU generating drawing procedure information including graphic diagrams to be displayed and top (apex) parameters thereof;
a graphics memory, the graphics memory storing the drawing procedure information generated by the CPU and drawing data to be output to a display unit; and
a graphics processor which performs drawing access for the drawing procedure information, stores the drawing data in the graphics memory and further reads out the drawing data for outputting the same to the display unit, the graphics memory permitting access from both the CPU and the graphics processor, wherein when the CPU writes the data in the graphics memory, the CPU causes to temporarily store an address and the data to be written in a FIFO within the graphics processor, and when the CPU performs reading from the graphics memory, the graphics processor writes the data stored in the FIFO into the graphics memory according to the address, before the CPU starts the reading, wherein the graphics processor varies data storing timing in the graphics memory according to a cache system of a cache memory, said cache system being provided in the CPU and transferring data to the graphics memory, and wherein the graphics processor further comprises:
a memory interface circuit;
a read counter;
a write counter;
a match detector; and
a flip-flop, wherein when a write request to the graphics memory is output to the memory interface circuit, and data is written, the memory interface circuit updates the read counter, wherein the match detector compares a value of the read counter with a value of the write counter, and wherein the flip-flop is reset if it is determined that the value of the read counter and the value of the write counter match.

8. The graphic display device according to claim 7, wherein the memory interface circuit provides an interface for storing the drawing procedure information and drawing data in the graphics memory and reading out the drawing data from the graphics memory for outputting to the display unit.

* * * * *